(12) United States Patent
Nguyen et al.

(10) Patent No.: US 12,190,515 B2
(45) Date of Patent: Jan. 7, 2025

(54) COMPUTE SYSTEM WITH ACNE DIAGNOSTIC MECHANISM AND METHOD OF OPERATION THEREOF

(71) Applicant: BelleTorus Corporation, Cambridge, MA (US)

(72) Inventors: Tien Dung Nguyen, Toulouse (FR); Thi Thu Hang Nguyen, Toulouse (FR); Léa Mathilde Gazeau, Toulouse (FR); Tat Dat Tô, Toulouse (FR); Dinh Van Han, Hanoi (VN)

(73) Assignee: BelleTorus Corporation, Cambridge, MA (US)

( * ) Notice: Subject to any disclaimer, the term of this patent is extended or adjusted under 35 U.S.C. 154(b) by 0 days.

(21) Appl. No.: 18/421,559

(22) Filed: Jan. 24, 2024

(65) Prior Publication Data
US 2024/0257341 A1    Aug. 1, 2024

Related U.S. Application Data

(60) Provisional application No. 63/481,917, filed on Jan. 27, 2023.

(51) Int. Cl.
*G06T 7/00* (2017.01)
*G06T 7/11* (2017.01)

(52) U.S. Cl.
CPC .............. *G06T 7/0012* (2013.01); *G06T 7/11* (2017.01); *G06T 2200/24* (2013.01); *G06T 2207/30088* (2013.01)

(58) Field of Classification Search
CPC ..... G06T 7/0012; G06T 7/11; G06T 2200/24; G06T 2207/300088
See application file for complete search history.

(56) References Cited

U.S. PATENT DOCUMENTS

| | | | |
|---|---|---|---|
| 6,571,003 | B1 | 5/2003 | Hillebrand et al. |
| 9,504,420 | B2 | 11/2016 | Davis et al. |
| 10,169,541 | B2 | 1/2019 | Apte et al. |
| 11,508,168 | B2 | 11/2022 | Allen et al. |

(Continued)

FOREIGN PATENT DOCUMENTS

WO    WO-2019144247 A1 *    8/2019

OTHER PUBLICATIONS

Liao et al., "An Optimization-Based Technology Applied for Face Skin Symptom Detection", Healthcare 2022, 10, 2396, pp. 1-15 (Year: 2022).*

(Continued)

*Primary Examiner* — Ping Y Hsieh
*Assistant Examiner* — Jose M Torres
(74) *Attorney, Agent, or Firm* — Perspectives Law Group, Corp.

(57) ABSTRACT

A method of operation of a compute system includes: detecting a skin area in a patient image; segmenting the skin area into a segmented image having an acne pimple at the center; generating a target pixel array from the segmented image includes separating a plurality of the acne pimples that are adjacent in the segmented image; identifying an acne characterization of the acne pimples including an area of each acne and an acne score; and assembling a user interface display from the acne characterization for displaying on a device.

20 Claims, 28 Drawing Sheets
(22 of 28 Drawing Sheet(s) Filed in Color)

(56) References Cited

U.S. PATENT DOCUMENTS

| | | | |
|---|---|---|---|
| 2011/0117025 A1* | 5/2011 | Dacosta | A61B 5/742 |
| | | | 435/5 |
| 2015/0003699 A1 | 1/2015 | Davis et al. | |
| 2017/0228514 A1 | 8/2017 | Apte et al. | |
| 2020/0065998 A1* | 2/2020 | Dissanayake | A61B 5/1032 |
| 2020/0160032 A1 | 5/2020 | Allen et al. | |
| 2020/0265937 A1 | 8/2020 | Anyanwu-Ofili et al. | |
| 2020/0321115 A1 | 10/2020 | Neumann | |
| 2021/0027897 A1* | 1/2021 | Rasochova | A61B 5/0077 |
| 2021/0133968 A1* | 5/2021 | Elfakhri | G16H 50/20 |
| 2022/0108445 A1* | 4/2022 | Zhang | G06V 20/20 |
| 2023/0092766 A1* | 3/2023 | Vodrahalli | G16H 50/50 |
| | | | 382/128 |
| 2024/0065554 A1* | 2/2024 | Serval | G06V 20/20 |

OTHER PUBLICATIONS

Tutiani et al., "Implementation of Convolutional Neural Network (CNN) in Android-Based Acne Detection Applications", 2022 International Conference on Information Technology Research and Innovation (ICITRI), pp. 151-155 (Year: 2022).*

* cited by examiner

2601

2701

2801

COMPUTE SYSTEM WITH ACNE DIAGNOSTIC MECHANISM AND METHOD OF OPERATION THEREOF

CROSS REFERENCE TO RELATED APPLICATION(S)

This claims the benefit of U.S. Provisional Patent Application Ser. No. 63/481,917 filed Jan. 27, 2023, and the subject matter thereof is incorporated herein by reference thereto.

TECHNICAL FIELD

An embodiment of the present invention relates generally to a compute system, and more particularly to a system with a acne diagnostic mechanism.

BACKGROUND

Acne vulgaris (acne for short) consistently represents the top three most prevalent skin conditions in the general population in the world. According to some studies, at every moment about 20% of world population have active acne and from 28.9% to 91% in adolescents. In 2013, the treatment of acne costs exceed a billion dollars. Acne affects about 85% of young adults aged 12-25 years, and this prevalence is explained in part by the production of androgens during puberty. There may be many other causes of acne, e.g., air pollution.

Thus, a need still remains for a compute system with an acne diagnostic mechanism to provide an objective acne score to provide for a reproducible score to assist healthcare professionals. In view of the ever-increasing commercial competitive pressures, along with growing healthcare needs, healthcare expectations, and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a compute system including: detecting a skin area in a patient image: segmenting the skin area into a segmented image having an acne pimple at the center: generating a target pixel array from the segmented image includes identifying a plurality of the acne pimples that are adjacent in the segmented image: identifying an acne characterization of the acne pimples including an area of each acne and an acne score; and assembling a user interface display from the acne characterization for displaying on a device.

An embodiment of the present invention provides a compute system, including a control circuit, including a processor, configured to detect a skin area in a patient image, segment the skin area into a segmented image having an acne pimple at the center, generate a target pixel array from the segmented image includes separating a plurality of the acne pimples that are adjacent in the segmented image, and identify an acne characterization of the acne pimples including an area of each acne and an acne score; and a communication circuit, coupled to the control circuit, configured to: assemble a user interface display from the acne characterization for display on a device.

An embodiment of the present invention provides a non-transitory computer readable medium including instructions for a compute system, including: detecting a skin area in a patient image: segmenting the skin area into a segmented image having an acne pimple at the center: generating a target pixel array from the segmented image includes identifying a plurality of the acne pimples that are adjacent in the segmented image: identifying an acne characterization of the acne pimples including an area of each acne and an acne score; and assembling a user interface display from the acne characterization for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

BEST MODE FOR CARRYING OUT THE INVENTION

Figure 1:
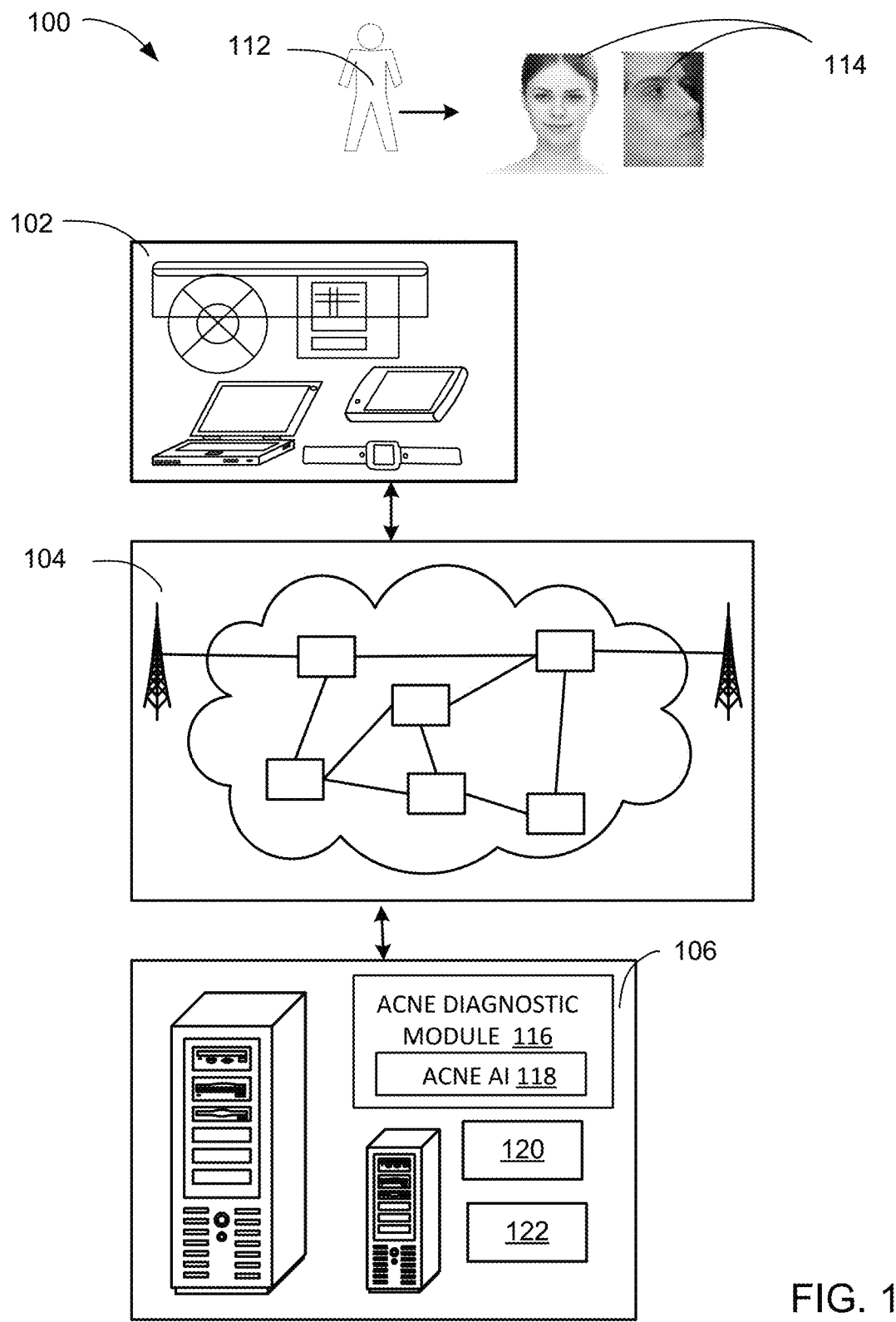
FIG. 1 is an example of a system architecture diagram of a compute system with an acne diagnostic mechanism in an embodiment of the present invention.

Acne vulgaris (acne for short) consistently represents the top three most prevalent skin conditions in the general population in the world. Due to lack of knowledge or disregard for acne, or lack of means (time and money and doctors), many people with acne do not get a proper treatment. Acne vulgaris can lead to severe irritation, ugly long-lasting scars (about 10% of population have acne scars), and other issues if not diagnosed and treated correctly.

There are two common methods for acne severity assessment: counting and grading. Acne counting is a challenge jobs since normally acne is a small mark and has similar color to skin. Grading is the comparison between some descriptions or photos. Grading method can be easy to use but can be inconsistent among doctors since it is a subjective method.

As mentioned above, doctors can miss some acne during their annotation process. If an artificial intelligence (AI) model or machine learning (ML) model learn or are trained with those images, the images with the missed annotation will create a confusion and inconsistency (because of non-labeled acne, the AI/ML model will learn or be trained that the missed annotated images are not acne when those images should be labeled as acne).

Embodiments of the compute system with an acne diagnostic mechanism provide more consistent and accurate acne scoring and classifies different types of acne for diagnostics at least by recognizing multiple acne in a given image and assessing each while other often miss acne locations as well as limit the number of acne in a given image. As examples of embodiments, the compute system with an acne diagnostic mechanism can identify, segment, or a combination thereof all or multiple acne and acne-like on a given image. Continuing with the example, the identification and segmentation can be implemented by a segmentation model or module, which will be described more later. Embodiments of the compute system with an acne diagnostic mechanism do not need doctors to do this work and avoiding some of the challenges as noted above. Further, embodiments eliminate or reduce the probability of missing acne.

Continuing with examples of embodiments, the compute system with an acne diagnostic mechanism can perform segmentation, generating more precise results than bounding boxes. Further continuing the examples, the compute system with an acne diagnostic mechanism can classify the detected acne. The compute system with an acne diagnostic mechanism can utilize annotated data from doctors as input as labeled data to training the AI/ML models of the compute system with an acne diagnostic mechanism and can compensate for the missing acne annotation by the doctors leading to solving inconsistency problem.

The compute system with an acne diagnostic mechanism can utilize acne counting, acne scoring, and acne segmentation to compute area of each acne, without requiring training for the area calculation of each acne. The compute system with an acne diagnostic mechanism process through acne area calculation for each acne provide consistent results for diagnostics. Continuing the examples for embodiments, the compute system with an acne diagnostic mechanism generates a severity from 0 to 100, which is precise or objective value while also being sensitive in the changing of number of acne and each of its severity. The consistent and accurate scoring as well as the acne area computation from the compute system with an acne diagnostic mechanism can also be utilized to track the progress of treatment.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments of various components as a matter of descriptive convenience and are not intended to have any other significance or provide limitations for an embodiment of the present invention.

The term "module" or "unit" or "circuit" referred to herein can include or be implemented as or include software running on specialized hardware, hardware, or a combination thereof in the present invention in accordance with the context in which the term is used. For example, the software can be machine code, firmware, embedded code, and application software. The software can also include a function, a call to a function, a code block, or a combination thereof. The word "module" or "model" can be also be used interchangeable depending on the context it is described or used in the written description. The "model" can represent one or more artificial intelligence models, machine learning models, or a combination thereof. The term "acne pimples" referred to herein means any type of acne including white heads, black heads, pustules, cysts, nodules, papules, comedones, or discolorations, without limitation.

Also, for example, the hardware can be gates, circuitry, processor, computer, integrated circuit, integrated circuit cores, memory devices, a pressure sensor, an inertial sensor, a microelectromechanical system (MEMS), passive devices, physical non-transitory memory medium including instructions for performing the software function, a portion therein, or a combination thereof to control one or more of the hardware units or circuits. Further, if a "module" or "unit" or a "circuit" is written in the claims section below, the "unit" or the "circuit" is deemed to include hardware circuitry for the purposes and the scope of the claims.

The module, units, or circuits in the following description of the embodiments can be coupled or attached to one another as described or as shown. The coupling or attachment can be direct or indirect without or with intervening items between coupled or attached modules or units or circuits. The coupling or attachment can be by physical contact or by communication between modules or units or circuits, such as wireless communication.

The word "module" or "model" can be also be used interchangeable depending on the context it is described or used in the written description. The "model" can represent one or more artificial intelligence models, machine learning models, or a combination thereof. It is understood the models identified in the description can be operated concurrently, in sequence, or in alternative without changing the operation of the models.

It is also understood that the nouns or elements in the embodiments can be described as a singular instance. It is understood that the usage of singular is not limited to singular but the singular usage can be applicable to multiple instances for any particular noun or element in the application. The numerous instances can be the same or similar or can be different.

Referring now to FIG. 1, therein is shown an example of a system architecture diagram of a compute system 100 with an acne diagnostic mechanism in an embodiment of the present invention. Embodiments of the compute system 100 provide standardized and objective acne scoring and area calculation for each of the acne, as described earlier.

The compute system 100 can include a first device 102, such as a client or a server, connected to a second device 106, such as a client or server. The first device 102 can communicate with the second device 106 through a network 104, such as a wireless or wired network.

For example, the first device 102 can be of any of a variety of computing devices, such as a smart phone, a tablet, a cellular phone, personal digital assistant, a notebook computer, a wearable device, internet of things (IoT) device, or other multi-functional device. Also, for example, the first device 102 can be included in a device or a sub-system.

The first device 102 can couple, either directly or indirectly, to the network 104 to communicate with the second device 106 or can be a stand-alone device. The first device 102 can further be separate form or incorporated with a vehicle, such as a car, truck, bus, motorcycle, or a drone.

For illustrative purposes, the compute system 100 is described with the first device 102 as a mobile device, although it is understood that the first device 102 can be different types of devices. For example, the first device 102 can also be a non-mobile computing device, such as a server, a server farm, cloud computing, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the compute system 100 is described with the second device 106 as a non-mobile computing device, although it is understood that the second device 106 can be different types of computing devices. For example, the second device 106 can also be a mobile computing device, such as notebook computer, another client device, a wearable device, or a different type of client device.

Also, for illustrative purposes, the compute system 100 is described with the second device 106 as a computing device, although it is understood that the second device 106 can be different types of devices. Also, for illustrative purposes, the compute system 100 is shown with the second device 106 and the first device 102 as endpoints of the network 104, although it is understood that the compute system 100 can include a different partition between the first device 102, the second device 106, and the network 104. For example, the first device 102, the second device 106, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

Returning to the description standardized and objective acne scoring of the embodiments of the compute system 100, as an example, the compute system 100 provide functions to various users 112, including patients and clinicians. The compute system 100 can provide functions to the users 112 in a number of ways.

For example, the compute system 100 can provide the functions for the users 112 with the first device 102, the second device 106, distributed between these two devices, or a combination thereof. Also as examples, the compute system 100 can provide a mobile applications for the patients, the clinicians, or a combination thereof. Further as an example, the compute system 100 can provide the functions via a web-browser based applications or a software to be executed on the first device 102, the second device 106, distributed between these two devices, or a combination thereof.

In one embodiment as an example, patient images 114 are taken and uploaded by the patient and reviewed by the clinician. In this embodiment, a patient launches the acne diagnostic mechanism via the mobile application and logs into the patient's account. The patient can be prompted to upload or take body images as the patient images 114. The compute system 100 can guide a patient on photo guidelines for the patient images 114 and accepts or rejects the patient images 114 for retake based on a pre-specified criteria, e.g., distance, quality, blur, or a combination thereof. The compute system 100 can also provide guides for a patient on capturing videos as opposed to still photos. The patient images 114 can be selected from the video.

Once the patient images 114, as required for analysis, are successfully uploaded, the compute system 100 can send or load the patient images 114 to an acne diagnostic module 116 for analysis including an acne artificial intelligence (AI) 118. The acne diagnostic module 116 will be described later. For brevity and clarity and as an example, the acne diagnostic module 116 is shown in FIG. 1 as being executed in the second device 106 although it is understood that portions can operate on the first device 102, such as the mobile app or the web-browser based application, can operate completely on the first device 102, or a combination thereof. As a further example, the acne diagnostic module 116 can be implemented in software running on specialized hardware, full hardware, or a combination thereof.

The acne AI 118 can be software executed on a processor, core, ASIC, specialized GPU, or a combination thereof configured as a machine learning structure. The combination of hardware decision nodes including for example gates and switches combined with a machine learning software that can process the patient images 114 at a pixel level.

Based on analysis results, the compute system 100 can display information to the patient including a recommendation based on the patient images 114, uploaded, for the patient to schedule a visit with your primary care physician or with a specialist based on an acne indication 120, which may or may not be visible or displayed to the patient.

If the acne diagnostic module 116 provides the acne indication 120 below a pre-specified threshold 122, the compute system 100 can display a message that based on the patient images 114, uploaded, the patient may not need a visit with your primary care physician or with other specialists. The compute system 100 can provide a function allowing the patient to schedule a visit with the clinician.

Continuing the example, the compute system 100 can provide a function that allows the clinician to access the patient images 114 uploaded by the patient and an acne indication 120, such as the acne score, the acne area, or a combination thereof through the web-based dashboard from the acne diagnostic mechanism. The compute system 100 allows the clinician to make edits to annotations determined by the acne diagnostic module 116 and the scores (if necessary) and saves the results. The clinician can utilize the acne indication 120 to make the diagnostic decision and provide necessary treatment steps (if applicable).

In a further embodiment as an example, the compute system 100 can allow a patient to schedule a visit with a primary care physician or with a specialist. A clinician can launch the acne diagnostic mechanism, such as a mobile application and logs in. The compute system 100 can be prompted to upload or take the patient images 114 of the patient's body or body parts to be analyzed by the acne diagnostic module 116.

The compute system 100 can provide guidance to the clinician on the photo guidelines. The compute system 100 can accept or reject images for retake based on a pre-specified criteria, such as distance, quality, blur, or a combination thereof. Once the patient images 114 are successfully uploaded, the compute system 100 and send or load the patient images 114 to the acne diagnostic module 116 for analysis.

Continuing the example, the compute system 100 can similarly provide a function that allow the clinician to access the patient images 114 uploaded by the patient and the acne indication 120, such as with the web-based dashboard from the acne diagnostic mechanism. The compute system 100 allows the clinician to make edits to annotations determined by the acne diagnostic module 116 and the scores (if necessary) and saves the results. The clinician can utilize the acne indication 120 to make the diagnostic decision and provide necessary treatment steps (if applicable).

Figure 2:
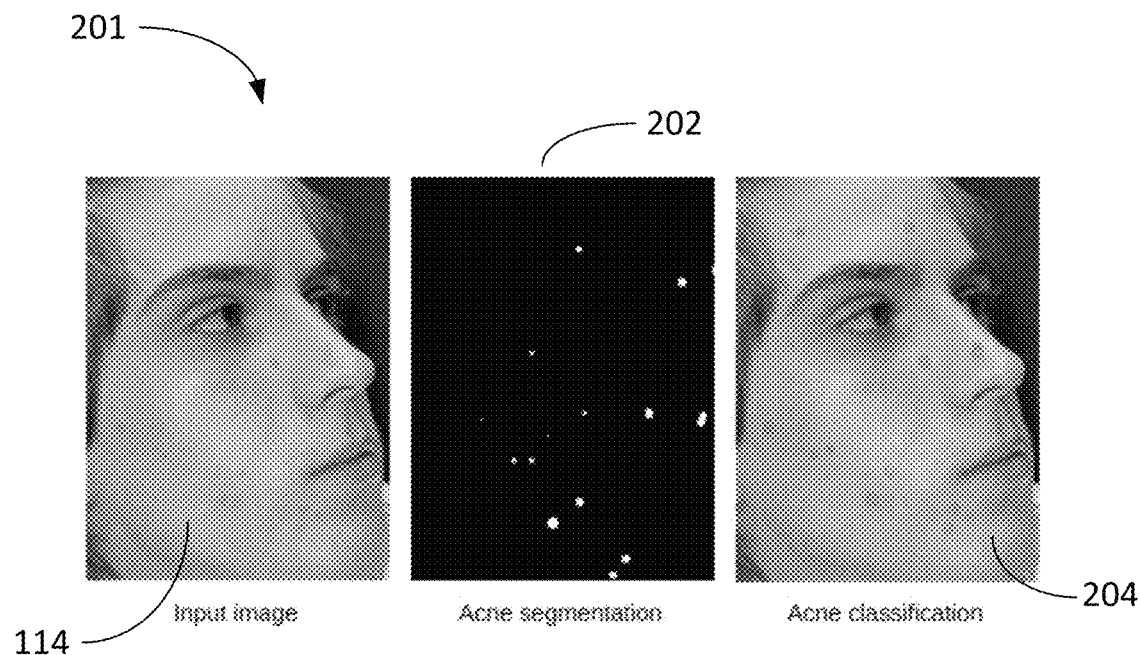
FIG. 2 is an example of some of the processing stages from input, acne segmentation, and acne classification in an embodiment.

Referring now to FIG. 2, therein is shown an example of some of the processing stages 201 from patient images 114, acne segmentation 202, and acne classification 204 in an embodiment. The compute system 100 of FIG. 1, the acne diagnostic module 116 of FIG. 1, or a combination thereof can process the patient images 114, such as the leftmost image depicted in FIG. 2. The middle image depicted in FIG. 2 is an example of an acne segmentation 202 as an interim output of the acne diagnostic module 116. The leftmost image represents the acne classification 204 based on the patient image 114 as an output that can be displayed for the user 112 of FIG. 1. The acne classification 204 is an example of an output of the acne diagnostic module 116.

Figure 3:
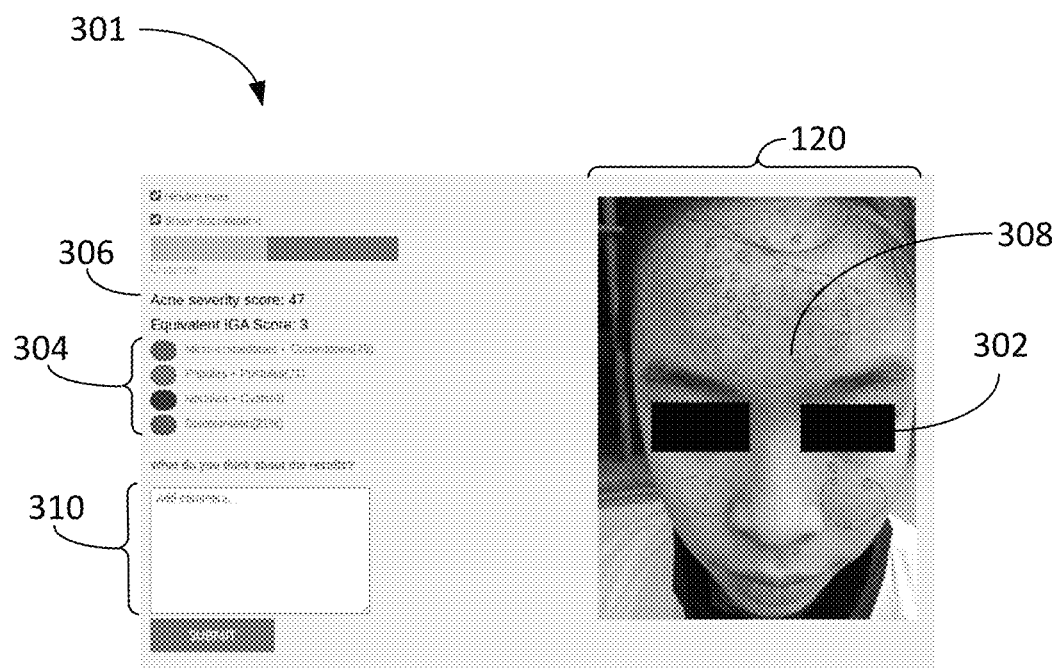
FIG. 3 is an example of a user interface display of an embodiment.

Referring now to FIG. 3, therein is shown an example of a user interface display 301 of an embodiment. An example of the user interface display 301 in an embodiment can be displayed on the first device 102, the second device 106, or a combination thereof. FIG. 3 is as an example of the user interface display 301 of an output of the compute system 100 of FIG. 1, the acne diagnostic module 116 of FIG. 1, or a combination thereof to be displayed to the user 112 of FIG. 1.

In this example, the patient image 114 of FIG. 1 is shown with the acne classification 204 of FIG. 2 and non-acne areas 302, such as the eyes being blacked out, can also serve an anonymization. In this example, the input is a facial image as the patient image 114 to the compute system 100, the acne diagnostic module 116, or a combination thereof. The output is shown in the user interface display 301 including an acne counting table 304 of each type of acne (to be described later), acne severity score 306 for the patient image 114, acne severity score 306 for the patient image 114, the acne indication 120 includes markers 308 indicating the center and radius of each of the type of acne in the acne counting table 304, and comment area 310.

The comment area 310 can provide communication between the clinician and the user 112 of FIG. 1. It is understood that the user interface display 301 can be transmitted to the user to provide analysis of the user's acne and feedback for treatment of the items listed in the acne counting table 304. The user interface display 301 can be used to monitor changes in the acne counting table 304 over time.

Figure 4:
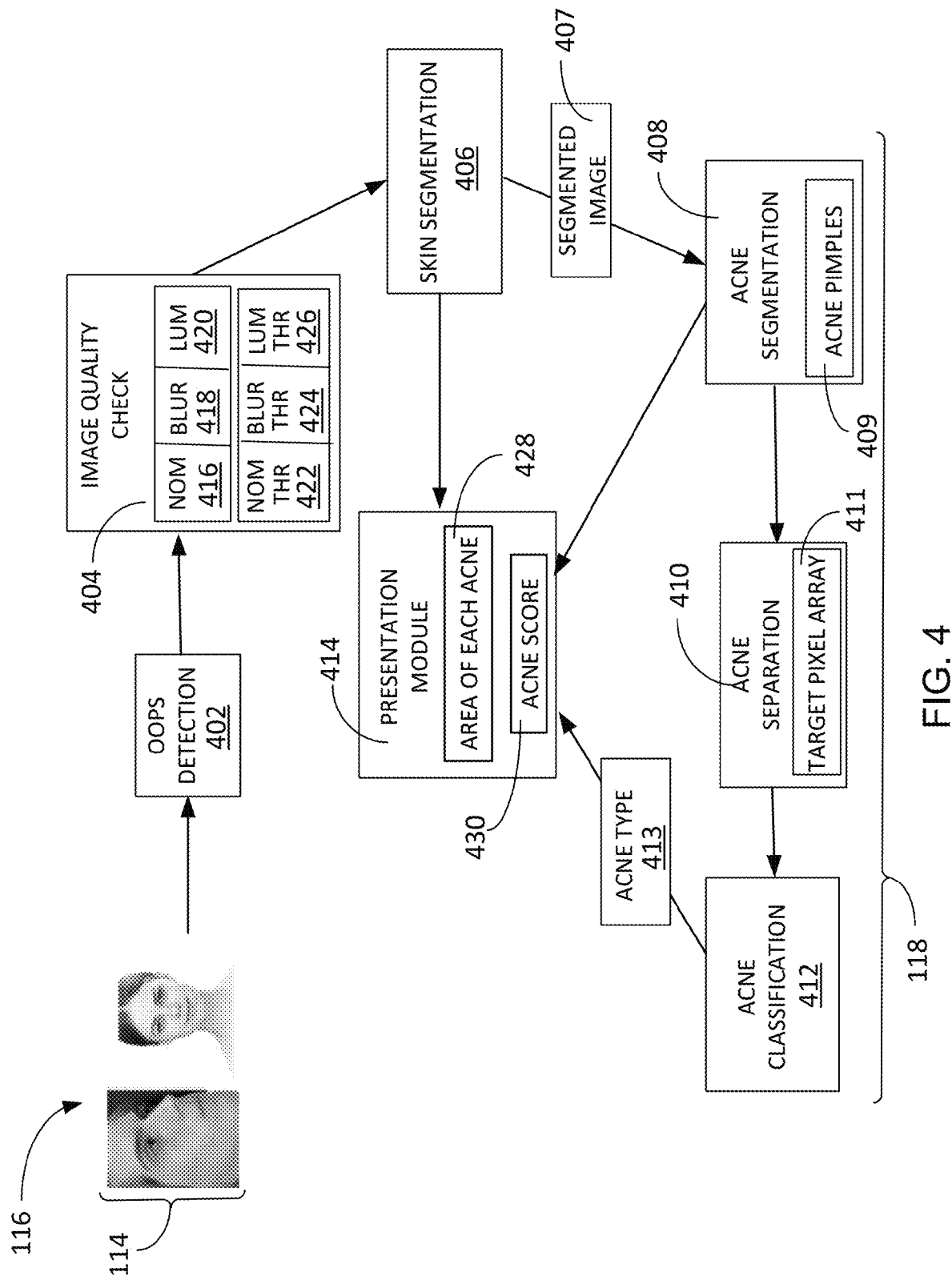
FIG. 4 is an example of a control flow of the compute system with the acne diagnostic mechanism in an embodiment.

Referring now to FIG. 4, therein is shown an example of a block diagram of the compute system 100 with the acne diagnostic mechanism 116 in an embodiment. In the example depicted in FIG. 4, the processing of the patient image 114 can be depicted at least as shown in FIG. 2 with acne segmentation 202 and acne classification 204 and can be performed by the compute system 100 of FIG. 1, the acne diagnostic module 116 of FIG. 1, or a combination thereof.

In this example, the patient image 114 is processed with Oops detection module 402 to detect whether if the patient image 114 is skin related or not. If yes, the flow can continue to Image quality check module 404 to verify if the quality of the patient image 114 is sufficiently detailed for detection with the acne diagnostic module 116 utilizing the Acne AI 118 of FIG. 1.

In this example, the block diagram can couple the oops detection module 402 to the image quality check module 404. Continuing the example, the image quality check module 404 can function as a filter for preventing poor quality images from being used as input for an acne classification module 412. Poor quality images refer to images that are too blurry or images that are of too bad luminosity (either too bright, too dark or too noisy). Eventually, the image quality check module 404 is a classification module whose possible output classes are acceptable, blurry, bad luminosity, or a combination thereof.

The image quality check module 404 can check the patient images 114 for a skin segmentation module 406 including a skin module 406, a skin detection module 406, or a combination thereof for processing through the acne diagnostic mechanism 116. The image quality check module 404 can be implemented in a number of ways.

For example, the image quality check module 404 can check the patient images 114 that are input for certain quality criteria and meeting or exceeding the quality threshold 122. As specific examples, the quality criteria can include a nominal metric 416, a blurry metric 418, a bad luminosity metric 420, or a combination thereof. Further as a specific example, the quality criteria is a three dimensional vector with the nominal metric 416, the blurry metric 418, and the bad luminosity metric 420.

The nominal metric 416 is used to measure the acceptability of the patient images 114 beyond the acceptability by the skin segmentation module 406. The skin segmentation module 406 rejects or accepts each of the patient images 114 to include sufficient skin area or skin region as described earlier. The nominal metric 416 processes the patient images 114 further such that the image is of sufficient quality to determine a skin diagnosis. The nominal metric 416 represents an overall measure that can be used to determine the acceptability of the patient image 114 for skin diagnosis for further processing. The nominal metric 416 can include measures for clarity, lighting, non-intervening obstructions to the visibility of skin, resolution, or a combination thereof.

The blurry metric 418 is used to measure the how clear or blurry the patient image 114 being processed is. The value for the blurry metric 418 is set for the patient image 114 used for training the image quality check module 404 of what is considered clear and what is consider not clear or blurry. If the value of the blurry metric 418 indicates that the patient image 114 is not clear or blurry, then the acne diagnostic mechanism 116 or portions thereof cannot analyze the instance of the patient images 114 to compute the acne indication 120. If the value of the blurry metric 418 indicates that the image is clear or not blurry, then the acne diagnostic mechanism 116 or portions thereof can analyze the instance of the patient images 114 to compute the acne indication 120.

The bad luminosity metric 420 is used to measure the lighting or brightness or dimness of the patient image 114 being processed. The value for bad luminosity metric 420 is set for the patient image 114 used for training the image quality check module 404 of what is considered too dim and what is consider not dim. If the value of the bad luminosity metric 420 indicates that the image is dim, then the acne diagnostic mechanism 116 or portions thereof cannot analyze the instance of the patient images 114 to compute the acne indication 120. If the value of the bad luminosity metric 420 indicates that the image is not too dim, then the acne diagnostic mechanism 116 or portions thereof can analyze the instance of the patient images 114 to compute the acne indication 120.

The metrics of the quality criteria can be measured with quality threshold 122 collectively, as subsets, as equal priority, or of non-equal priority. The term equal priority refers to all the metrics are compared with equal weight and impact the meeting or exceeding the quality threshold 122 for the patient image 114 to be deemed acceptable and continue to be processed by the acne diagnostic mechanism 116. The term non-equal priority refers to the varying weight of the metrics relative to each other where some can have more importance over the other metrics. As an example, one of the metrics of the quality criteria alone can be used to determine if the quality threshold 122 is met or not for the image to continue to be processed by the acne diagnostic mechanism 116.

Returning to the quality threshold 122, the quality threshold 122 can include a single value for all or some of the metrics of the quality criteria or can include a value for each of the metrics of the quality criteria. As an example, the quality threshold can include a nominal threshold 422, a blurry threshold 424, a bad luminosity threshold 426, or a combination thereof.

As a specific example, if an instance of the patient images 114 is relevant or usable to compute the acne indication 120 by the acne diagnostic mechanism 116, then the skin segmentation module 406 can determine that instance of the patient images 114 continues processing to the skin segmentation module 406. In this example, the image quality check module 404 checks each of the instance of the patient images 114 and outputs a three dimensional vector for the scores for the nominal metric 416, the blurry metric 418, and the bad luminosity metric 420. The value for the bad luminosity metric 420 can also represent the noise in the patient image 114 being processed.

Continuing with the specific example, the sum of output vector for the quality criteria does not need to be 1. There can be two high values at the same time: [0.0, 99.6, 98.0] for the nominal metric 416, the blurry metric 418, and the bad luminosity 420, respectively, which means the input image can be blurry or not clear and in bad light quality.

The compute system 100 can set the nominal threshold 422 for the nominal metric 416 for example, if the value for the nominal metric 416 is greater than or equal to 0.6, the image quality check module 404, the acne diagnostic mechanism 116, or a combination thereof accept the input image or the instance of the patient images 114 being processed at the time. In other words, the nominal metric greater than or equal to the nominal threshold 422 alone can be the quality criteria and serve as the quality threshold, respectively, to determine the patient images 114 being processes as acceptable by the image quality check module 404. In this example, the quality criteria can function as a priority encoder with the nominal metric 416 greater than or equal to the nominal threshold 422 to determine acceptability regardless of the values and comparison to the other two metrics and two thresholds.

When the nominal metric 416 is less than the nominal threshold 422, the blurry metric 418 and the bad luminosity metric 429 are compared to the blurry threshold 424 and the bad luminosity threshold 426, respectively. The greater or the maximum value between the blurry metric 418 and the bad luminosity metric 420 will determine whether the blurry threshold 424 or the bad luminosity threshold 426, respectively, shall be used as the quality threshold.

In other words, as an example, if the value of the nominal metric 416 is lower than 0.6 but values for the blurry metric 418 and the bad luminosity metric 420 indicates bad light condition are lower than the blurry threshold 424 and the bad luminosity threshold 426, respectively, then the image quality check module 404, accepts the input image or the instance of the patient images 114 being processed at the time. Otherwise, the input image or the instance of the patient images 114 being processed at the time will be classified into blurry if the value for the blurry metric 418 is higher than the value for the bad luminosity metric 420 and vice versa. Continuing this example, the quality threshold 122 is shown to be 0.7. Further, the metric (blurry metric 418 or the bad luminosity metric 420) with the larger value can be used to provide feedback to improve performance of the compute system 100 if the image quality check module 404 rejects the image.

Continuing the example, the patient images 114 that are processed and determined by the image quality check module 404 to continue processing by the compute system 100, the acne diagnostic module 116, or a combination thereof, the flow can process from the image quality check module 404 to the skin segmentation module 406. The skin segmentation module 406 can segment skin region included eyes, nails, tattoo on skin, sick skin (for example psoriasis, skin tumors, etc.). The skin segmentation does not optionally segment scalp unless the scalp is visible (i.e., there are not too much hair covering it). The skin segmentation module 406 can ignore the object on skin such as clothes, bracelet, etc. However the skin segmentation module 406 can still segment the visible skin like skin under transparent objects, such as glasses.

Continuing with the example, the compute system 100, the acne diagnostic module 116, or a combination thereof can detect skin and blackout all non-skin region of the patient image 114 with the skin segmentation module 406. The flow can continue to an acne segmentation module 408 to segment the acne and acne-like area of the segmented image 407. As shown in FIG. 2, the input image 114 is analyzed in small pixel regions to derive the segmented image 202 of FIG. 2. Based on the result of the acne segmentation module 408, the compute system 100, the acne diagnostic module 116, or a combination thereof can continue to Acne separation algorithm (Algorithm A) 410, described later, to get the center and radius information of each of an acne pimples 409 and acne-like areas. The compute system 100, the acne diagnostic module 116, or a combination thereof can crop the segmented image 407 into a target pixel array 411 with one of the acne pimples 409 or acne-like area in the center. The acne separation algorithm 410 can analyze the target pixel array 411 to separate a plurality of the acne pimples 409 that are adjacent in the segmented image 407.

The compute system 100, the acne diagnostic module 116, or a combination thereof can score the cropped images using Acne classification module 412. The acne AI 118 can include the acne segmentation module 408, the acne separation algorithm 410, and the acne classification module 412 for identifying and classifying the acne pimples 409. The Acne classification module 412 can identify each of the acne pimples 409 into acne types 413. The acne types 413 can be identified from among a white head 409, a black head 409, a pustule 409, a cyst 409, a nodule 409, a papule 409, a comedone 409, and a discoloration 409. The Acne classification module 412 generates a score from 0 to 5 for each cropped image. The higher score, the more severe it is. Using the Skin segmentation module 406, Acne segmentation module 408, and the Acne classification 412, the compute system 100, the acne diagnostic module 116, or a combination thereof can compute (Algorithm B) in a presentation module 414 to generate the final score for each of the acne pimples 409 and acne-like area as well as their area.

The compute system 100, the acne diagnostic module 116, or a combination thereof can be trained each module individually. Once every single module performs well (that is the obtained metrics are greater or higher than some good threshold depending on each module. For example, the skin segmentation has to have similarity coefficient, such as a Jaccard score, higher than 0.8), the compute system 100, the acne diagnostic module 116, or a combination thereof can be trained, tested, or a combination thereof as the whole system together. In this training process, a test set is not part of the training set. The test set can include a variety of data for example different skin tone, different parts of the face or body, different resolution, etc. Every time, if any portion of the compute system 100, the acne diagnostic module 116, or a combination thereof can provide an update, which can be from one module, from one algorithm, the compute system 100, the acne diagnostic module 116, or a combination thereof can predict acne on those images by running through the acne diagnostic mechanism 116. After the raw results, the compute system 100, the acne diagnostic module 116, or a combination thereof can run statistical tests and compare the analysis result with the one of an older version. If the result is better, the compute system 100, the acne diagnostic module 116, or a combination thereof can keep the update. Otherwise, we will not use it.

The compute system 100, the acne diagnostic module 116, or a combination thereof can compute acne severity score as follows:

$$S = \frac{200}{\pi} \arctan\left(c \sum_{i=0}^{N} s_i \frac{a_i}{A}\right) \quad (1.1)$$

where N is total number of acne, c is a fixed coefficient, $s_i$ is the score of acne i, $a_i$ is the area of acne i and A is the total area of detected skin. The arctan function provides a linear increasing for the normal coverage of acne and a quite constant for the very severe acne face see FIG. 5. The acne severity score 430 has minimum value is 0 and maximum value is 100. The skin segmentation is described more later and to compute total skin area and the computation of acne area (described later).

Regarding the performance of the compute system 100, the acne diagnostic module 116, or a combination thereof, a number of metrics can be utilized. There are a number of possible metrics for loss functions and accuracy.

Regarding mean squared error and mean absolute error, if a vector of n predictions is generated from a sample of n data points on all variables, and Y is the vector of observed values of the variable being predicted, with Y being the predicted values, then the within-sample Mean squared error (MSE) of the predictor is computed as:

$$MSE = \frac{1}{n}\sum_{i=1}^{n}(Y_i - \hat{Y}_i)^2 \quad (2.1)$$

And the Mean absolute error (MAE) is computed as $$MAE = \frac{1}{n}\sum_{i=1}^{n}|Y_i - \hat{Y}_i| \quad (2.2)$$

These functions can quantify the errors made by the module: the lower their value is, the better it is for the module. They can also be considered as distances between true and predicted values, L1-distance for the MAE, and L2-distance for the MSE. They are mostly used in regression problems, where the output is a real number.

One benefit of the MSE is that it can be optimized due to its derivative. This means that the compute system 100, the acne diagnostic module 116, or a combination thereof can utilize this function as a loss function during the training of a regression problem. On the other side, MAE, which has not this easy optimization property due to the absolute value in its definition, is useful for measuring how far from the true values are predicted values. Indeed, this function gives values in the same scale and unit as the predicted values, which allow more interpretation and understanding for human eyes. Then MAE is often used as a metric during training, to ensure that the module performs well.

Regarding Binary Cross-Entropy loss, binary classification is basically a supervised learning algorithm which aims to classify inputs into one of two classes. The format of the output can be the probability to belong to each class, or directly the predicted class. Useful for binary classification problems with probabilities as output, the Binary Cross-Entropy loss (BCE) is defined as:

$$BCE = -\frac{1}{n}\sum_{i=1}^{n}(Y_i \times \log(\hat{Y}_i) + (1 - Y_i) \times \log(1 - \hat{Y}_i)) \quad (2.3)$$

This function allows to compare each predicted probabilities $\hat{Y}_i$ to actual class output $Y_i$ which can be either 0 or 1. Then, it calculates the score that penalizes the probabilities based on the distance from the expected value. That means how close or far from the actual value. The BCE is also called the log loss because we apply the logarithm function. The reason behind using the logarithm function is that it penalizes less for small differences between predicted probabilities and true labels, but penalizes more when the difference is larger. Eventually, since the probabilities are between 0 and 1, the log values are negative, that is why the compute system 100, the acne diagnostic module 116, or a combination thereof can take the opposite of the average over the samples, to get a positive BCE value.

Regarding Jaccard score, the Jaccard index, also known as the Jaccard similarity coefficient, is a statistic used for gauging the similarity and diversity of sample sets. It measures the similarity between finite sample sets, it is defined as the ratio of the intersection over the union of the two sets.

$$J(A, B) = \frac{|A \cap B|}{|A \cup B|} \quad (2.4)$$

Regarding intra-class correlation coefficient (ICC), the intra-class correlation coefficient (ICC) is a number, usually found to have a value between 0 and 1. It refers to correlations within a class of data (for example correlations within repeated measurements of weight), rather than to correlations between two different classes of data (for example the correlation between weight and length). Let the variable of observation is defined as:

$$X_{ij} = \mu + a_i + e_{ij} \quad (2.5)$$

Where a is the group effects and e is the residual effects which are independently normally distributed with mean 0 and $$E(X_{ij}) = \mu \text{ and } Var(a_i) = \sigma_a^2; Var(e_{ij}) = \sigma_e^2 \quad (2.6)$$

Then the ICC is defined as $$ICC = \frac{\sigma_a^2}{\sigma_a^2 + \sigma_e^2} \quad (2.7)$$

The binary accuracy is defined as the ratio between number of correct predictions over the total number of predictions. For example, let the ground truth is [1, 1, 0, 1, 0, 0] and the prediction is [0, 1, 1, 0, 1, 0], then the number of correct predictions is 2 (the second position and the last position) and the total number of predictions is 6. So, the Binary accuracy in this case is 2/6=1/3. When the compute system 100, the acne diagnostic module 116, or a combination thereof compute Binary accuracy for one image, each pixel of that image is considered as an information valued either 0 or 1. The compute system 100, the acne diagnostic module 116, or a combination thereof can compare the predicted values with the ground truth pixel by pixel and get the Binary accuracy as the above formula.

For example, let the ground truth segmented image 407 (3×5 pixels) A and the prediction B be $$A = \begin{bmatrix} 1 & 0 & 0 & 0 & 0 \\ 0 & 0 & 0 & 0 & 0 \\ 0 & 0 & 0 & 0 & 0 \end{bmatrix}; \text{and } B = \begin{bmatrix} 0 & 1 & 0 & 0 & 0 \\ 0 & 0 & 0 & 0 & 0 \\ 0 & 0 & 0 & 0 & 0 \end{bmatrix} \quad (2.8)$$

Binary accuracy of this example is 0.8 (there are 12 corrected prediction pixels over 15 pixels). However, Jaccard index in this case is 0 since there is only one annotated pixel which is not matched by the prediction.

The Oops detection module 402 can acts as a filter, preventing irrelevant images to be used as input for the image quality check module 404. An irrelevant image refers to images that do not contain human skin or has more than 80% background. Eventually, the Oops detection module 402 is a regression module whose output gets a value between 0 and 1 in which a value close to 1 means probably irrelevant and vice versa. The compute system 100, the acne diagnostic module 116, or a combination thereof can include a threshold equal to 0.8 to separate the region of irrelevant and relevant, i.e., if output is greater than 0.8, the input is irrelevant, otherwise it is relevant.

As an example, the ImageNet dataset contains 310 K images in which there are 34 K irrelevant images and the remaining are relevant images. The dataset includes a variety of images of animals, plants, foods and people. It also includes images with very sick skin to normal skin in wide range of skin tone from white to darker skin.

The Oops detection module 402 not only filters irrelevant images, but also to eliminate an image taken from too far distance which makes the human skin part cover less than 20% area. To be able to detect the case, the compute system 100 includes a set of data in which there are images containing human skin covering less than 20% area. The dataset is supplemented with data augmentation creating a set of 94 K synthetic images in which a relevant image is merged with an irrelevant one to get a synthetic image in which the background of the relevant image is expanded.

The skin segmentation module 406 can be implemented in a number of ways. As an example, the implementation can be U-net architecture, which includes of an encoder-decoder scheme. The encoder reduces the spatial dimensions in every layer and increases the channels. The decoder increases the spatial dims while reducing the channels. As a specific example. EfficientNet architecture, which is a convolutional neural network architecture and scaling method that uniformly scales all dimensions of depth/width/resolution using a compound coefficient, can be an implementation for the classification and pre-trained on ImageNet dataset for the encoding.

Continuing with the example, the process can continue from the skin segmentation module 406 to the acne segmentation module 408. As an example, the acne segmentation module 408 does not just segment the acne but it also segments the acne-like marks, for example acne scar or mole. The acne segmentation module 408 performs an object detection where compute system 100, the acne diagnostic module 116, or a combination thereof can detect every acne pimples 409, such as irritated regions of the skin at or near the surface even of very small size. These are challenging problems because machine can get high accuracy without detecting anything. For example, if there are only 5% of skin area having acne, the machine will get 95% accuracy when it detects no acne and the acne pimples 409 do not often have well-defined borders which makes the acne segmentation task even more difficult. As a result, different doctors may segment the acne pimples 409 differently. Therefore, it is very hard to make the machine learn the correct acne segmentation. The compute system 100, the acne diagnostic module 116, or a combination thereof addresses these challenging problems at least through the selection of the architecture and training dataset.

Continuing with the example, the process can continue from the acne segmentation module 408 to the acne classification module 412, the acne separation module 410, or a combination thereof.

The acne classification module 412 can be trained in a number of ways with various datasets. For example, the acne classification module 412 can be trained with 128×128 pixels images. The training images are cut based on the acne segmentation module 408. That is, after detecting the acne spots, the acne classification module 412 identifies the center point of each acne and let it be the center of 128×128 pixels image. In the input image, there can be many acne pimples 409. The acne classification module 412 focuses on the acne at the center of the image and classify it, but do not classify the ones not in the center. For example, the acne classification module 412 utilizes region of interest (ROI) technique to focus on the chosen acne in the patient image 114. That is the inputs of acne classification module 412 are one RGB image and one ROI image. As a specific example, the acne classification module can be based on an Xception structure, which is a deep convolutional neural network architecture, with a residual layer and multiplication step between original image and ROI.

In the example shown in FIG. 4, the acne separation module 410 is shown between the acne segmentation module 408 and the acne classification module 412, although the compute system 100, the acne diagnostic module 116, or a combination thereof can be implemented differently. For example, the acne separation module 410 can be implemented as part of the acne segmentation module 408 and the acne classification module 412, or distributed between two.

The acne separation module 410 improves the performance of the acne classification module 412 because the acne segmentation module 408 can output the acne pimples 409 that is right next to another of the acne pimples 409 as one. The erroneous segmentation input to the acne classification module 412 results in an incorrect classification either because the two of the acne pimples 409 are of different types or the acne classification module 412 will see two of the acne pimples 409 as one hence the area or the size will be bigger. All of this sequence can produce an incorrect prediction. An example of the acne segmentation module 408 is further described in FIG. 32 to FIG. 35. The acne separation module 410 can separate the acne pimples 409 that is right next to another of the acne pimples 409 by dividing the image into a target pixel array 411 each containing a single instance of the acne pimples 409. The target pixel array 411 can be the smallest pixel array suitable for analysis of the acne pimples 409. By way of an example, the target pixel array 411 can be the 32×32×1024 pixel array 411 for the image quality check module 404, the 12×12×1632 pixel array 411 for the skin segmentation module 406, and the 16×16×1632 pixel array 411 for the acne segmentation module 408.

The flow can progress with one or more of the following leading to the presentation module 414. As an example, the presentation module 414 can process inputs from the skin segmentation module 406, the acne segmentation module 408, the acne classification module 412, or a combination thereof. The compute system 100, the acne diagnostic module 116, display module 414, or a combination thereof can return the area of each type of acne as well as the area of each acne. To do that, the result from Acne classification module 412, Acne segmentation module 408, and Skin segmentation module 406 can be overlayed to form the acne indication 120.

By way of an example, the Skin segmentation module 406 can provide the segmented image 407, the Acne segmentation module 408 can provide the region of interest (ROI) having evidence of acne in the segmented image 407, and the Acne classification module 412 can provide an area of each acne 428 and an acne severity score 430. The compilation of the outputs of the Acne classification module 412, Acne segmentation module 408, and Skin segmentation module 406 can form the acne indication 120.

The functional units or circuits in the first device 102 can work individually and independently of the other functional units or circuits. The first device 102 can work individually and independently from the network 104, the second device 106, other devices or vehicles, or a combination thereof.

The functional units or circuits described above can be implemented in hardware. For example, one or more of the functional units or circuits can be implemented using a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

Figure 5:
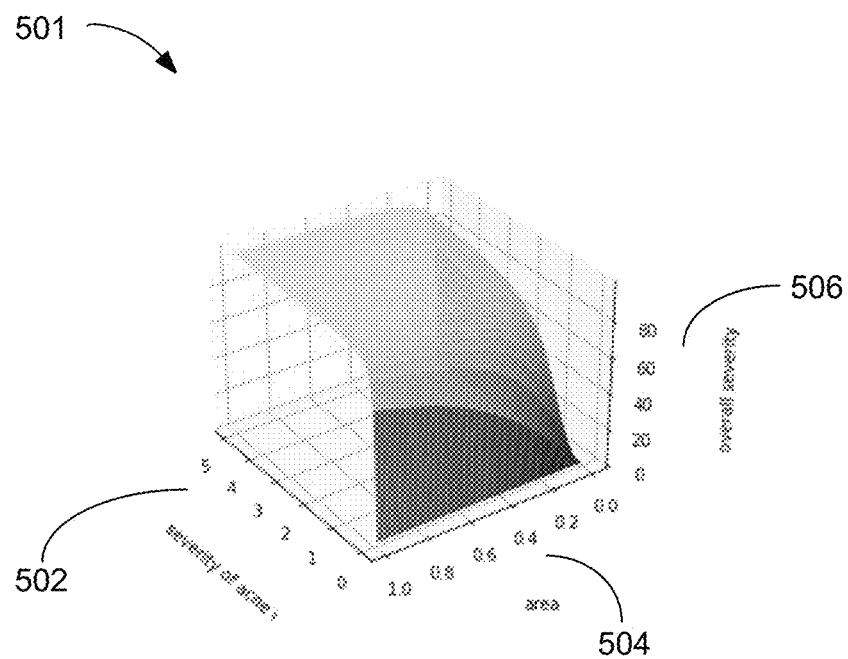
FIG. 5 is an example of a graphical representation for acne severity function in an embodiment.

Referring now to FIG. 5, therein is shown an example of a graphical representation for acne severity function 501 in an embodiment. FIG. 5 depicts the acne severity score 502 versus acne area 504 versus overall severity 506. Acne severity function 501 has linear increasing for the normal coverage of acne and a quite constant for the very severe acne face.

Figure 6:
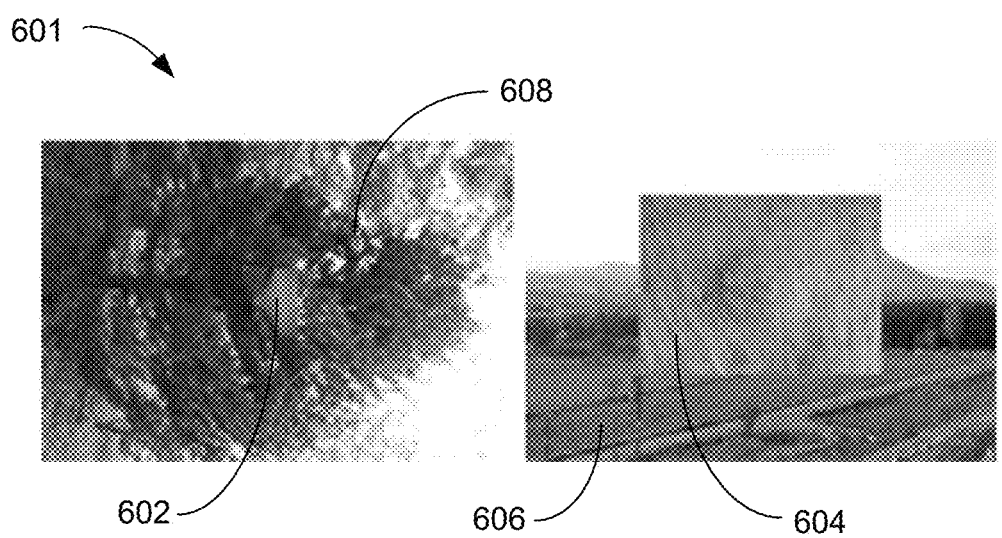
FIG. 6 is an example of synthetic images from input synthesis in an embodiment.

Referring now to FIG. 6, therein is shown an example of synthetic images 601 from input synthesis in an embodiment. The examples depicted in FIG. 6, a skin area 602 and a larger skin area 604 is placed on top of an image of landscape 606 or trees 608. The ImageNet dataset contains 94 K synthetic images discussed in FIG. 4 including 81 K images that human skin cover from 2% to 18% (called synthetic type 1) and 13 K images that human skin cover more than 20% (called synthetic type 2). The dataset labeled synthetic images 601 type 1 as 0.5 and synthetic images type 2 as 0.0. Examples of the synthetic images 601 are used to train the acne detection mechanism 116 of FIG. 4.

The training set includes data augmentation with random cropping, making boarder constant, resizing, random rotating, random flipping such that compute system 100, the acne diagnostic module 116, or a combination thereof produce output of size 384×384. For validation set, the compute system 100, the acne diagnostic module 116, or a combination thereof simply resize images to 384×384 which is the size of the machine learning algorithm's input.

Figure 7:
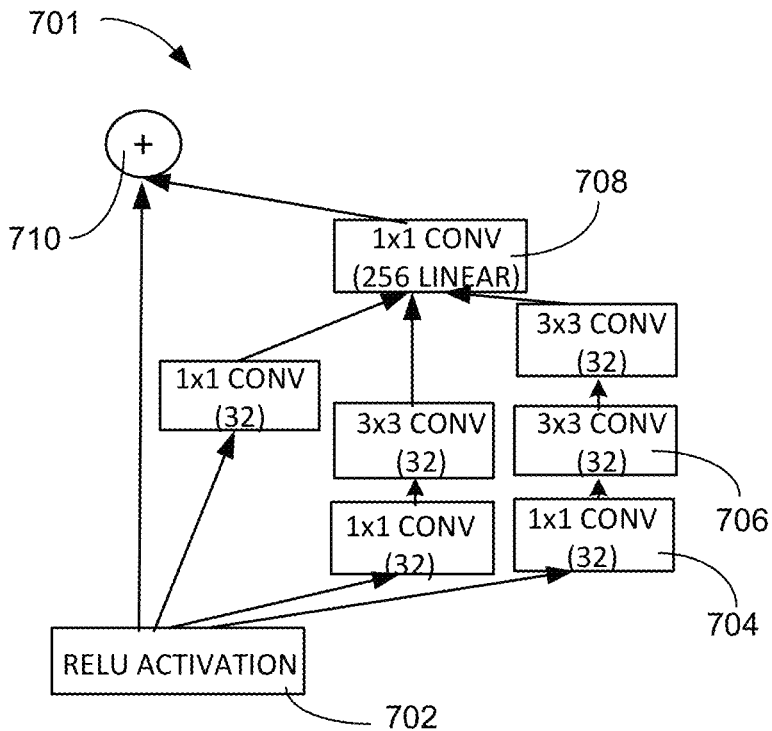
FIG. 7 is an example of a block diagram for an inception module of oops detection module in an embodiment.

Referring now to FIG. 7, therein is shown an example of a block diagram for an inception module 701 of oops detection module 402 in an embodiment. The compute system 100, the acne diagnostic module 116, or a combination thereof can be implemented in an number of ways for the oops detection module 402. For example the oops detection module 402 can be implemented with an Inception-ResNet-v2, which is a convolutional neural network that is trained on more than a million images from the ImageNet database, for the encoding part. The Inception- ResNet-v2 is a convolutional neural architecture that builds on the Inception family of architectures but incorporates residual connections (replacing the filter concatenation stage of the Inception architecture).

The convolutional neural network used in the Oops detection module 402 replaces the filter concatenation stage of the Inception architecture with the circuit of FIG. 7 to incorporate residual connections that would otherwise be lost. A relu activation module 702 receives the patient image 114 for processing. The image is dispersed to a series of a detail level converter 704, such as a 1×1 converter in a 32 segment array. The detail level converters 704 can be coupled to a broad area converter 706, such as a 3×3 converter in a 32 segment array. The patient image 114 is submitted to three channels for analysis. The first channel consists of only one of the detail level converter 704. The second channel consists of one of the detail level converter 704 coupled to one of the broad area converter 706. The third channel consists of one of the detail level converter 704 coupled to one of the broad area converter 706 coupled to a second one of the broad area converter 706. A detailed area converter 708, such as a 1×1 converter in a 256 bit linear configuration receives input from the first channel, the second channel, and the third channel in order to provide detailed analysis over the entire input of the patient image 114. A summing node 710 receives the input image of the patient image 114 and the output of the detailed area converter 708 in order to identify skin in the patient image 114.

Figure 8:
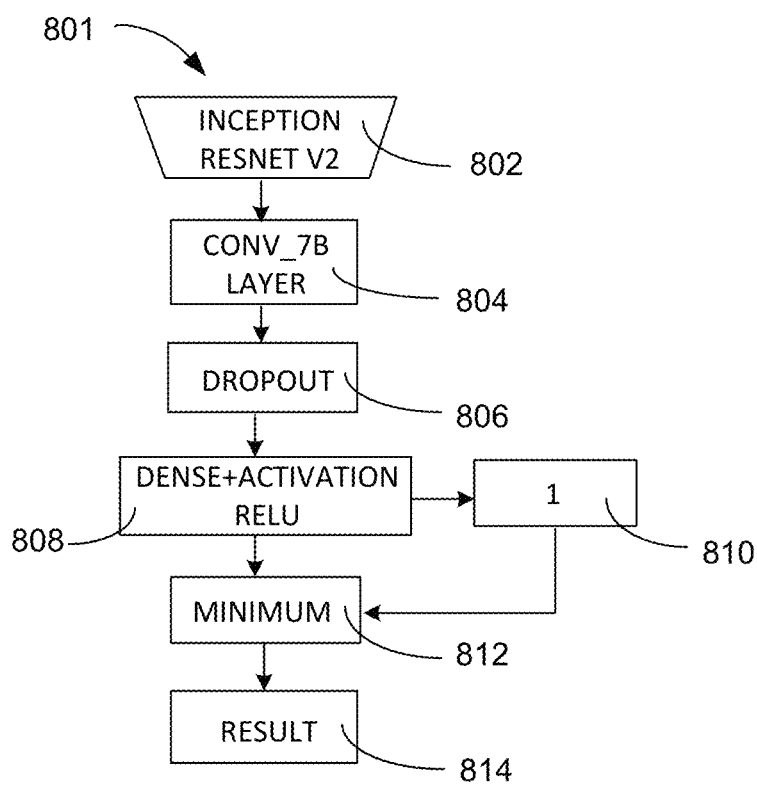
FIG. 8 is an example of a block diagram for another portion of the oops detection module in an embodiment.

Referring now to FIG. 8, therein is shown an example of a block diagram for another portion 801 of the oops detection module 402 in an embodiment. Given the patient image 114, the oops detection module 402 can be implemented with a convolutional neural network (CNN) architecture that can return one output as illustrated in FIG. 8. Compared with another encoding. Inception-ResNet-v2 802 gives us robust performance. The Oops detection module 402 contains 783 layers with about 54.3 million parameters.

A Conv_7B Layer module 804 receives the patient image 114 processed by the Inception-ResNet-v2 802 and identifies non-skin areas in the patient image 114. The Conv_7B Layer module 804 is coupled to a dropout module 806. The dropout module 806 can mask out the non-skin areas of the patient image 114. The dropout module 806 is coupled to a dense+activation relu module 808 that can identify acne within the skin area 602 of FIG. 6 of the patient image 114 that has not been marked out. The dense+activation relu module 808 is coupled to a loss module 810 and a minimum module 812. The loss module 810 calculates the error interpretation of the analysis of the skin area 602 and identifies a mean absolute error for the calculations of the acne count, area, and size. The minimum module 812 applies the corrections of the loss module to the analysis of the skin area 602 from the dense+activation relu module 808. The minimum module 812 provides the result 814 for incorporation in the user interface display 301 of FIG. 3.

The loss module 810 plays an important role in the training process. The loss module 810 punishes the module if it regresses wrong. Regarding the loss and metric, the metric to measure accuracy of the model is mean absolute error (MAE) that is a measure of errors between paired observations expressing the same phenomenon. MAE is calculated as the sum of absolute errors divided by the sample size:

$$MAE = \frac{1}{n}\sum_{j=1}^{n}|y_j - \hat{y}_j| \quad (3.1)$$

where $y_j$ are the true labels and $\hat{y}_j$ are the corresponding predictions.

It has been discovered that the oops detection module 402 can operate the Inception-ResNet-v2 802 as an artificial intelligence utilizing a convoluted neural network trained with the ImageNet data set to recognize all types of the acne pimples 409 that can be identified on the skin surface. The processing of the patient image 114 preserves the overall view while identifying and marking the acne pimples 409 on the skin surface. The loss module 810 can refine the model during execution in order to maintain a high degree of accuracy and improve the process of acne identification and analysis.

Figure 9:
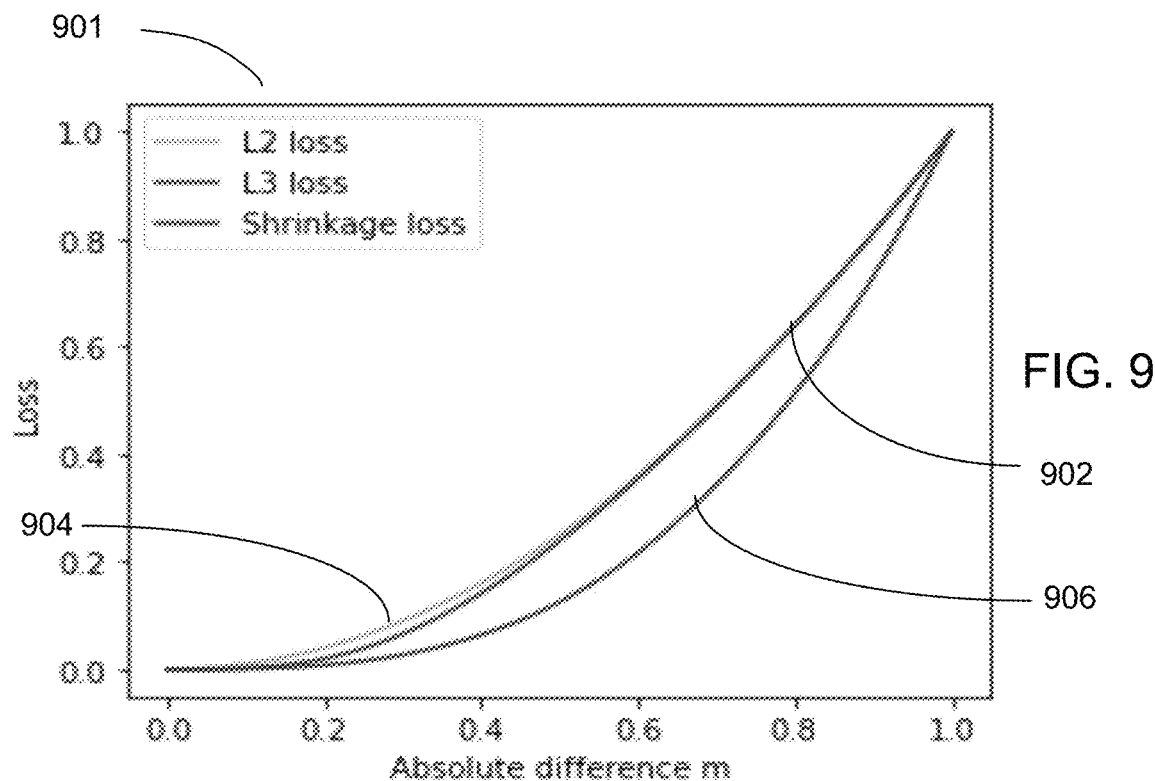
FIG. 9 is an example of the loss comparison chart for the oops detection module in an embodiment.

Referring now to FIG. 9, therein is shown an example of the loss comparison chart 901 for the oops detection module 402 in an embodiment. The compute system 100 of FIG. 1, the acne diagnostic module 116 of FIG. 1, or a combination thereof can use the Shrinkage loss 902 to handle the data imbalance issue in learning deep regression networks. For this task, the compute system 100, the acne diagnostic module 116, or a combination thereof can use Shrinkage loss function, which is defined as below:

$$l(y, \hat{y}) = \frac{m^2}{1 + \exp[a(c - m)]}$$

where $m=|y-\hat{y}|$, y is the true label and $\hat{y}$ is the prediction, a and c are hyper-parameters controlling the Shrinkage speed and the localization respectively.

As shown in the example in FIG. 9, the Shrinkage loss 902 only penalizes the importance of easy samples (when m<0.5) and keeps the loss of hard samples unchanged (when m>0.5) compared to the square loss L2 904 (with L2=$m^2$). The focal loss L3 906 (with L3=$m^3$) penalizes both the easy and hard samples.

The compute system 100, the acne diagnostic module 116, or a combination thereof set the value of a to be 10 to shrink the weight function quickly and the value of c to be 0.2 to suit for the distribution of m, which ranges from 0 to 1.

Figure 10:
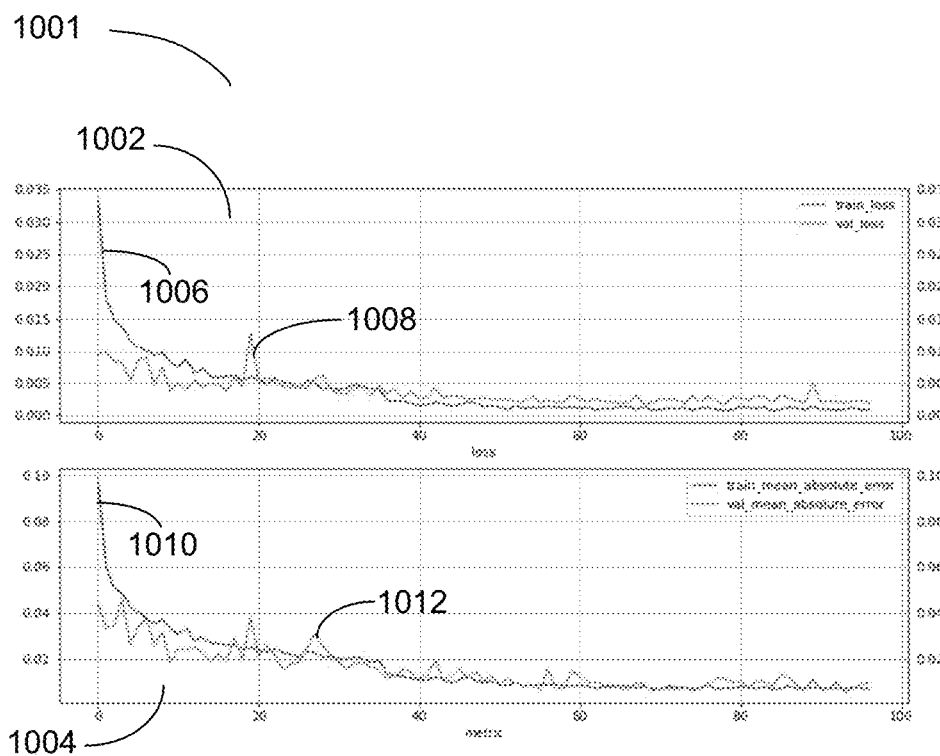
FIG. 10 is an example of the performance chart of the oops detection module in an embodiment.

Referring now to FIG. 10, therein is shown an example of the performance chart 1001 of the oops detection module 402 in an embodiment. The compute system 100, the acne diagnostic module 116, or a combination thereof can be trained for 95 epochs with nearly 40000 images in each epoch, about 80% data set is reserved for training set and the rest for validation. To measure the accuracy of the model, MAE as equation 3.1 can be utilized. The compute system 100, the acne diagnostic module 116, or a combination thereof can obtain 0.01 MAE score on validation. FIG. 10 illustrates for the performance of Oops detection module 402.

A loss chart 1002 indicates the loss function of a training loss 1006 as compared to a verification loss 1008 based on the number of epochs used to train the acne diagnostic module 116. As displayed in the loss chart 1002, the verification loss 1008 tracks the training loss 1006 with 0.002 after 95 epochs of training.

An absolute error chart 1004 indicates the mean absolute error of a training error 1010 as compared to a verification error 1012 based on the number of epochs used to train the acne diagnostic module 116. As displayed in the absolute error chart 1004, the verification error 1012 tracks the training error 1010 with 0.1 mean absolute error between the predicted values and the absolute values after 95 epochs of training.

Figure 11:
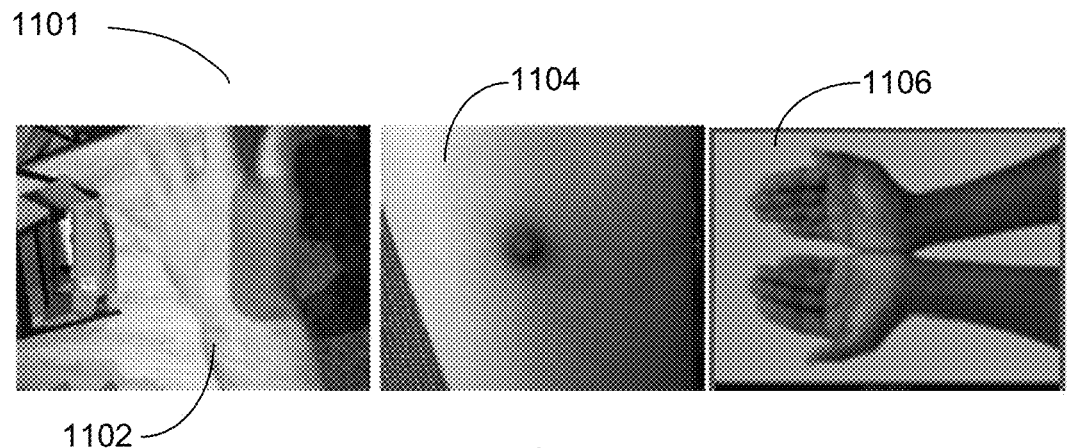
FIG. 11 are examples of patient images classified as blurry images in an embodiment.

Referring now to FIG. 11, therein are shown examples of patient images 114 classified as blurry images 1101 in an embodiment. The images depicted in FIG. 11 are examples used with the image quality check module 404. The dataset includes 5297 images. 86% of them are of good quality, and 14% of them are of bad quality. The image quality check module 404 trained only with good quality images that were modified to transform them into bad quality images did not perform well with real bad quality images. The dataset to train the image quality check module 404 were supplemented to include real bad quality images. The dataset was also supplemented with images to include enough black skin images so that the model does not classify them as "too dark". FIG. 11 are some examples of images of the training dataset.

A first blurry image 1102 is too far away to see details of the skin and a portion of the skin is obstructed by a bandage. A second blurry image 1104 is close enough, but is out of focus, which removes the required detail for analysis by the image quality check module 404. A third blurry image 1106 is too far away and is out of focus making it a useful example of a blurry image for training purposes.

Figure 12:
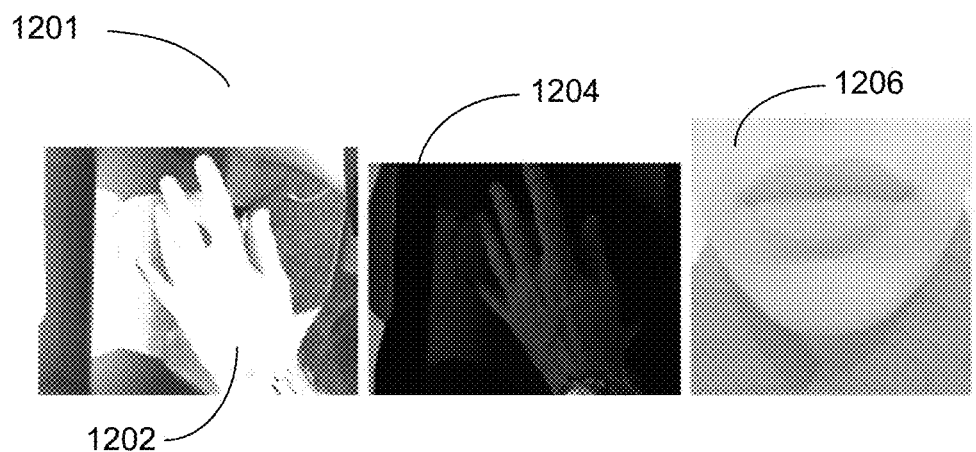
FIG. 12 are examples of patient images classified as bad luminosity images in an embodiment.

Referring now to FIG. 12, therein are shown examples of patient images 114 classified as bad luminosity 1201 in an embodiment. FIG. 12 depict examples of different type of bad luminosity images used for training the image quality check module 404.

A first bad luminosity image 1202 shows an extremely bright light washes out the details of the skin. A second bad luminosity image 1204 shows too little light to see details of the skin. A third bad luminosity image 1206 shows a colored light washes-out the detail of the skin making the image a good training item for bad luminosity.

Figure 13:
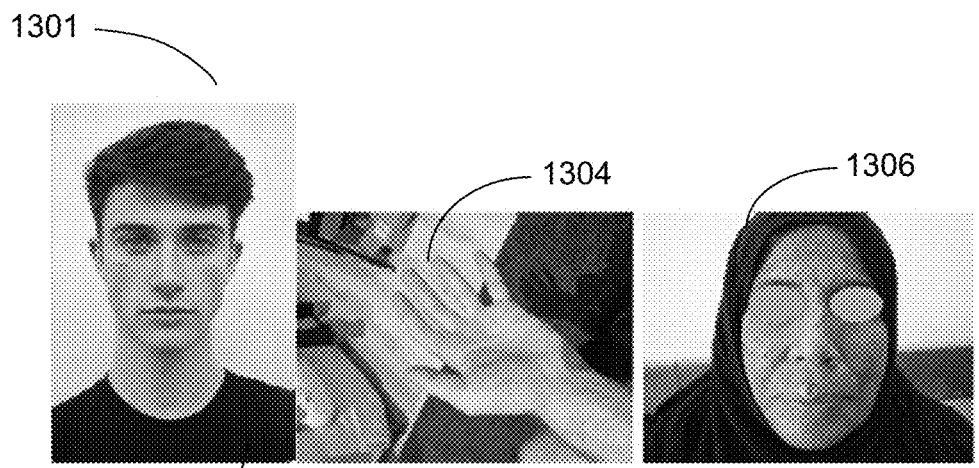
FIG. 13 are examples of patient images classified as acceptable in an embodiment.

Referring now to FIG. 13, therein are shown examples of patient images 114 classified as acceptable 1301 in an embodiment. FIG. 13 depict examples of good images as opposed to bad images to those shown in FIG. 11 or FIG. 12.

A first acceptable image 1302 provides sufficient detail of the face for analysis of the image quality check module 404. A second acceptable image 1304, again provides the correct detail, focus and luminosity to be analyzed correctly. A third acceptable image 1306 is also provided as a good training image for proper focus, luminosity, and detail of the skin for analysis.

Figure 14:
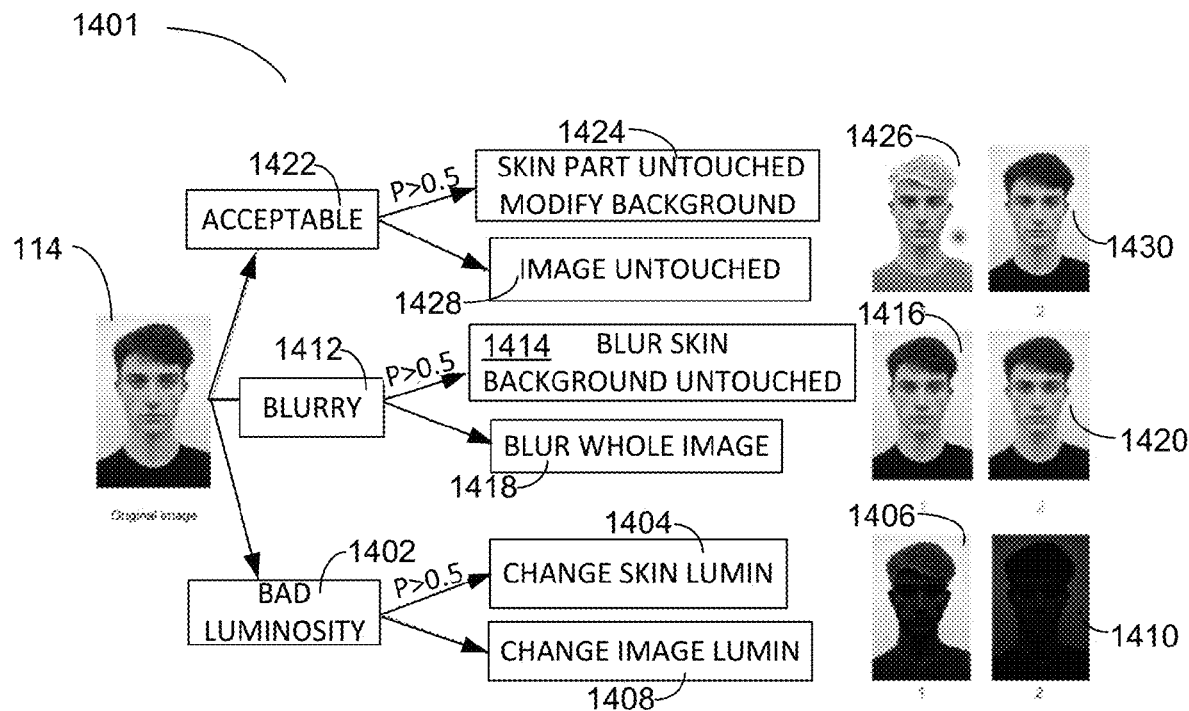
FIG. 14 is an example of a patient image processing with data augmentation in an embodiment.

Referring now to FIG. 14, therein is shown an example of patient image 114 processing with data augmentation 1401 in an embodiment. FIG. 14 depicts examples of a patient image 114 being processed as part of the data augmentation 1401 to the data set for the compute system 100 of FIG. 1, the acne diagnostic module 116 of FIG. 1, or a combination thereof. As an example, the patient image 114 is considered a good image. The data augmentation process, in this example, transforms the good image into one or more bad images to generate balanced batch of inputs for the image quality check module 404. The transformations change the good image's luminosity, contrast, add different levels of blur, or a combination thereof. Moreover, to make the model learn to focus on the skin only and not on the background, the compute system 100, the acne diagnostic module 116, or a combination thereof trains the model to focus on the skin and not the background, the skin segmentation module 406 to modify the background and keep the skin untouched, or to modify the skin and keep the background untouched.

As a training aide, a bad luminosity block 1402 can change the skin luminosity and the background luminosity in a block 1404 resulting in the high contrast image 1406. The bad luminosity block 1402 can also change the whole image luminosity in a block 1408 resulting in the darkened image 1410. A blurry image block 1412 can blur only the skin part while leaving the background untouched in a block 1414 resulting in the image 1416. The blurry image block 1412 can also blur the entire image in a block 1418 resulting in the image 1420. An acceptable image block 1422 can keep the skin area 602 untouched and blur the non-skin areas of the image in a block 1424, resulting in a first acceptable image 1426. The acceptable image block 1422 can keep the whole image untouched 1428, resulting in a second acceptable image 1430.

It has been discovered that the training of the image quality check module 404 can be trained by manipulating the patient image 114 to intentionally have less that acceptable conditions in a predictable manner by the bad luminosity block 1402 and the blurry image block 1412 for training purposes. This technique can provide balanced analysis of the patient image in normal operation of the image quality check module 404.

Figure 15:
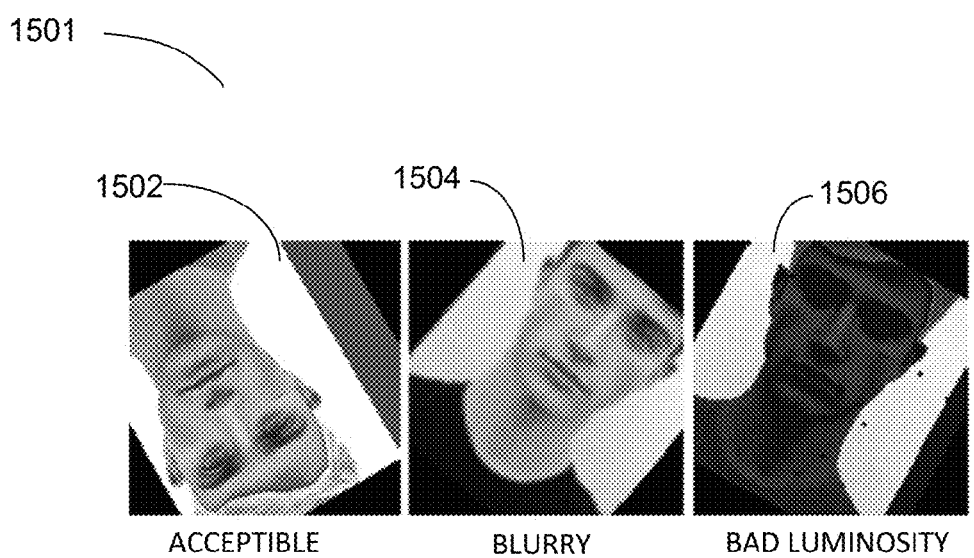
FIG. 15 is an example of a patient image processed with data augmentation and the classification in an embodiment.

Referring now to FIG. 15, therein is shown an example of a patient image 114 processed with data augmentation 1401 and a classification 1501 in an embodiment. FIG. 15 depicts example outputs of the data augmentation flow of FIG. 14 such that the compute system 100 of FIG. 1, the acne diagnostic module 116 of FIG. 1, or a combination thereof can also perform other data augmentation 1401, such as rotation 1502, transposition 1504, RGB shift 1506, Horizontal and Vertical flip and cutout. The leftmost image 1502 of FIG. 15 is classified as acceptable. The middle image 1504 of FIG. 15 is classified as blurry. The rightmost image 1506 of FIG. 15 is considered bad luminosity.

Figure 16:
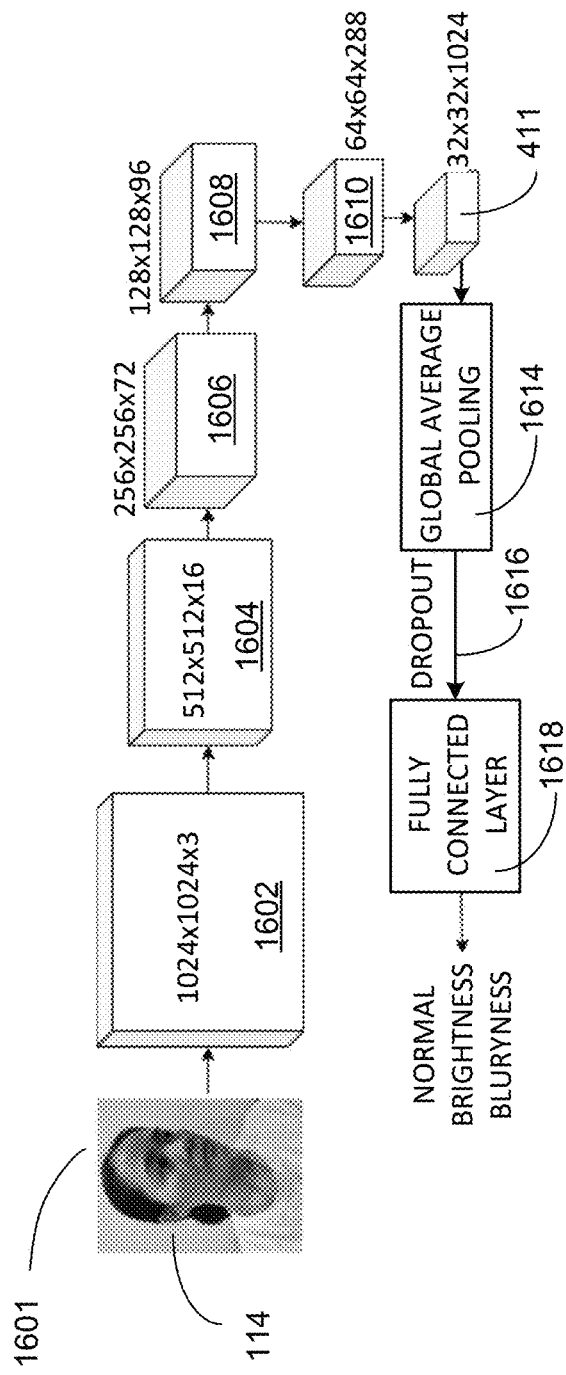
FIG. 16 is an example of a block diagram of a portion of the image quality check module in an embodiment.
Figure 17:
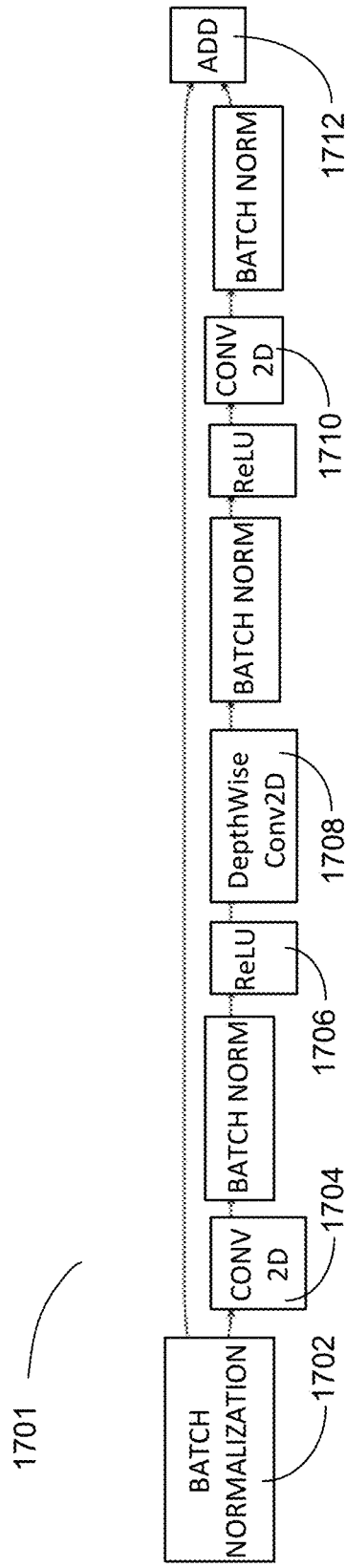
FIG. 17 is an example of a more detailed block diagram of a portion of the image quality check module in an embodiment.

Referring now to FIG. 16 and FIG. 17, therein is shown an example of a block diagram 1601 of a portion of the image quality check module 404 in an embodiment and is an example of a more detailed block diagram of a portion of the image quality check module 404 in an embodiment. The image quality check module 404 was trained with MobileNet architecture, which is a light model. Indeed, our MobileNet model has only 2M trainable parameters. As the following figure FIG. 16 and FIG. 17 shows, the use of MobileNetSmall minimalistic pre-trained 1701 with 'imagenet' weights, and had a few more layers afterwards included Global Average Pooling (GAP), Fully Connected Layers, and Dropout.

As an example, depicted in FIG. 16, the image quality check module 404 with patient image 114 of size 1024×1024×3 is input in a block 1602. The encoding of the patient image 114 can be reduced to 512×512×16 in a block 1604, further reduced to 256×256×72 in a block 1606. The reduction in size divides the pixels of the patient image 114 to expose details. The image is further reduced to 128×128×96 in a block 1608, then reduced to 64×64×288 in a block 1610, and finally reduced to a target pixel array 411, such as 32×32×1024 pixel array 411. The target pixel array 411 is processed by a GAP block 1614. The GAP block 1614 averages the pixel values in each of the target pixel array 411 to produce 1024 averages representing the patient image 114.

The output of the GAP block 1614 goes through a dropout process 1616 to disregard certain nodes in a layer at random during training. The dropout process 1616 is a regularization approach that prevents overfitting by ensuring that no units are codependent with one another. The remaining data is processed by a fully connected layer block 1618, which is a neural network in which each neuron applies a linear transformation to the input vector through a weights matrix. As a result, all possible connections layer-to-layer are present, meaning every input of the input vector influences every output of the output vector. The output of the fully connected layer block 1618 provides an indication of normal, brightness, or blurriness to qualify the patient image 114 as acceptable or unacceptable.

Referring now to FIG. 17, therein is shown an example of a more detailed block diagram 1701 of a portion of the image quality check module 404 in an embodiment. The more detailed block diagram 1701 depicts an exemplary block of the Image quality check module 404 contains Conv2D and DepthWise Conv2D as well as Batch normalization and Padding.

A batch normalization module 1702 provides normalization of the layers' inputs by re-centering and re-scaling. The batch normalization module 1702 provides a method used to make training of artificial neural networks faster and more stable. Batch normalization is a technique for training very deep neural networks that standardizes the inputs to a layer for each mini-batch. This has the effect of stabilizing the learning process and dramatically reducing the number of training epochs required to train deep networks. A Conv2d module 1704 provides a filtering of the input image. The Conv2d module 1704 can be scanned across the entirety of the patient image 114 as measured by height and width in pixels.

A Rectified Linear Unit (ReLU) 1706 is an activation function that introduces the property of non-linearity to a deep learning model and solves the vanishing gradients issue. The ReLU 1706 can help to prevent the exponential growth in the computation required to operate the neural network. A DepthWise conv2D module 1708 is a type of convolution that applies a single convolutional filter for each input channel in order to reduce the number of parameters being convolved. The DepthWise conv2D module 1708 can prevent a proliferation of parameters submitted to the convolutional neural network.

A conv2D module 1710 creates a convolution kernel that is convolved with the layer input to produce a tensor of outputs. Unlike the DepthWise conv2D module 1708, the conv2D module 1710 applies the same kernel to all channels of the input image resulting in a single pixel per input frame. An adder module 1712 can combine the originally processed image with the highly filtered details added.

Figure 18:
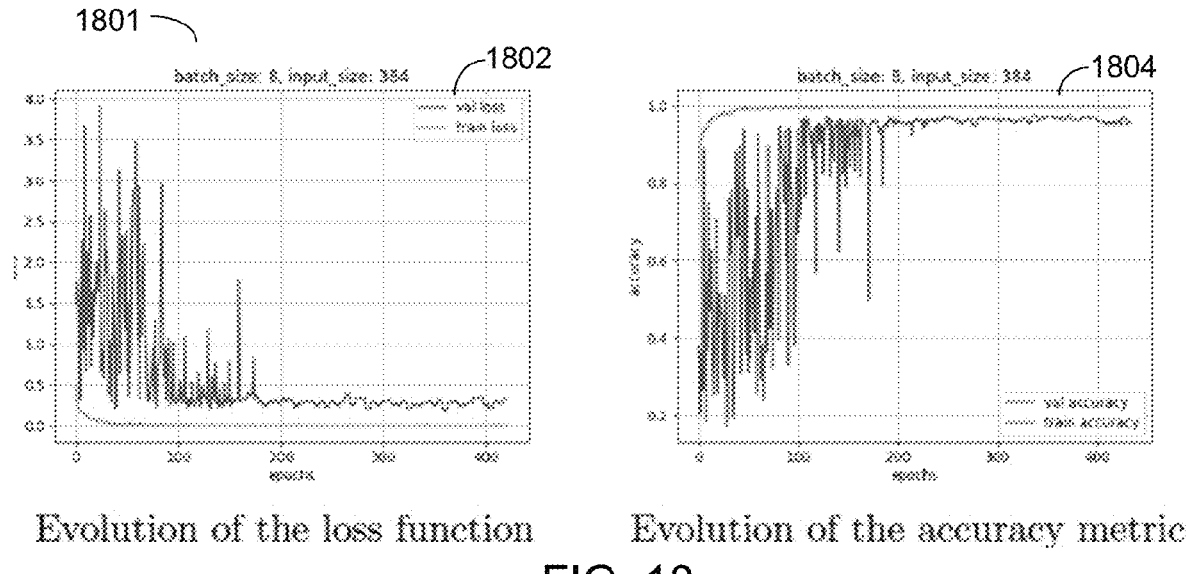
FIG. 18 are examples of performance graphs of the image quality check module in an embodiment.

Referring now to FIG. 18, therein are shown examples of performance graphs 1801 of the image quality check module 404 in an embodiment. The performance graphs 1801 include a loss function graph 1802 and an accuracy graph 1804. Regarding the loss function graph 1802 and metrics for the image quality check module 404, a Cross Entropy loss function is utilized and expressed as:

$$\text{Loss} = -\sum_{i=1}^{\substack{output \\ size}} y_i \cdot \log \hat{y}_i \qquad (4.1)$$

The loss function graph 1802 depicted in FIG. 18 is the evolution of the loss function declining as the number of epochs increases. The vertical scale of the loss function graph 1802 is a loss value as determined by equation 4.1. The horizontal scale of the loss function graph 1802 is the number of epochs used to train the image quality check module 404. A single epoch can include 40,000 to 50,000 samples of images having different quality.

The accuracy graph 1804 depicted in FIG. 18 is the evolution of the accuracy metric increasing as the number of epochs increases. The vertical scale of the accuracy graph 1804 is accuracy of the predicted value of image quality as compared to the actual quality of the input image. The horizontal scale of the accuracy graph 1804 is the number of epochs used to train the image quality check module 404.

It has been discovered that the convoluted neural network of the image quality check module 404 can maintain low loss and high degrees of accuracy of validation data after 200 epochs of training data has been processed. The stability of the validated data over the additional 200 epochs demonstrates the ability of the image quality check module 404 to properly determine the quality of the patient images 114.

Figure 19:
FIG. 19 are examples of patient images for the skin segmentation module in an embodiment.

Referring now to FIG. 19, therein are shown examples 1901 of patient images 114 for the skin segmentation module 406 in an embodiment. The example 1901 of the skin dataset depicted in FIG. 19 includes four samples of the 4516 images with smallest size of 117×99 pixels and maximum size of 5462×4096 pixels. The data set include variety in resolution images (both very close up shot to wide shot) as well as wide range of skin tone from white to darker skin. The examples 1901 included in the dataset of 4516 images are images of face and body with hair (3565), images of sick skin (667), images of nude body without hair (193), images of tattooed skin (92).

The data set was annotated by annotators using GNU Image Manipulation Program (GIMP). After annotation work, the data set was double checked to ensure that there is not error in the training set. In this example, the compute system 100 of FIG. 1, the acne diagnostic module 116 of FIG. 1, or a combination thereof performs resizing or random cropping each image to a size of 384×384 pixels and many other techniques in data augmentation to enrich the data set.

Regarding data augmentation 1401, skin segmentation module 406 can provide an optional augmentation. For training set, firstly, the compute system 100, the acne diagnostic module 116, or a combination thereof can apply random flipping, random rotating, random changing brightness then the compute system 100, the acne diagnostic module 116, or a combination thereof can apply random re-scaling, random cropping, random padding, random shifting such that finally we get output of size 384*384 pixels. The images and the masks are applied with the same augmentations. For a validation set, the compute system 100, the acne diagnostic module 116, or a combination thereof, simply resize both images and their masks to 384*384 pixels which is the size of the model's input.

Figure 20:
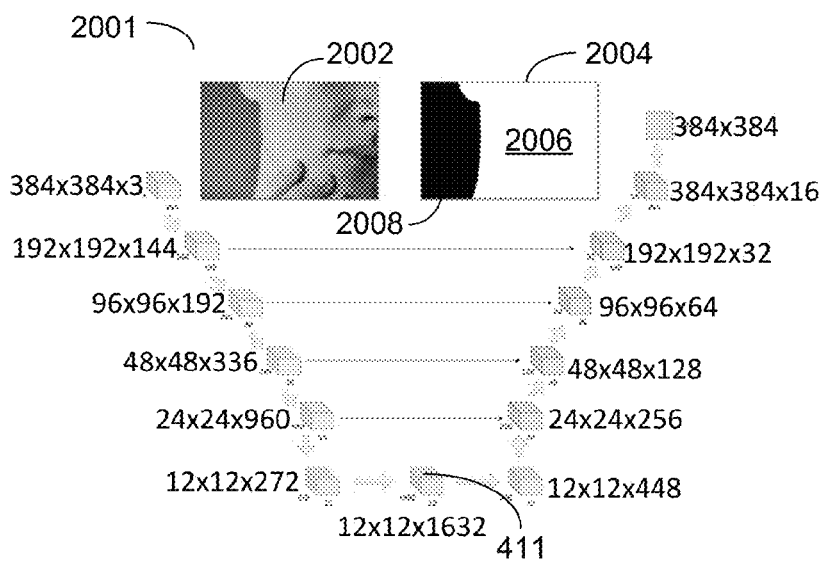
FIG. 20 is an example of a processing flow of the skin segmentation module in an embodiment.

Referring now to FIG. 20, therein is shown an example of a processing flow 2001 of the skin segmentation module 406 in an embodiment. FIG. 20 depicts an example of an implementation of the skin segmentation module 406 as a convoluted neural network with 508 layers with 25.7 million parameters.

Regarding the loss and metric to measure accuracy of the skin segmentation module 406, as an example, the metric to measure accuracy/performance of the model is Jaccard score. The Jaccard score measures the similarity between two sets of data to see which members are shared and distinct.

Regarding accuracy, the compute system 100 of FIG. 1, the acne diagnostic module 116 of FIG. 1, or a combination thereof can be was trained for 200 epochs with 4516 images in each epoch, about 80% data set is reserved for training set and the rest for validation. To measure the accuracy of the model, the metric utilized is Jaccard score:

$$J(A, B) = \frac{|A \cap B|}{|A \cup B|} \quad (5.1)$$

The Jaccard score is a value between 0 and 1. The value of 0 indicates the data sets are completely different and a value of 1 indicates the data sets are identical.

As an example, the loss function of the skin segmentation module 406 can be defined as:

$$l(y, \hat{y}) = 1 - \frac{\sum_{i,j} f_1}{\sum_{i,j} f_2} \quad (5.2)$$

$$f_1 = 1 - (1 - y_1)^k, \; f_2 = (1 - y_2)^h, \; y_1 = y\hat{y}, \; y_2 = (1 - y)(1 - \hat{y})$$

where, h=2.5, k=2.5, y is the true label and ŷ is the prediction. The sum in the formula of the loss function l is taken over two indices: index i stands for index of data sample $\{y_i\}_i$, index j stands for the component of the vector label $y_i=(y_{ij})_j$. This loss considers not only the mask (y and ŷ) but also the inverse mask (1−y and 1−ŷ). By varying parameters h, k we could have many different versions of this loss function for different purposes. For example, if we reduce k and increase h, we will increase the priority area of pixels valued 1 (standing for skin area 602) compared to area of pixels valued 0 (standing for non-skin area). In this task, we take h=k=2.5 to somehow balance priority for the skin area 602 compared to non-skin area.

The skin segmentation module 406 receives an input image 2002 in a 384×384×3 format. The image is processed to reduce 2004 the input image 2002 to a 192×192×144 format to divide the image into smaller segments in order to expose details of the image. The differentiation of skin area 2006 and the non-skin area 2008 are the result of the frame reduction process. The frame reduction process continues down to the target pixel array 411, such as the 12×12×1632 pixel array 411, then is processed through a convoluted neural network to increase the number of channels, before converging the data from 12×12×488 back to a single frame of 384×384 to differentiate the skin area 2006 and the non-skin area 2008.

Figure 21:
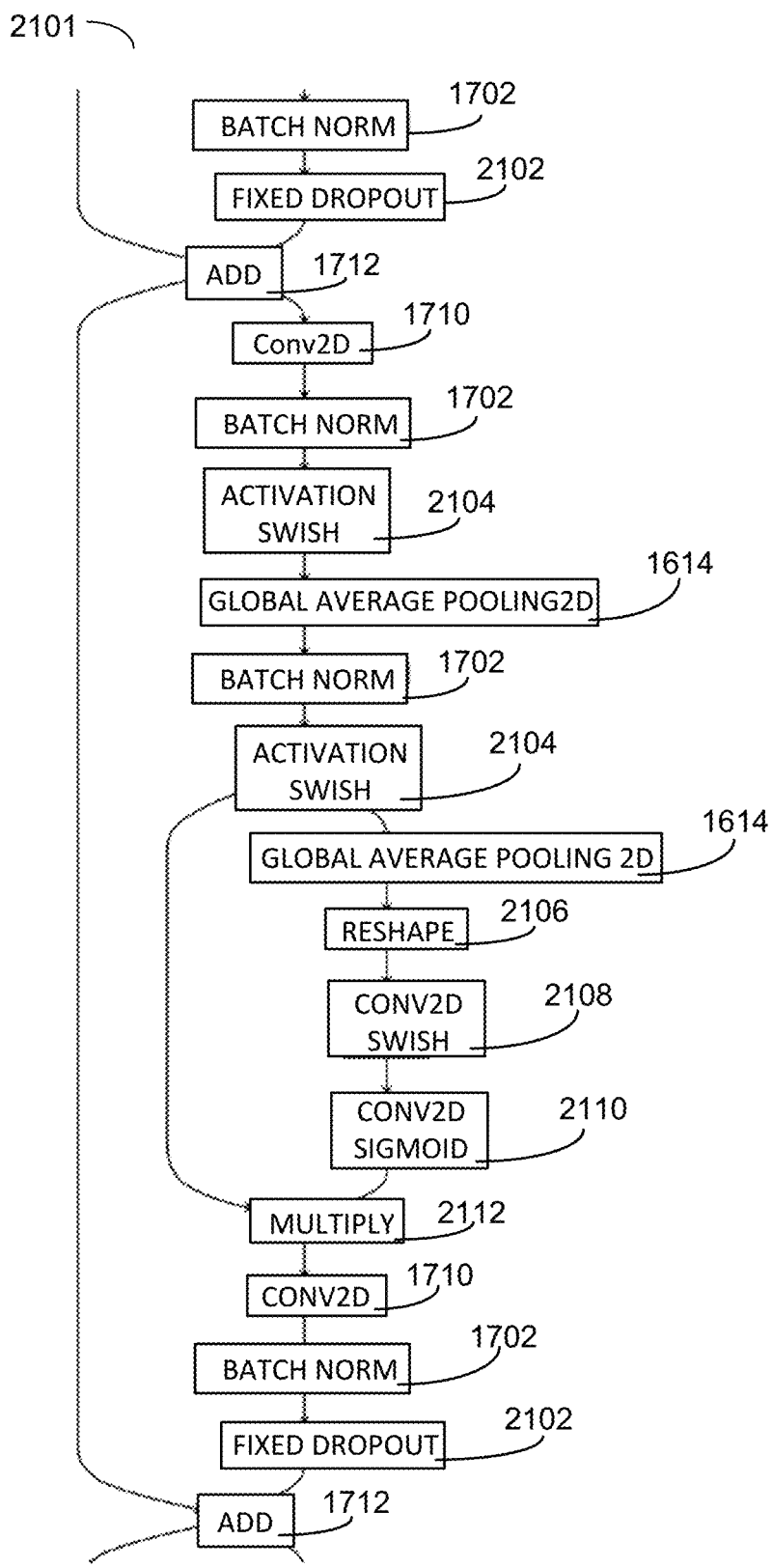
FIG. 21 is an example of a block diagram for a portion of the skin segmentation module in an embodiment.

Referring now to FIG. 21, therein is shown an example of a block diagram for a portion 2101 of the skin segmentation module 406 in an embodiment. FIG. 21 depicts the architecture of the skin segmentation module 406 including one block contains 2D convolution, batch normalization, global average pooling and a skip connection.

The batch normalization module 1702 provides a method used to make training of artificial neural networks faster and more stable. A Fixed Dropout module 2102 is a mask that nullifies the contribution of some neurons towards the next layer and leaves unmodified all others. The adder module 1712 can combine the originally processed image with the highly filtered details added. An activation/swish module 2104 is a filter that decides whether a neuron should be activated or not to decide whether the neuron's input to the network is important or not in the process of prediction using simpler mathematical operations. A reshape module 2106 will return a new tensor which will have same values as tensor in the same order, except the shape will be different. A Conv2D/Swish module 2108 is a 2D convolution of a layer with only certain elements propagated. A Conv2D/Sigmoid module 2110 is a 2D convolution of a layer with a curve flattening at the high and low extremes. A multiply module 2112 can perform matrix multiplication between the two input images.

It has been discovered that the skin segmentation module 406 can process the input image to detect and separate the skin area 2006 and the non-skin area 2008 by applying neural network processes including the Fixed Dropout module 2102, the activation/swish module 2104, the reshape module 2106, the Conv2D/Swish module 2108, the Conv2D/Sigmoid module 2110, and the multiply module 2112.

Figure 22:
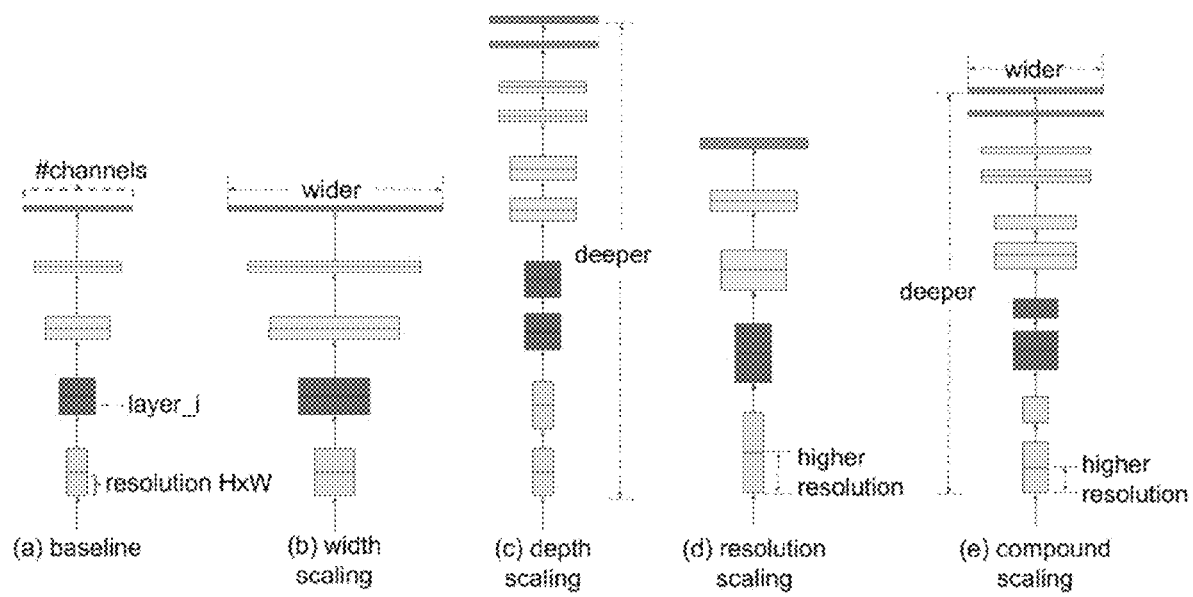
FIG. 22 is an example of functional scaling representation for a portion of the skin segmentation module in an embodiment.

Referring now to FIG. 22, therein is shown an example of functional scaling 2201 representation for a portion of the skin segmentation module 406 in an embodiment. FIG. 22 depicts an example of an implement of the skin segmentation module 406 with EfficientNet. EfficientNet is a convolutional neural network architecture and scaling method that uniformly scales all dimensions of depth, width and resolution of network resources using a compound coefficient.

The EfficientNet scaling of depth of the network can capture richer and more complex features, width of the network can capture the fine-grained features and control the ease of training, and resolution of the network can capture more fine-grained features of the patient mage 114. The EfficientNet can concurrently scale the depth, width, and resolution.

Figure 23:
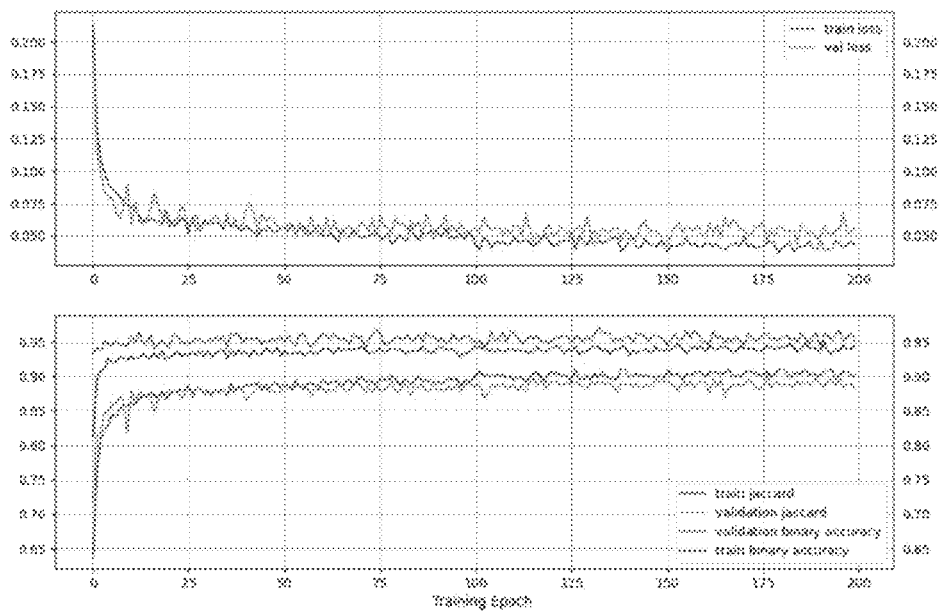
FIG. 23 is an example for the performance graphs of the skin segmentation module in an embodiment.

Referring now to FIG. 23, therein is shown an example for the performance graphs 2301 of the skin segmentation module 406 in an embodiment. As described in FIG. 21, the metric used as an example is the Jaccard score. FIG. 23 shows the performance graphs 2301, as an example, up to 200 epochs of training with 0.901 Jaccard score and binary accuracy is 0.962 for the skin segmentation module 406. FIG. 23 depicts the Jaccard score, binary accuracy and loss of the skin segmentation module 406.

Figure 24:
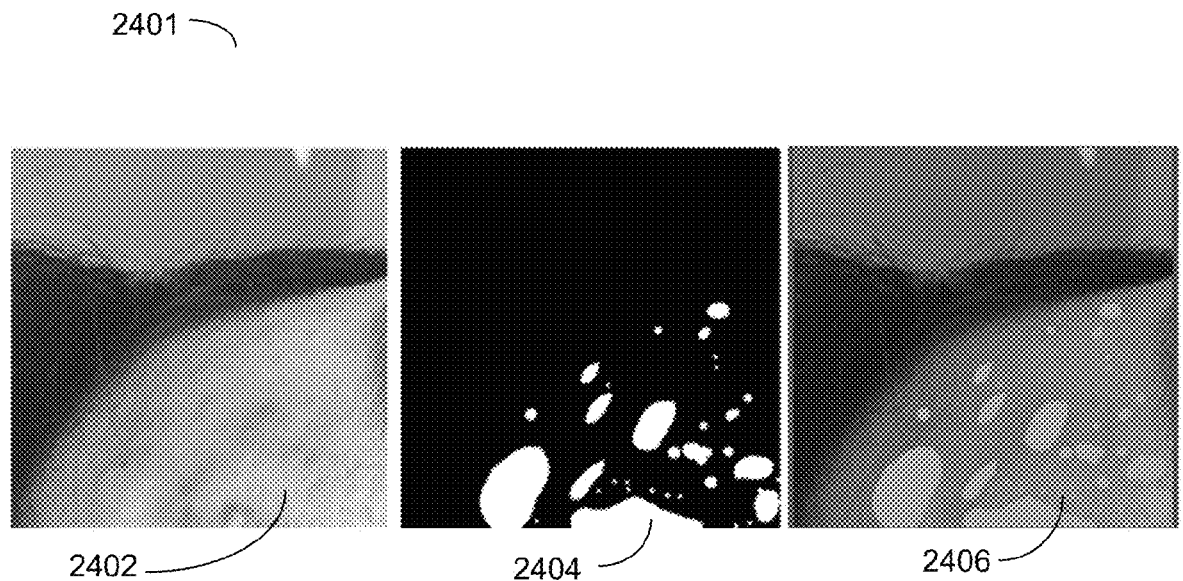
FIG. 24 is an example of process images in processing with the acne segmentation module in an embodiment.

Referring now to FIG. 24, therein is shown an example of process images 2401 in processing with the acne segmentation module 408 in an embodiment. FIG. 24 depicts an example of the acne segmentation dataset: original image 2402, derived label 2404 and composite image 2406 of the acne segmentation module 408 on the original image 2402.

Regarding the training of the acne segmentation module 408, the training dataset includes 901 images including variety in acne severity, resolution that varies from smartphone images to professional images, views that include close-up and wide shots, and skin tone including lighter skin to darker skin. These images are split into 5 folds of approximately 180 images each, where 1 fold is designated for validation and the other four for training. Since the compute system 100 of FIG. 1, the acne diagnostic module 116 of FIG. 1, or a combination thereof can segment acne and acne-like objects, the compute system 100, the acne diagnostic module 116, or a combination thereof does not required doctors to do the job. The dataset was annotated by trained annotators. The labeling strategy is as follows: For small acne like comedonal acne, papules and pustules, the annotation is a circle as the normal shape of an acne is a circle. However, for big acne like nodules and cysts, the annotation can be segmented to the exact shape of those acne. FIG. 24 shows one example in our dataset.

Regarding data augmentation 1401 for the acne segment module 408, the acne segment module 408 can apply techniques of the data augmentation 1401 to both the patient images 114 and the composite image 2406. Examples of the techniques include random rotation to an angle between −30 and 30 degrees, random flipping, random changing of brightness, random re-scaling between 0.7 to 1.3 times original size, and crop to the model size, or a combination thereof.

Figure 25:
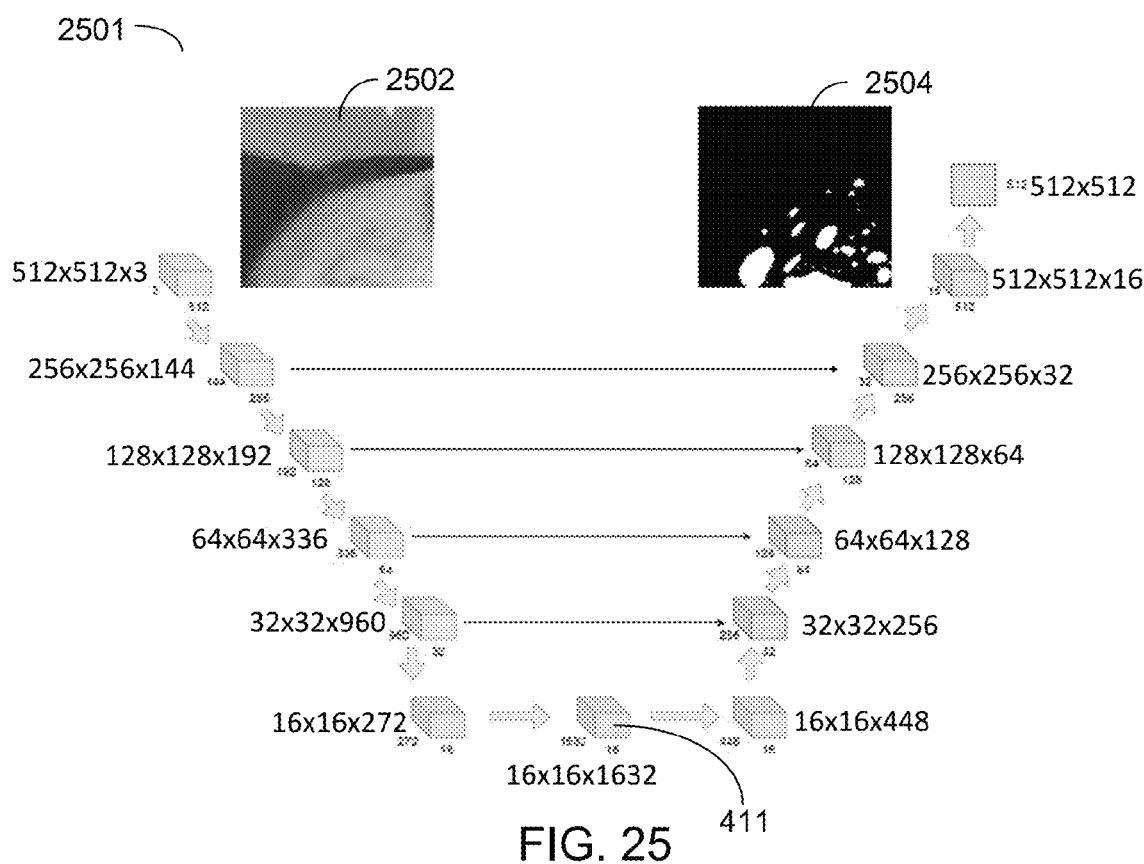
FIG. 25 is an example of a processing flow of the acne segmentation module in an embodiment.

Referring now to FIG. 25, therein is shown an example of a processing flow 2501 of the acne segmentation module 408 in an embodiment. The acne segmentation module 408 can be implemented in a number of ways. For example, the architecture of the acne segmentation module 408 can be U-Net architecture with ImageNet-pretrained EfficientNet B4 encoder. Model inputs is an RGB image 2502 of size 512×512×3. Model output is a mask 2504 of size 512×512. FIG. 25 depicts an example of the architecture as Unet with EfficientNet B4 encoder and input size 512×512×3. The RGB image 2502 can be reduced to the target pixel array 411 to create a 16×16×1632 pixel array 411 for analysis to identify the mask 2504.

Regarding loss and metric, as an example, the compute system 100 of FIG. 1, the acne diagnostic module 116 of FIG. 1, the acne segmentation module 408, or a combination thereof can utilize T-loss function for training and Jaccard score for validation. The T-loss function is defined by:

$$L(y, \hat{y}) = 1 - \frac{1 - (1 - y\hat{y})^k}{(1 - (1 - y)(1 - \hat{y}))^h} \quad (6.1)$$

This loss considers not only the mask (y and ŷ) but also the inverse mask (1−y and 1−ŷ). By varying parameters h, k we could have many different versions of this loss function for different purposes. For example, if we reduce k and increase h, we will increase the priority area of pixels valued 1 compared to area of pixels valued 0. In this task, we take h=k=2.5 to balance priority for the 0 and 1 valued area.

Regarding the validation, the compute system 100, the acne diagnostic module 116, the acne segmentation module 408, or a combination thereof can perform the validation with k-fold cross validation with k=5. The acne segmentation module 408 can be trained on 2 different folds. The final model is the average of the two trained ones, that is, the final prediction is the average of the predictions of the two trained models.

Figure 26:
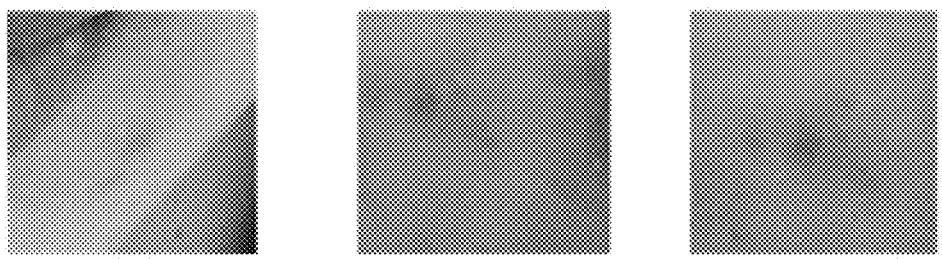
FIG. 26 are examples of input images for processing by the acne segmentation module in an embodiment.

Referring now to FIG. 26, therein are shown examples of input images 2601 for processing by the acne segmentation module 408 in an embodiment. FIG. 26 can depict patient images 114, a portion of the patient images 114, a cropped portion of the patient images 114, or a combination thereof. The compute system 100 of FIG. 1, the acne diagnostic module 116 of FIG. 1, the acne segmentation module 408, or a combination thereof can process the patient images 114 as shown in FIG. 26 that can have many acne in each of the patient images 114. For example, the acne segmentation module 408 can focus on the acne at the center of the image. The input images 2601 are 128×128 pixels in size.

Figure 27:
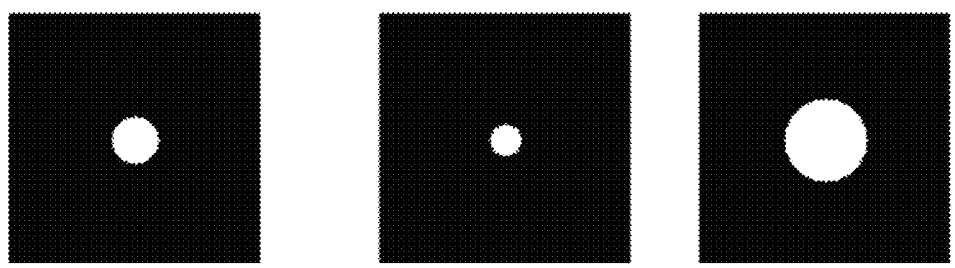
FIG. 27 are examples of region of interests for processing by the acne classification module in an embodiment.

Referring now to FIG. 27, therein are shown examples of regions of interest 2701 for processing by the acne classification module 412 in an embodiment. FIG. 27 depicts examples of corresponding images for the regions of interest 2701 to the RGB images shown in FIG. 26.

Figure 28:
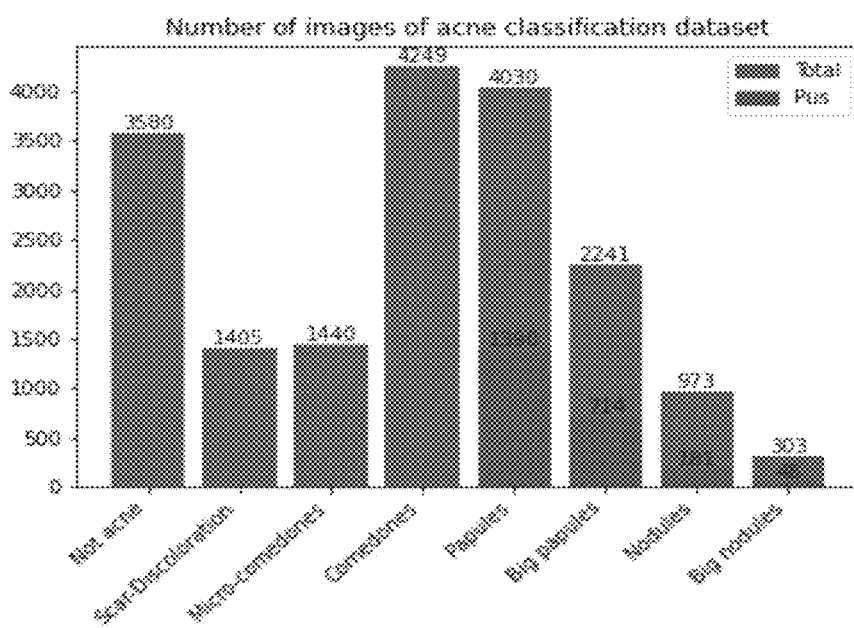
FIG. 28 is an example of a distribution graph of the images processed in an embodiment.

Referring now to FIG. 28, therein is shown an example of a distribution graph 2801 of the images processed in an embodiment. The distribution graph 2801 is an example of the images processed for training the acne classification module 412. In this example, the acne classification module 412 can be trained on 12682 images. The distribution graph 2801 of types of acne and pus information is shown in FIG. 28. The compute system 100 of FIG. 1, the acne diagnostic module 116 of FIG. 1, the acne classification module 410, or a combination thereof take the average score as our ground truth. In the example of the data set shown in FIG. 28, there is a wide range of severity of acne, from scar (non-acne) to very severe acne (severe nodule/cyst). Further in the example, distribution depicts the number of images in each class in our dataset. In the distribution classification, the images are defined pustule as a papule with pus. Similarly for cyst, it is nodule with pus.

Regarding data augmentation 1401 to improve the training of the acne classification module 412, some techniques of the data augmentation 1401 to increase the number of data. Since the images and regions of interest come from previous acne segmentation module 408, they are already square, so the step of cropping the image to make it square is skipped for this model. For the training images, we first randomly re-scale and rotate both image and regions of interest, before resizing the two inputs to the model size (128×128), then we apply one of these 3 augmentations: horizontal flip, vertical flip or combination of both with a probability p=0.75. Finally a Gaussian blur with a probability p=0.5 and brightness with a coefficient randomly chosen (between 0.8 and 1.1) is applied to the image. For the validation data, none of these augmentations were applied, we only resized to the model size the images and regions of interest.

Figure 29:
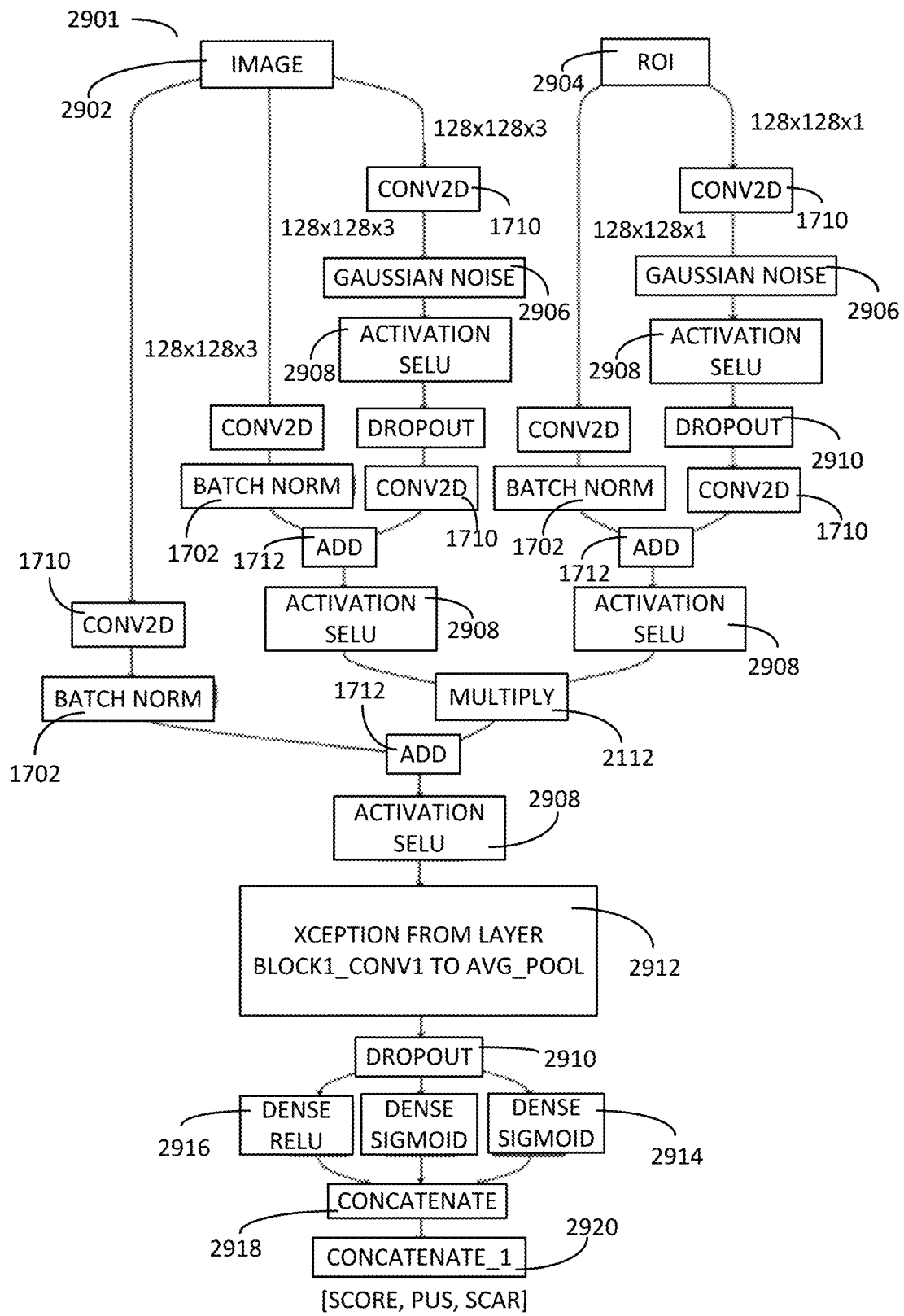
FIG. 29 is an example of a block diagram for a portion of the acne classification module in an embodiment.

Referring now to FIG. 29, therein is shown an example of a block diagram 2901 for a portion of the acne classification module 412 in an embodiment. The example shown in FIG. 29 provides a block diagram 2901 of a model structure and layers or the acne classification module 412. As described earlier, in order to train the acne classification module 412 to focus or identify on the centered lesion, the training dataset include both image 2902 and regions of interest 2904 as inputs of the acne classification module 412. The training approach for this problem is as a regression not classification. The reason for this training approach is that doctors classify acne differently, especially for middle acne (severe comedonal or mild papule, severe papule or mild nodule). As the result, a scoring system for the compute system 100 of FIG. 1, the acne diagnostic module 116 of FIG. 1, the acne classification module 412, or a combination thereof for calibrating the acne score 430 of FIG. 4 from 0 to 5 based on scar and mole or non-acne marks rated as 0; microcomedonal, comedonal rated from 1 to 2 depending on the size of the acne: papule, pustule rated from 2 to 4 depending on the size of the acne: nodule, cyst rated from 4 to 5 depending on the size of the acne. Compiling the acne score 430 includes accumulating the values from 0 to 5 based on the acne type 413 of FIG. 4 severity grading of the acne pimples 409.

As an example, the outputs are the severity score, the presence of pus, and the presence of acne scar. As a specific example, the first output has a reLU activation function and the corresponding values are between 0 for non-acne lesion and 5 for cyst. The two other outputs have a sigmoid activation function as the cases are binary: presence (1) or absence (0) of pus in the lesion, same logic applies to the acne scar output. The base architecture is similar to the Xception architecture. The specific example of the structure of the model is shown in FIG. 29. It counts with more than 20M parameters and 162 layers.

The acne classification module 412 has an image entry 2902, which receives the output from the acne segmentation module 408, and a region of interest entry 2904, which receives the regions of interest 2701 from the acne segmentation module 408. Each of the entry points process in substantially the same channels including the Conv2D 1710, a gaussian noise module 2906, an activation SELU 2908, a dropout module 2910, the batch normalization 1702, and the adder 1712. The two channels are merged through the multiply module 2112 and added to an enhanced version of the image 2902 by the adder 1712.

An Xception module 2912 is a convolutional neural network that is 71 layers deep. The Xception module 2912 can load a pretrained version of the network trained on more than a million images from the ImageNet database. The pretrained network, of the Xception module 2912, can classify images into 1000 object categories. A dropout module 2910 can selectively eliminate specific nodes in a neural network. A dense sigmoid module 2914 is a layer activation function that can enable layers to the neural network. A dense ReLU module 2916 is a layer adding function for a neural network. A concatenate module 2918 can assemble multiple layers into a single layer. A concatenate_1 module 2920 can output a highlighted layer in the previously assembled layer.

Figure 30:
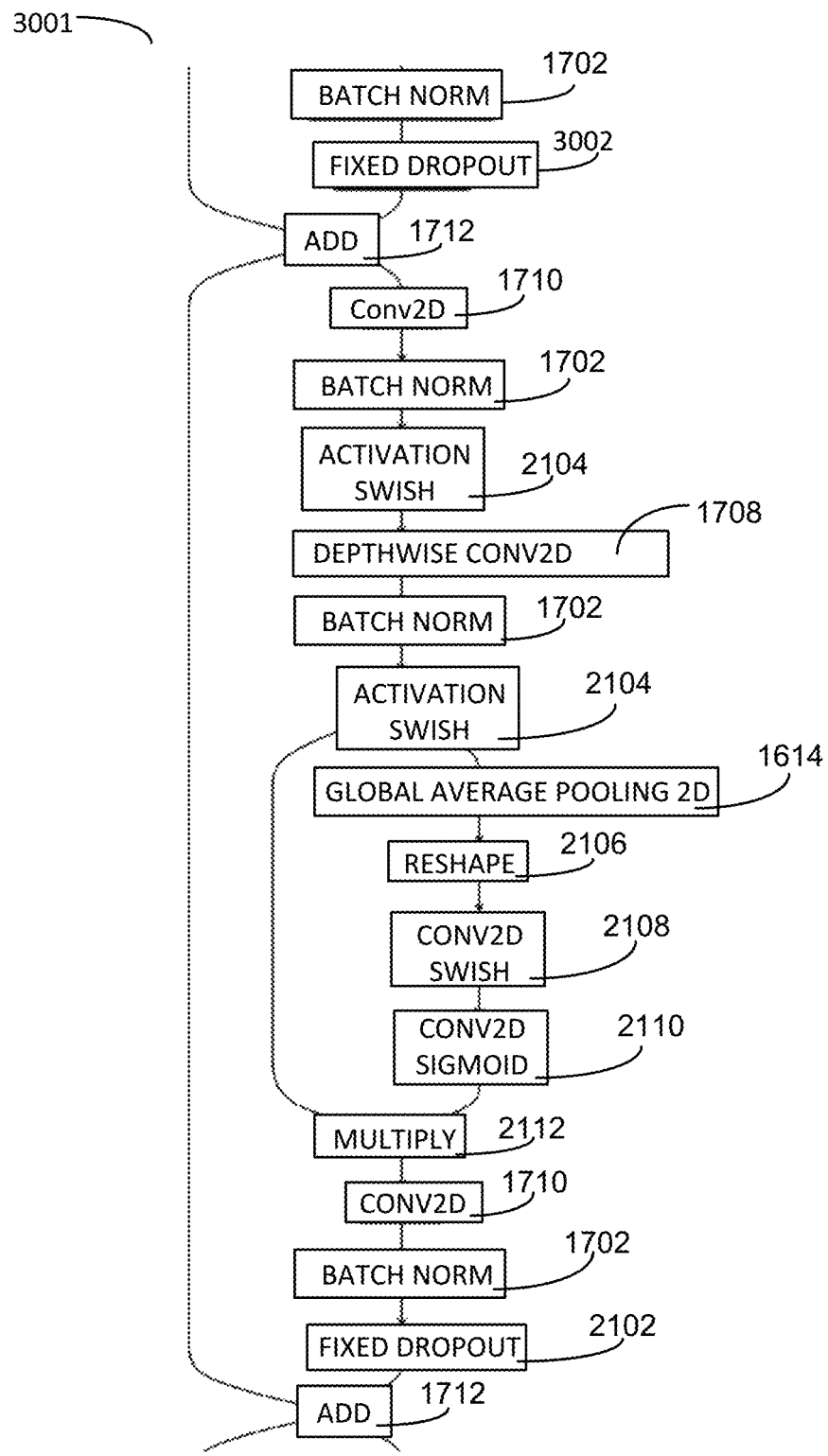
FIG. 30 is an example of a block diagram for a portion of the acne classification module in an embodiment.

Referring now to FIG. 30, therein is shown an example of a block diagram 3001 for a portion of the acne classification module 412 in an embodiment. FIG. 30 depicts an example of a zoom in of the architecture of the acne classification module 412. A Fixed Dropout module 3002 is a mask that nullifies the contribution of some neurons towards the next layer and leaves unmodified all others. As a specific example, FIG. 30 depicts one block contains 2D convolution 1710, batch normalization 1702, global average pooling 1614 and a depthwise conv2D 1708. The depthwise conv2D 1708 is a type of convolution in which each input channel is convolved with a different kernel (called a depthwise kernel).

Figure 31:
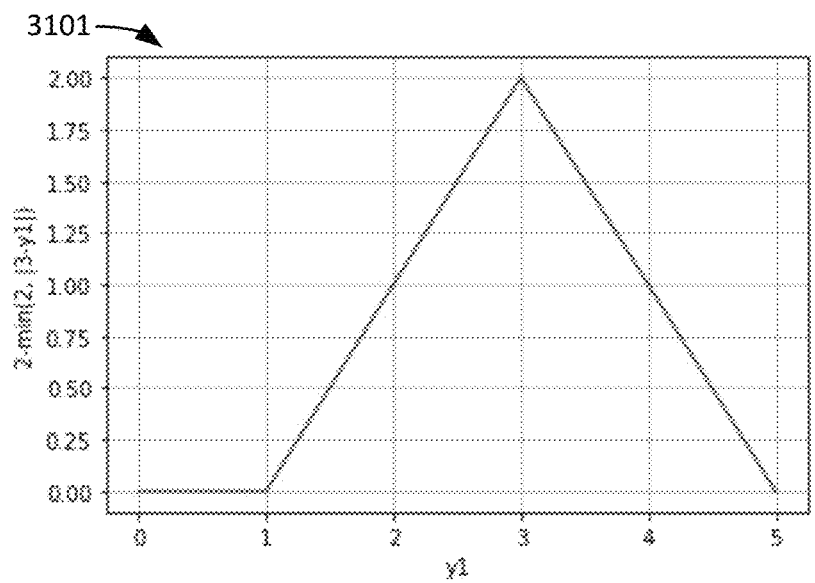
FIG. 31 is an example for the performance graph of the acne classification module in an embodiment.

Referring now to FIG. 31, therein is shown an example for the performance graph 3101 of the acne classification module 412 in an embodiment. Regarding loss and metric for the acne classification module 412, the loss function can be implemented in a number of ways. As an example, the loss function is implemented to handle the different types of outputs of the model using a combination of three losses, defined as follows:

$$L(Y, \hat{Y}) = MSE(y_1, \hat{y}_1) \quad (7.1)$$
$$+ BCE(y_3, \hat{y}_3)$$
$$+ F(Y, \hat{Y})$$

Where $Y=(y_1, y_2, y_3)$ is the true label and $\hat{Y}=(\hat{y}_1, \hat{y}_2, \hat{y}_3)$ is the prediction, $y_1, y_2, y_3$ stand for each output, that is respectively score, pus, and scar. MSE is the mean square error, and BCE the binary cross-entropy. The function F, defined for our purpose is given by the following formula:

$$F(Y, \hat{Y}) = \quad (7.2)$$
$$-\frac{1}{n}\sum_{i=1}^{n}(y_{2i}\log(\hat{y}_{2i}) + (1-y_{2i})\log(1-\hat{y}_{2i})) \times (2 - \min(2, |3-y_{1i}|))$$

F corresponds to the reduced sum over all samples of the BCE for output pus, multiplied by a term that depend on the true score of the sample. This term allows the compute system 100, the acne diagnostic module 116, the acne classification model, or a combination thereof to only include this loss where the severity score of the lesion is high enough to consider the pus information.

Describing the different terms of this loss, the first term is the loss for the severity score of each lesion. In other words, the first term addresses regression problem, and a reasonable selection or option to select the MSE loss for the optimization of this output. The second term is the loss for scar classification, which addresses a binary classification problem. The third term is a modified BCE for pus classification. As for scar classification, a classical loss to use would be the BCE, but in the case of pus, this output is linked to the severity of the acne.

Continuing the example, if the acne lesion is too small and benign, as with micro-comedones and comedones (acne lesions with severity score≤1), the pus information is not relevant, the compute system 100 of FIG. 1, the acne diagnostic module 116 of FIG. 1, the acne classification module 412, or a combination thereof should not be taken into account in the loss value. On the other hand, when the acne lesion is too severe, i.e. it is a cyst (severity score=5), by definition the lesion is filled with pus, so the pus information neither is relevant in that case. In this context, to avoid penalizing the acne classification module 412 when it is not necessary, the function F, that takes the value 0 when the severity score ($y_1$) is not strictly between 1 and 5. That is possible using the term $(2-\min(2, |3-y_1|))$ as the graph of this function depicted in FIG. 31. The selection of this term is not unique, only condition being to take the value 0 outside the interval (0, 5), but it allowed the acne classification module to reach a good performance of the model.

As an example, the compute system 100, the acne diagnostic module 116, the acne classification model 412, or a combination thereof utilizes sum these three terms with no extra coefficient before each, meaning that same weight to each output. The training process also selected several coefficients without increasing the performance of the model. Another example is to add more importance to one specific output, regarding new data or new purposes. The metric for the Mean Average Error as in Equation 2.1. The MAE provides an indication how far from the true values the predictions are, either in term of severity score and pus and scar classification. On the validation set, the MAE is on average 0.125.

Regarding validation, in order to measure the performance of our model the compute system 100, the acne diagnostic module 116, the acne classification module 412, or a combination thereof utilizes k-fold Cross-Validation to split our data into 5 sub-samples equally distributed. The validation data corresponds to one of the five sub-samples meanwhile the four others are used as training data. Two models have been trained with different folds for more than 1200 epochs and tested using this technique. For each epoch, 20 000 images were seen by the models. The final model selected as prediction is the average of the two trained models.

Figure 32:
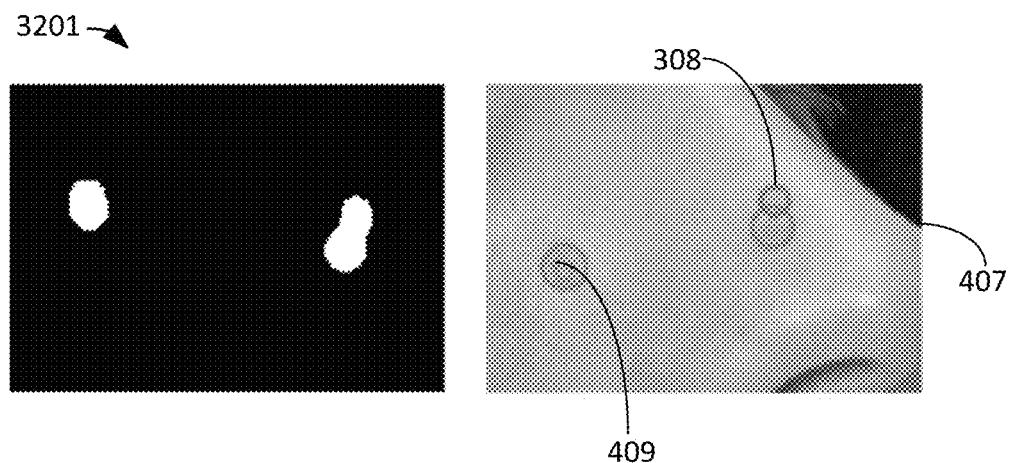
FIG. 32 is an example of a processing of the acne separation module in an embodiment.

Referring now to FIG. 32, therein is shown an example of a processing 3201 of the acne separation module 410 of FIG. 4 in an embodiment. FIG. 32 depicts the processing by the acne separation module 410 with images where acne right next to the other be segmented as one. As an example, the acne separation module 410 can utilize geometrical methods and some mathematical analysis to separate the acne pimples 409 and classify them individually.

The segmented image 407 can be augmented with the markers 308 identifying the location and radius of each of the acne pimples 409. The acne classification module 412 of FIG. 4 can identify the acne type 413 of FIG. 4 in order to support the assembly of the user interface display 301 of FIG. 3.

Figure 33:
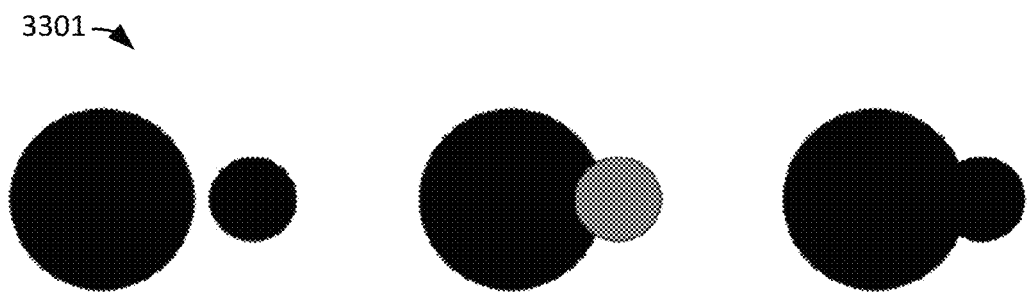
FIG. 33 is an example of a processing of different locations by the acne segmentation module in an embodiment.

Referring now to FIG. 33, therein is shown an example of a region of interest processing 3301 of different locations by the acne separation module 410 in an embodiment. In this example, the working premise can be that the shape of acne is circular. The compute system 100 of FIG. 1, the acne diagnostic module 116 of FIG. 1, or a combination thereof can annotate an acne by a circle that is a minimum circle that cover all of the acne.

Continuing with the example from FIG. 32 and FIG. 33, the acne segmentation module 410 can be trained with the dataset with the circle. The acne segmentation module 410 can be segment by a circle. In this example depicted din FIG. 32, the two acne shown are close to each other and returns 2 overlay circles as depicted in FIG. 33.

As a specific example, in the case of two acne next to the other depicted in FIG. 33, the acne segmentation module 406 can segment two overlapping circles. First example shown in FIG. 33 is two separated acne. The second example shown in FIG. 33 is two overlapping acne presented in different colors. The third example shown in FIG. 33 is how the prediction looks like in case of two overlapping acne.

Figure 34:
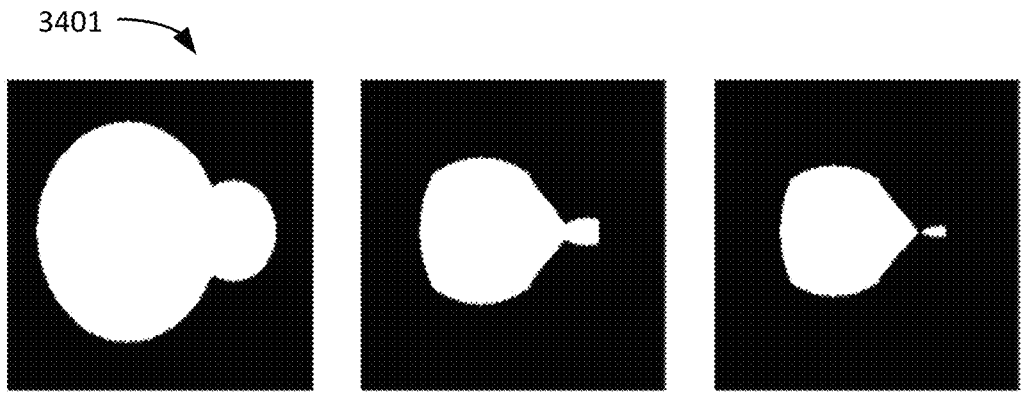
FIG. 34 is an example of a stage of processing by the acne separation module in an embodiment.

Referring now to FIG. 34, therein is shown an example of a stage 3401 of processing by the acne separation module 410 in an embodiment. The acne separation module 410 can be implemented in a number of ways.

For example, a multi-step process can be implemented. The acne separation module can determine whether the given region is made by one or more small circles. The output of the determination step is either nothing (in case of one circle) or at least two smaller regions. FIG. 34 show the result of the determination step of the above example. As a specific example, the output of the determination is two smaller regions. In FIG. 34, the image in the left is input, the middle image is the result during the process and the last one is the output.

Figure 35:
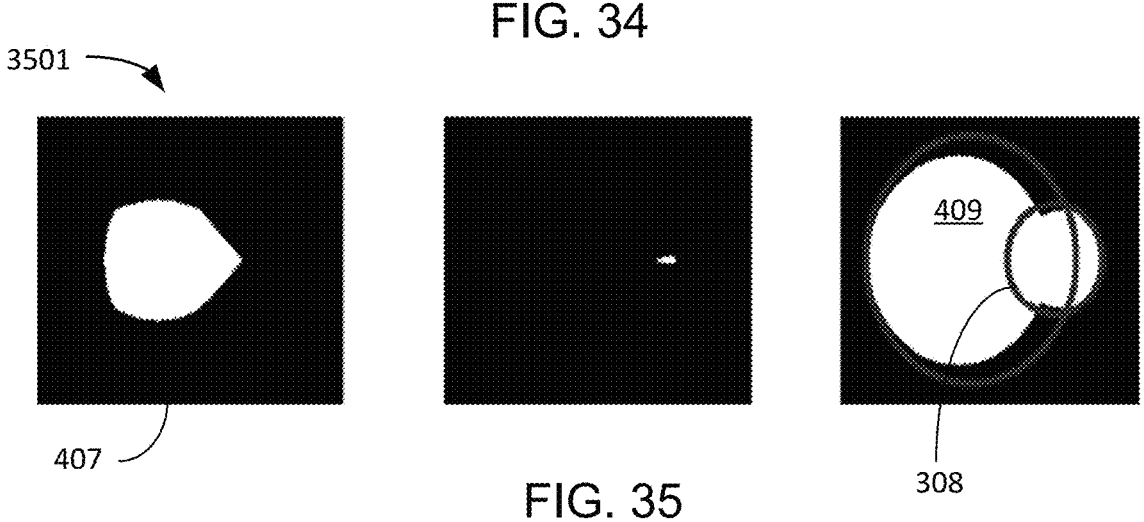
FIG. 35 is an example of a further stage of processing by the acne separation module in an embodiment.

Referring now to FIG. 35, therein is shown an example of a further stage 3501 of processing by the acne separation module 410 in an embodiment. Continuing with the example from the determination process, a determination process for the small regions can also be applied. The determination process can repeat until a determination process returns empty for the output regions.

FIG. 35 depicts an example for two smaller regions give the two smaller regions given in the earlier figure and depicts how the result look on the original image. As a specific example, after applying the step one for each output (the image on the left and the middle one), the acne separation module generates the segmented image 407 identifying a plurality of the acne pimple 409 that are adjacent by applying a marker 308 on each of the plurality of the acne pimple 409 with overlapping of the markers 308, as shown in the result as the image on the right. The following are our pseudocode algorithm 1 and 2.

---

Algorithm 1 To determine whether this is a region
or more. Return new regions and radius Input = contour, shape of image, Outputs = contours, r_accumulate
s = min_area, t = draw_thickness, r_accumulate = 0
img = draw_contour(contour, thickness = fill)
a = area(contour)

---

-continued

Algorithm 1 To determine whether this is a region
or more. Return new regions and radius if a ≤ s then return [ ], 0
else
  contours = find_contour(img)
  while length(contours) == 1 do
    make contour thinner with amount t
    r_accumulate += t
    contours = find_contour(img)
  end while
end if
if length(contours) == 0 or 1 then return [ ], 0
else
  return contours, r_accumulate
end if

---

Algorithm 2 To find all center and radius of acne on a given image

Input = image, Outputs = centers_list, radius_list
contours_list = find_contour(image)
regions_list = [ ]
radius_did_list = [ ]
for contour ∈ contours_list do
  a = area(contour)
  temp_contour_list = [ ]
  temp_r = [ ]
  small_regions, radius = Algorithm$_1$(contour,image_shape)
  if length(small_regions) == 0 then
    regions_list += small_regions
    radius_did_list += radius
  else
    for region ∈ small_regions do
      temp_contour_list += region
      temp_r += radius
    end for
    while length(temp_contour_list) != 0 do
      sub_contour = temp_contour_list[0]
      sub_r = temp_r[0]
      small_regions, radius = Algorithm$_1$(sub_contour,image_shape)
      if length(small_regions) == 0 then
        regions_list += small_regions
        radius_did_list += radius
      else
        temp_contour_list += sub_contour
        temp_r += radius + sub_r
      end if
      Delete temp_contour_list[0], temp_r[0]
    end while
  end if
end for
centers_list = [ ]
radius_list = [ ]
for region, radius_did ∈ zip(regions_list, radius_list) do
  center, radius = minEnclosingCircle(region)
  centers_list += center
  radius_list += radius + radius_did
end for
return centers_list, radius_list

---

The acne area score module process inputs from the skin segmentation module, the acne segmentation module, the acne classification module, or a combination thereof along with the processing by the acne separation module. The pseudocode is as below Algorithm 3 and 4.

| Algorithm 3 To compute the area of each acne |
|---|
| Input = Center and Radius, Acne segmentation, Outputs = area<br>acne = draw_circle(Center, Radius)<br>acne = acne ∩ acne_segmentation<br>a = area(acne)<br>return a |

| Algorithm 4 To compute the area of each type of acne |
|---|
| Input = Acne classification, Acne segmentation<br>Outputs = area_list<br>area_list = [ ]<br>for list_of_acne ∈ Acne_classification_output do<br>    acne = zeros_like(image_shape)<br>    for Center, Radius ∈ list_of_acne do<br>        draw_circle(Center, Radius)<br>    end for<br>    acne = acne ∩ acne_segmentation<br>    a = area(acne)<br>    area_list += a<br>end for<br>return area_list |

Figure 36:
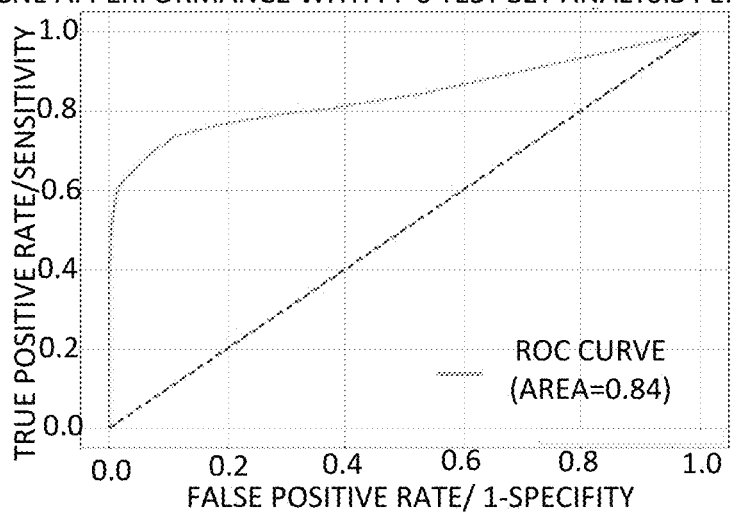
FIG. 36 is an example of the performance graph of the compute system with acne diagnostic mechanism in an embodiment.

Referring now to FIG. 36, therein is shown an example of the performance graph 3601 of the compute system with acne diagnostic mechanism 116 of FIG. 1 in an embodiment. FIG. 36 depicts an example of an embodiment with ROC. The ROC curve is for classification of inflammation vs non-inflammation acne. Area under the curve (AUC) 0.84 (over 1.00) FIG. 36 in image case where the compute system 100 of FIG. 1, the acne diagnostic module 116 of FIG. 1, or a combination thereof can compute the average true positive rate (TPR) and false positive rate (FPR) for each image and aggregate them to compute AUC.

Figure 37:
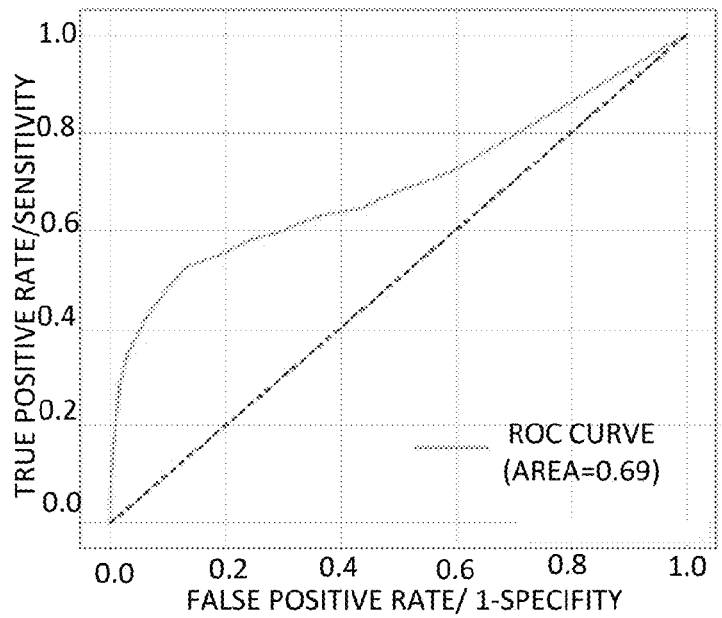
FIG. 37 is an example of the further performance of the compute system with acne diagnostic mechanism in an embodiment.

Referring now to FIG. 37, therein is shown an example of the further performance graph 3701 of the compute system 100 of FIG. 1 with acne diagnostic mechanism in an embodiment. FIG. 37 depicts an example with the receiver operating characteristic (ROC) curve in a lesion analysis where each acne is treated independently. In the lesion case where the compute system 100, the acne diagnostic module 116 of FIG. 1, or a combination thereof treat each acne independently. FIG. 37 depicts an example with the area under the curve (AUC) equal to 0.69. The AUC indicates the ability to diagnose patients with and without the disease or condition based on the test, where 0.5 suggests no discrimination, 0.7 to 0.8 is considered acceptable, 0.8 to 0.9 is considered excellent, and more than 0.9 is considered outstanding. The reason the compute system 100, the acne diagnostic module 116, or a combination thereof computes the AUC score in two cases is that in some image, the quality is not good so the investigators may make mistakes. If the mistakes are on a bad quality image and those images have a high number of acne, the overall score is affected too much.

Figure 38:
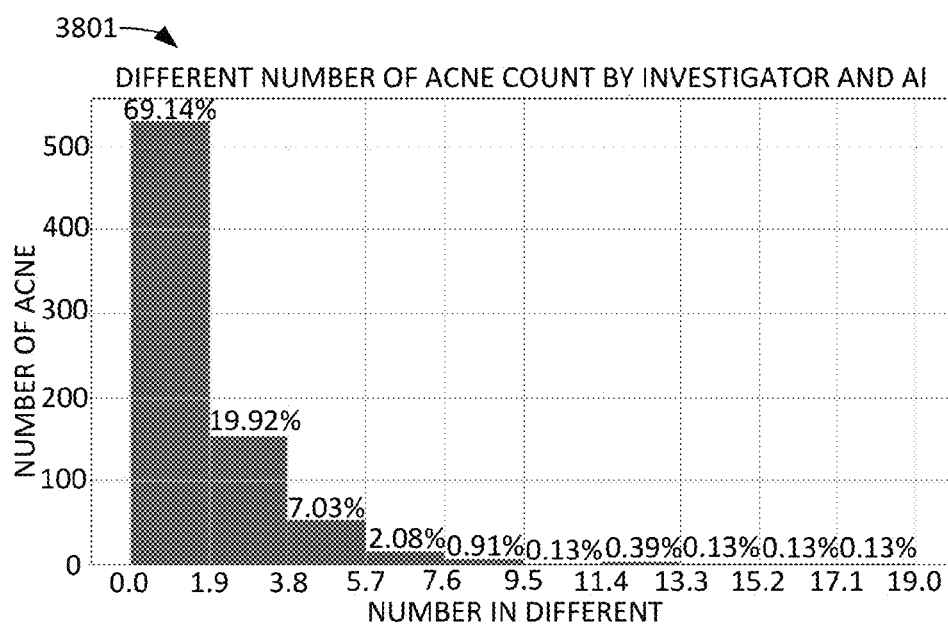
FIG. 38 is an example of the yet further performance graph of the compute system with acne diagnostic mechanism relative to investigators in an embodiment.

Referring now to FIG. 38, therein is shown an example of the yet further performance graph 3801 of the compute system 100 of FIG. 1 with acne diagnostic mechanism relative to investigators in an embodiment. FIG. 38 depicts an example where the different number in acne count between acne AI 118 of FIG. 1 and investigators is compared. FIG. 38 depicts an example as a histogram plot, where 89.06% images have a difference in acne count less than 2 and 96.09% images have the difference less than 3. For each image, the compute system 100, the acne diagnostic module 116 of FIG. 1, or a combination thereof can count the number of acne by acne AI 118 and by investigator and then compare the different in number in these two. In all cases the acne AI 118 is more capable than the investigators.

Figure 39:
FIG. 39 is an example chart of the classification and number of acne in an embodiment.

Referring now to FIG. 39, therein is shown an example chart 3901 of the classification and number of acne in an embodiment. FIG. 39 depicts the example chart 3901, that classifies the level of acne based on number of acne (does not take into account the type of acne). In an example of a public dataset ACNE04, ANCE04 includes 1457 images, 18,983 lesions (number of lesions labeled by experts), images classified by acne severity (level 0 mild indicated in blue, level 1 moderate indicated in green, level 2 severe indicated in brown, level 3 very severe indicated in tan), corresponding to the number of acne lesions on the image being analyzed, 95.09% of labeled lesions detected by the compute system 100, the acne diagnostic module 116, or a combination thereof.

Analysis of the ACNE04 dataset, the compute system 100, the acne diagnostic module 116, or a combination thereof determined that bounding boxes from experts are not lesion centered and/or too big with respect to the lesion; sometimes lesions are in the same bounding box; lesion are sometimes missed by experts; some images are low quality; and some images are not acne.

Figure 40:
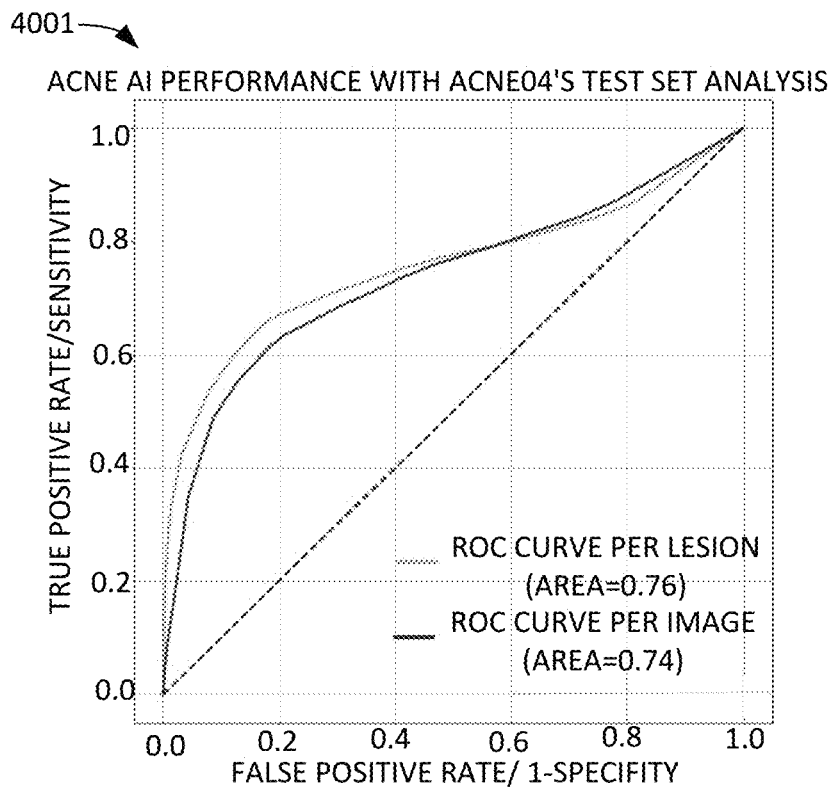
FIG. 40 is an example of another performance graph of the compute system with acne diagnostic mechanism in an embodiment.

Referring now to FIG. 40, therein is shown an example of another performance graph 4001 of the compute system 100 of FIG. 1 with acne diagnostic mechanism in an embodiment. FIG. 40 depicts an example of ROC curve representing the True Positive (TP) rate in function of the False Positive (FP) rate for different thresholds of classification. Higher the AUC (Area Under the Curve) is better as the classifier. The example depicts ROC curve based on TP 0.67, where the acne diagnostic mechanism detects a labeled lesion, and FP 0.19 where the acne diagnostic mechanism detects something but it is not a labeled lesion.

The high FP rate can be explained by the fact that some of the acne are not labeled in the dataset but the acne diagnostic mechanism still detects it, showing good performance. The not so high TP rate show that the acne diagnostic mechanism missed some lesions which is a weakness. However, it is also partially due to the annotations of the experts, who sometimes consider scar or discoloration as acne. The acne diagnostic mechanism performs well in detection when the lesion is not completely flat but elevated.

Figure 41:
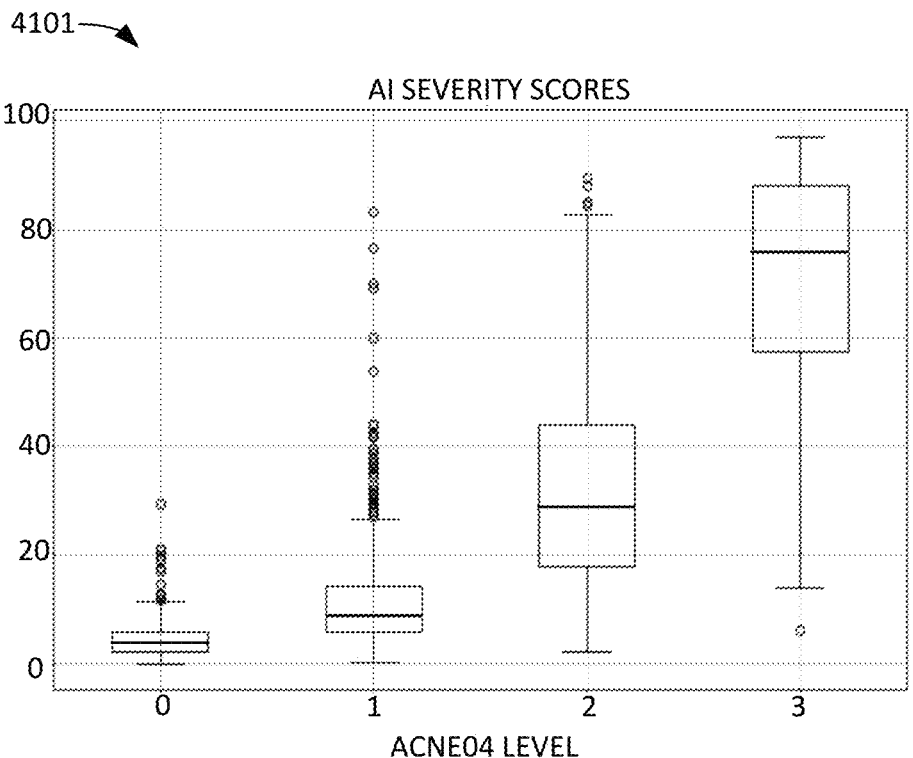
FIG. 41 is an example of a graphical representation of severity scores of the compute system with the acne diagnostic mechanism in an embodiment.

Referring now to FIG. 41, therein is shown an example of a graphical representation of severity scores 4101 of the compute system 100 of FIG. 1 with the acne diagnostic mechanism 426 of FIG. 4 in an embodiment. ACNE04 dataset has 4 levels of severity and the acne AI 118 of FIG. 1 of the acne diagnostic module 116 gives a continuous severity score for each image with a value from 0 to 100. ICC 0.74 with 95% CI [0.72, 0.77].

FIG. 41 shows the boxplots of AI severity 4101 of images given their ACNE04 severity level. The AI severity increases following the ACN04 severity level. For level 0, AI severity is low, and for level 3, severity is high. Other observation is that the dispersion of values is more important for higher levels. This can be explained because ACNE04 level of severity only depends on the number of lesions while our severity is calculated using the number, size and type of acne (comedones, cysts, papules, etc.).

Figure 42:
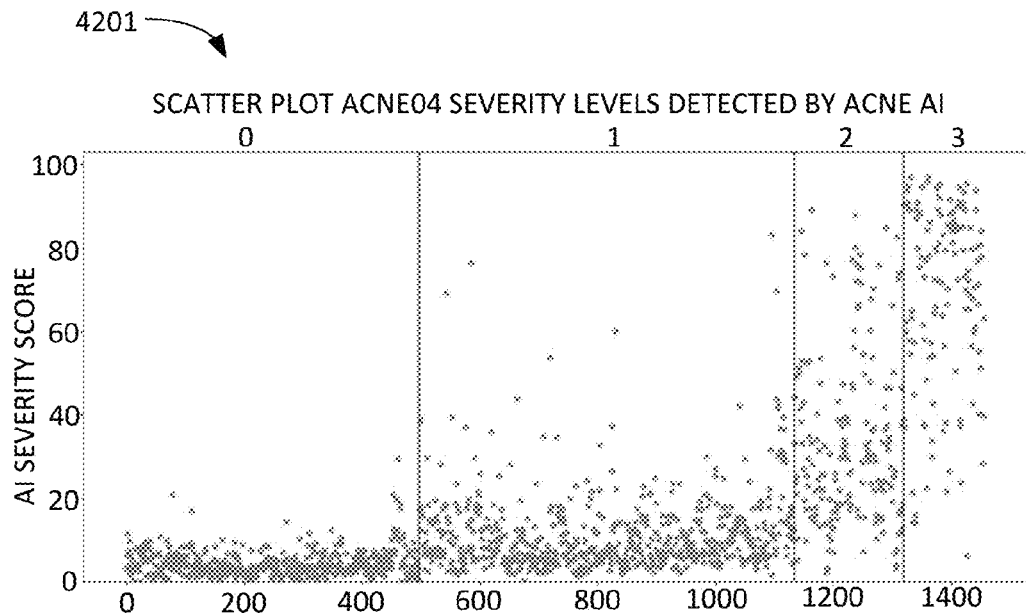
FIG. 42 is an example of a further graphical representation of severity scores of the compute system with acne diagnostic mechanism in an embodiment.

Referring now to FIG. 42, therein is shown an example of a further graphical representation of severity scores 4201 of the compute system 100 of FIG. 1 with acne diagnostic mechanism in an embodiment. FIG. 42 depicts an example of a scatter plot on the severity level by ACNE04 (value from 0-3) and severity detected by Acne AI 118 of FIG. 1

(value from 0-100). FIG. 42 depicts the severity 0 by ACNE04, severity detected by Acne AI 118 is low and in the severity 3 by ACNE04, severity detected by Acne AI 118 is high.

Figure 43:
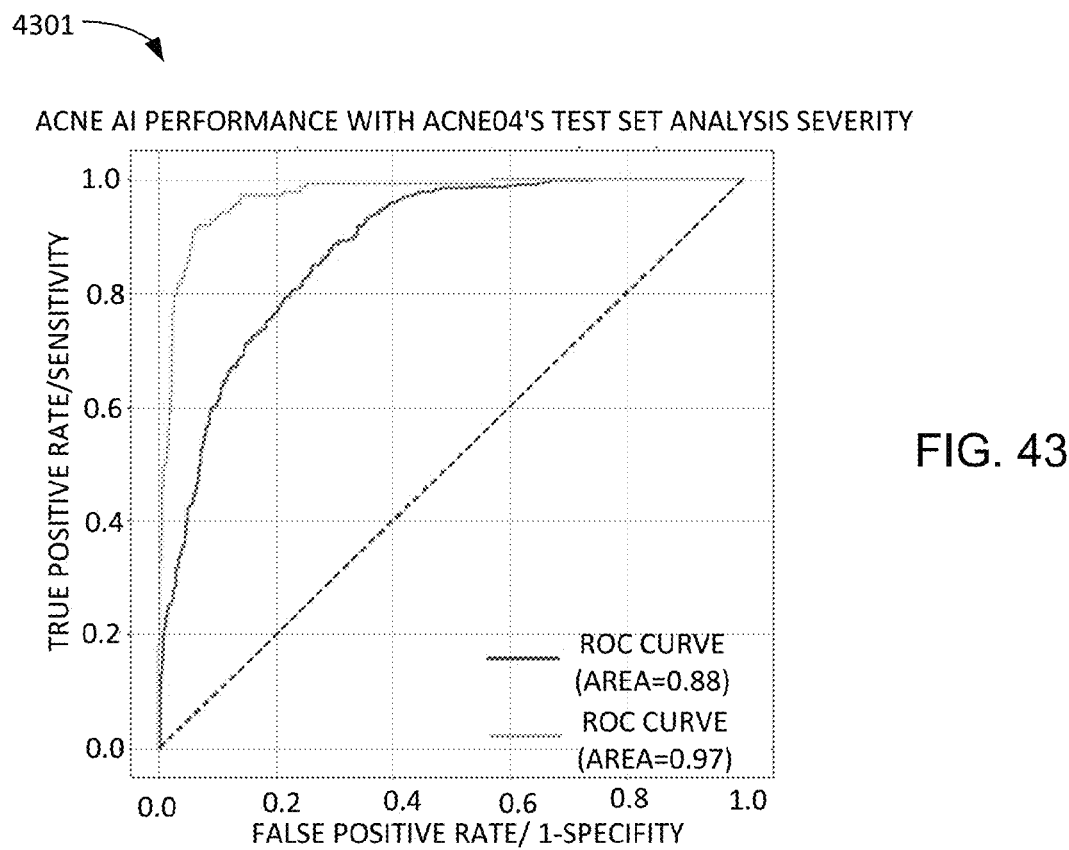
FIG. 43 is an example of a yet further graphical representation of severity scores of the compute system with acne diagnostic mechanism in an embodiment.

Referring now to FIG. 43, therein is shown an example of a yet further graphical representation of severity scores 4301 of the compute system 100 of FIG. 1 with acne diagnostic mechanism in an embodiment. FIG. 43 depicts an example of ROC curve for level 0 and 3 (minimum and maximum) following ACNE04. Since we do not have a conversion between our system and their system, a plot for middle level cannot be done. ROC curve and AUC of level 0 depicted in green and level 3 depicted in tan. The accuracy of level 0 is 0.88 and level 3 is 0.97. Best threshold for severity 0 is 7.7 with TP 0.83 and FP 0.3. Best threshold for severity 3 is 37.1 with TP 0.91 and FP 0.06.

Figure 44:
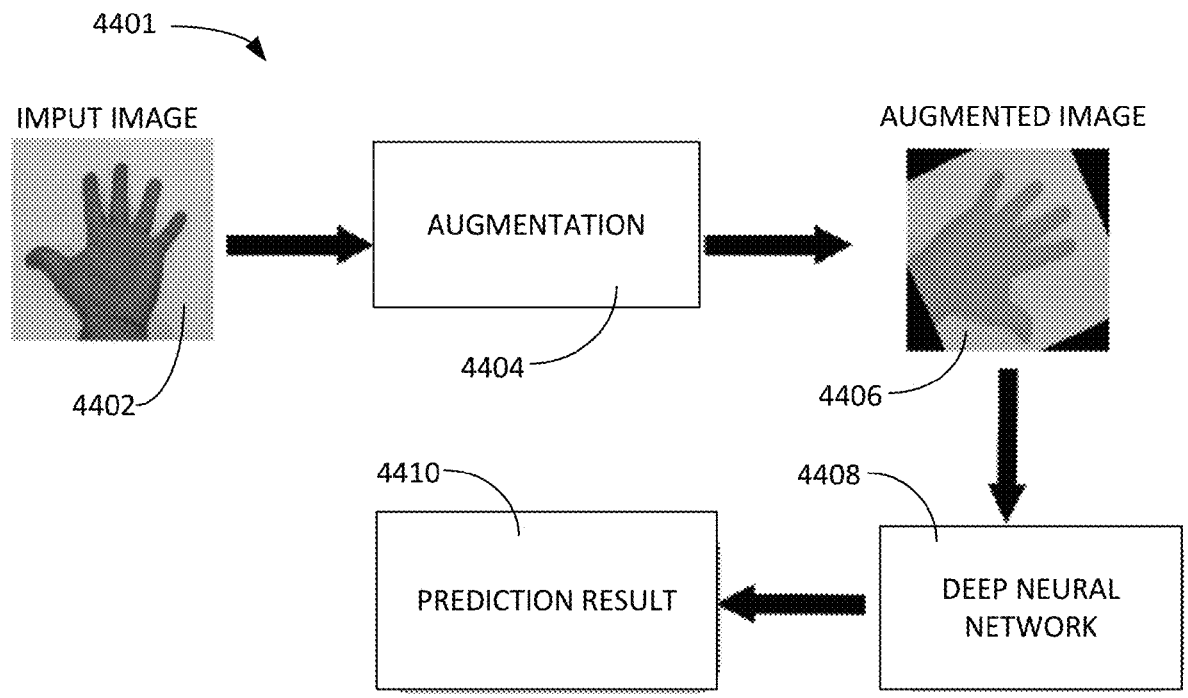
FIG. 44 is an example of a block diagram of data augmentation of the compute system with acne diagnostic mechanism in an embodiment.

Referring now to FIG. 44, therein is shown an example of a block diagram of data augmentation 4401 of the compute system 100 of FIG. 1 with acne diagnostic mechanism in an embodiment. Data augmentation 4401 adds diversity to the image dataset by applying random transformations to the images under certain rules. By doing this, the final model is more likely to generalize, which means that it will work properly under different conditions with better performance and accuracy, not only the type of image that it was trained on. Data augmentations 4401 to the image dataset applied during the training process and the original images are modified (flipped, rotated, add some random noise, add changes in brightness, etc.) before being sent as an input image 4402 to the acne diagnostic mechanism. The data augmentation 4401 is applied without the human intervention and using random or selected parameters or both. An augmentation 4404 is applied to the input image 4402. An augmented image 4406 is created for submission to a deep neural network 4408 for processing. A predicted result 4410 is output from the deep neural network 4408.

Figure 45:
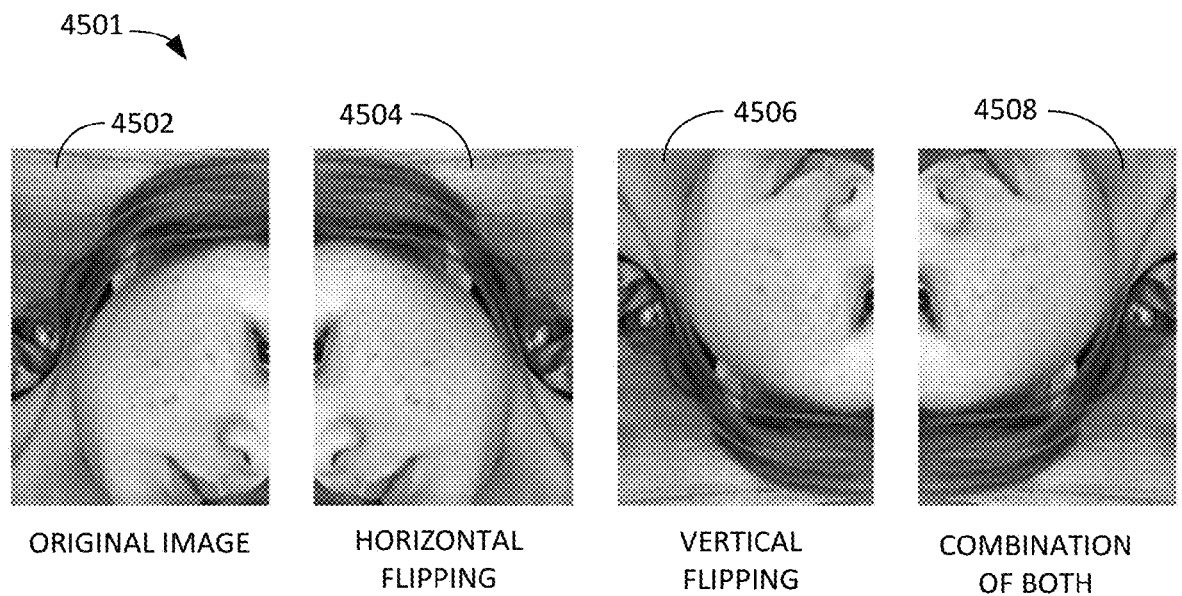
FIG. 45 is an example of images for flipping augmentation for data augmentation of the compute system with acne diagnostic mechanism in an embodiment.

Referring now to FIG. 45, there in shown an example of images for flipping augmentation 4501 for data augmentation 4401 of FIG. 44 of the compute system 100 of FIG. 1 with acne diagnostic mechanism in an embodiment. FIG. 45 depicts examples of images with transformation to flip an original image 4502. The flip of the original image 4501 can be horizontal flipping 4504 or vertical flipping 4506 or composition of both 4508 (horizontal and vertical). The orientation of the flip is chosen at random between: none, vertical, horizontal, both in order to randomize the training.

Figure 46:
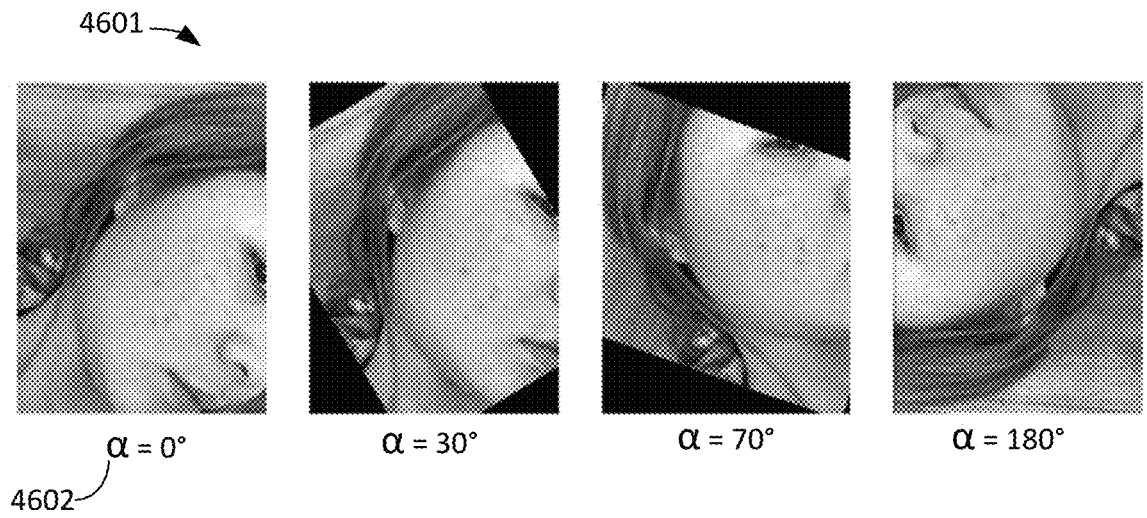
FIG. 46 is an example of images for rotation augmentation for data augmentation of the compute system with acne diagnostic mechanism in an embodiment.

Referring now to FIG. 46, there in shown an example of images for rotation augmentation 4601 for data augmentation 4401 of FIG. 4 of the compute system 100 of FIG. 1 with acne diagnostic mechanism in an embodiment. FIG. 46 depicts examples of images with transformation of rotation. This transformation applies a rotation of angle α 4602 randomly chosen between 0 and 180°. The acne diagnostic mechanism is capable of recognizing skin, body parts and skin lesions from pictures taken under real life conditions. Images taken in real life do not always appear with the same angle or viewpoint. For example, two pictures of a hand taken at different moments do not necessary show the hand in the same position. The rotation transformation allows generation of pictures with multiple angles, making it possible to train the model using more realistic data.

Figure 47:
FIG. 47 is an example of images for brightness augmentation for data augmentation of the compute system with acne diagnostic mechanism in an embodiment.

Referring now to FIG. 47, there in shown an example of images for brightness augmentation 4701 for data augmentation 4401 pf FIG. 4 of the compute system 100 of FIG. 1 with acne diagnostic mechanism in an embodiment. FIG. 47 depicts examples of images with transformation of varying brightness augmentation 4701. In real conditions, a person can take a picture under different light exposure. As a consequence, the image can have more or less brightness. The acne diagnostic mechanism functions and performs correctly under different lighting conditions. The acne diagnostic mechanism can be trained by adding different level of brightness to input images 4702. At each brightness augmentation 4701 with this function, the brightness of the image changes by an amount that is randomly chosen in the range [−Blim, +Blim], where Blim represents the extremes of brightness that still allows the input images 4702 to be recognized. To emphasize its effect, the examples depicted in FIG. 47 were generated setting Blim=0.3.

Figure 48:
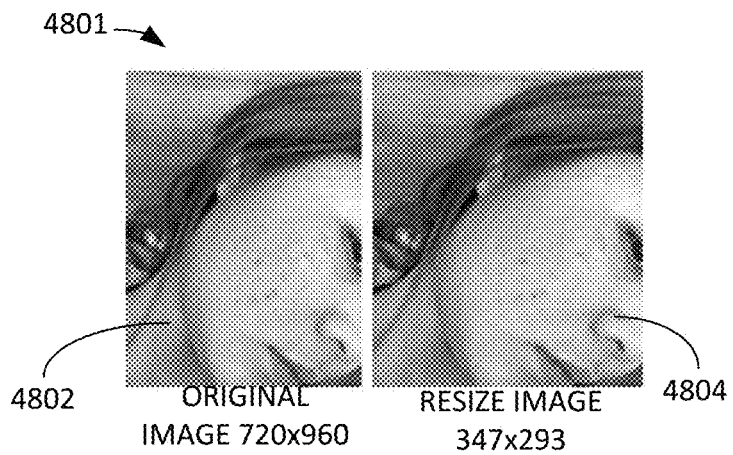
FIG. 48 is an example of images for resize augmentation for data augmentation of the compute system with acne diagnostic mechanism in an embodiment.

Referring now to FIG. 48, there in shown an example of images for resize augmentation 4801 for data augmentation 4401 of FIG. 4 of the compute system 100 of FIG. 1 with acne diagnostic mechanism in an embodiment. FIG. 48 depicts examples of an original image 4802 with transformation of different or rescaling of the image. As examples, the images are taken with different devices, at different distances or mimic that effect. The images being augmented or part of the dataset include images with different sizes. The re-scaling transformation changes the size of the original image 4802 (in the same way as a zoom in or zoom out).

As an example, the resize augmentation 4801 is done by resizing image to a random size chosen in the range $[l_1*size, l_2*size]$, where size is the model input size, and $l_1$, $l_2$ are lower limit and upper limit. For example $l_1=0.8$, $l_2=1.2$. If the resized image's size is lower than model size, random padding to get a squared image: fill left, right, upper or bottom border with as much zeros as needed to make the image square. Otherwise, random crop to the model's input size: choose a random point in the image and consider it as the center of a size*size square. FIG. 48 shows an example of resizing to a smaller size than the model's input size as shown in the difference in size of the images.

Figure 49:
FIG. 49 is an example of images for pad augmentation for data augmentation of the compute system with acne diagnostic mechanism in an embodiment.

Referring now to FIG. 49, there in shown an example of images for pad augmentation 4901 for data augmentation 4401 of FIG. 4 of the compute system 100 of FIG. 1 with acne diagnostic mechanism in an embodiment. FIG. 49 depicts another example of resizing or rescaling when the image size is smaller than the size*size (in this example 384×384), random pad is added to increase the size of the resize image 4904 to create a padded resized image 4902. The padded resized image 4902 can have a border added to the perimeter of the resize image 4904.

Figure 50:
FIG. 50 is an example of images for resize augmentation for data augmentation of the compute system with acne diagnostic mechanism in an embodiment.

Referring now to FIG. 50, there in shown an example of images for resize augmentation 5001 for data augmentation 4401 of FIG. 4 of the compute system 100 of FIG. 1 with acne diagnostic mechanism in an embodiment. FIG. 50 depicts examples of resizing/rescaling to resize to a bigger size than the model's input size, such as 384×384. FIG. 50 is an example with random crop to the model's input size or greater. In this example, the random resize 5002 included one dimension that is below the input standard.

Figure 51:
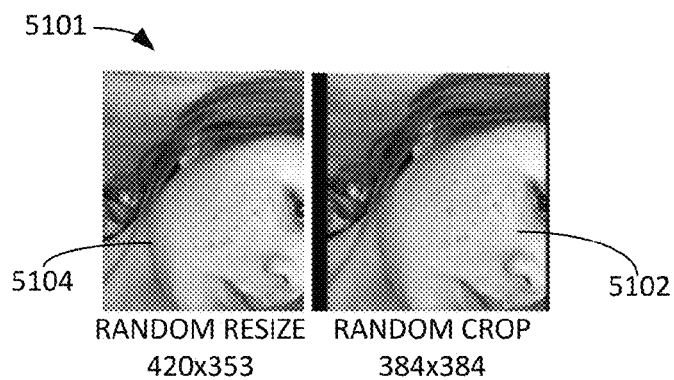
FIG. 51 is an example of images for crop augmentation for data augmentation of the compute system with acne diagnostic mechanism in an embodiment.

Referring now to FIG. 51, there in shown an example of images for crop augmentation 5101 for data augmentation 4401 of FIG. 4 of the compute system 100 of FIG. 1 with acne diagnostic mechanism in an embodiment. FIG. 51 depicts examples of resizing/rescaling 5104 to resize to a bigger size that can meet the model's input size, such as 384×384. The random crop 5102 can be padded and cropped to meet the minimum input size of 384×384.

Figure 52:
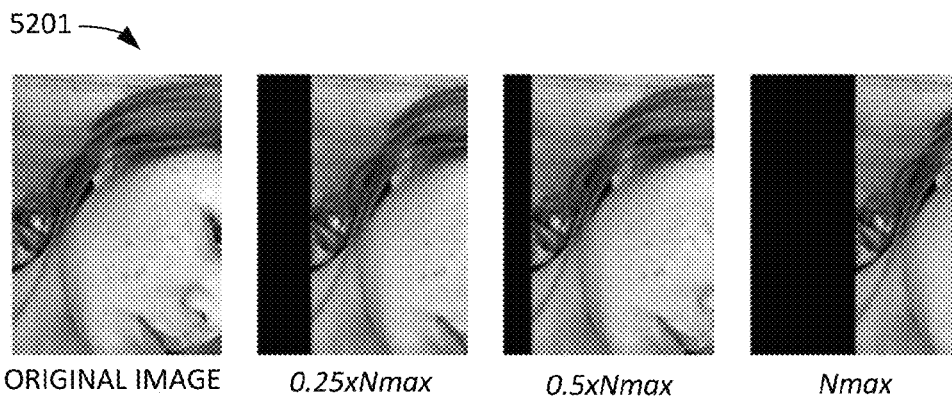
FIG. 52 is an example of images for shifting augmentation for data augmentation of the compute system with acne diagnostic mechanism in an embodiment.

Referring now to FIG. 52, there in shown an example of images for shifting augmentation 5201 for data augmentation 4401 of FIG. 4 of the compute system 100 of FIG. 1 of FIG. 1 with acne diagnostic mechanism in an embodiment. FIG. 52 depicts examples of images with transformation of shifting of the image. FIG. 52 depicts an example of the images shifting to the right or to the left. FIG. 52 depicts shifting augmentation 5201 with different levels. The same translation can be done from the right to left direction. The maximum number of pixels to shift the image is defined by $N_{max}$ and each time the augmentation is called, the actual number of pixels to shift the image is randomly sampled in the range [0, $N_{max}$].

Figure 53:
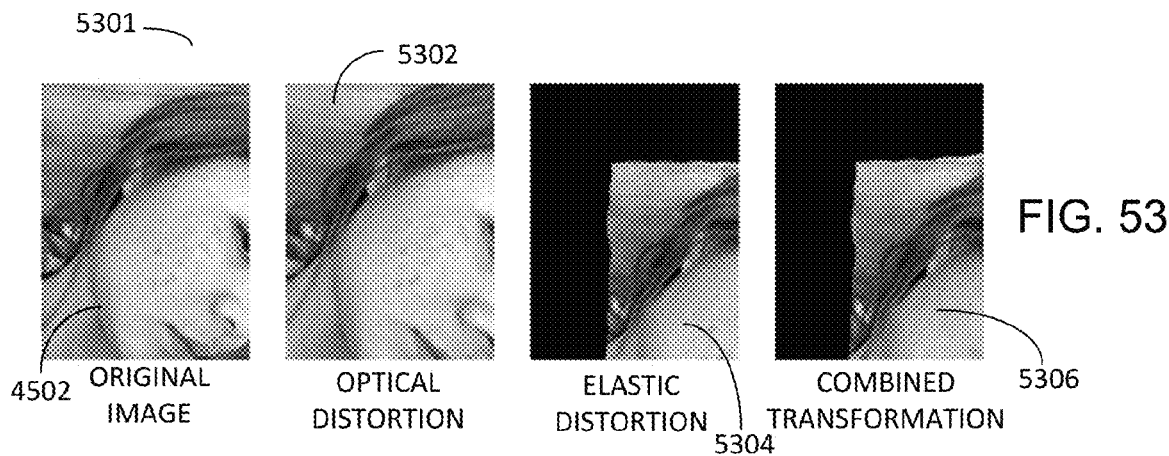
FIG. 53 is an example of images for distortion augmentation for data augmentation of the compute system with acne diagnostic mechanism in an embodiment.

Referring now to FIG. 53, there in shown an example of images for distortion augmentation 5301 for data augmentation 4401 of FIG. 4 of the compute system 100 of FIG. 1 with acne diagnostic mechanism in an embodiment. FIG. 53 depicts examples of images with transformation of distortion of the image. In photography, distortion is particularly associated with zoom lenses, particularly large-range zooms, but may also be found in prime lenses. This transformation mimics this effect using albumentation's optical distortion function as well as the elastic transform function. The original image 4502 can be subjected to optical distortion 5302, elastic distortion 5304, or a combined transformation 5306.

Figure 54:
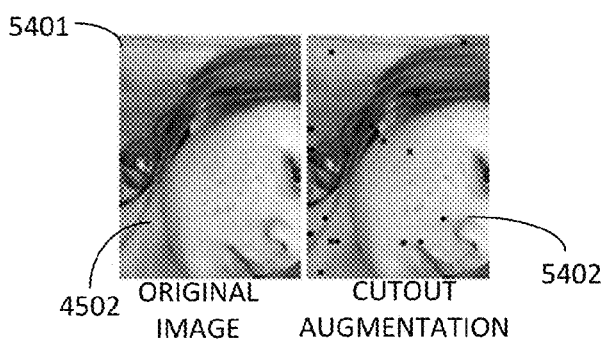
FIG. 54 is an example of images for cutout augmentation for data augmentation of the compute system with acne diagnostic mechanism in an embodiment.

Referring now to FIG. 54, there in shown an example of images for cutout augmentation 5401 for data augmentation 4401 of FIG. 4 of the compute system 100 of FIG. 1 with acne diagnostic mechanism in an embodiment. FIG. 54 depicts examples of images with transformation of cut-out of the image. The data augmentation 4401 with cut-out allows to mask random patches of the image with cutout augmentation 5402. After applying this augmentation, the resulting image includes with many different small black squares on it. The size of the square is set randomly with the maximum value depends on the model's input size.

Figure 55:
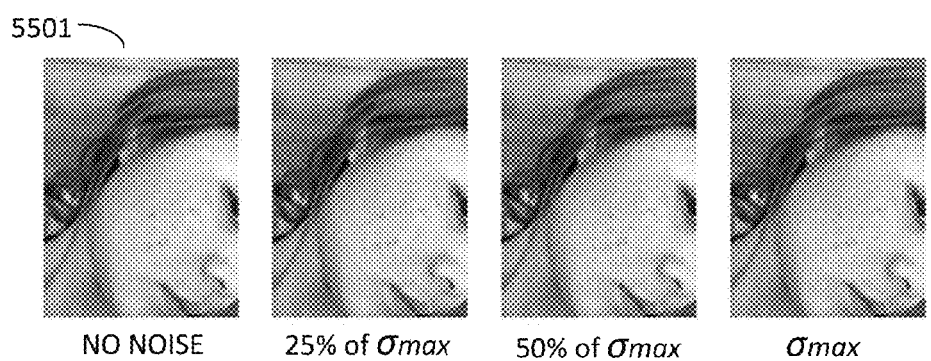
FIG. 55 is an example of images for noise augmentation for data augmentation of the compute system with acne diagnostic mechanism in an embodiment.

Referring now to FIG. 55, there in shown an example of images for noise augmentation 5501 for data augmentation 4401 of FIG. 4 of the compute system 100 of FIG. 1 with acne diagnostic mechanism in an embodiment. FIG. 55 depicts examples of images with transformation of noise, such as Gaussian noise, to the image. This augmentation seeks at mimicking the camera noise that is sometimes visible when pictures are taken with bad quality cameras (like smart-phones cameras for example). The term 'Gaussian' refers to the fact that each pixel will be perturbed with respect to a Gaussian distribution of mean µ and variance σ. To add such noise into images, we first choose the maximum amount of noise desired, denoted by $\sigma_{max}$, and then we randomly sample its intensity between 0 and $\sigma_{max}$. The specific examples shown in FIG. 55 is with Gaussian noise augmentation with different levels of noise. $\sigma_{max}$=50.

Figure 56:
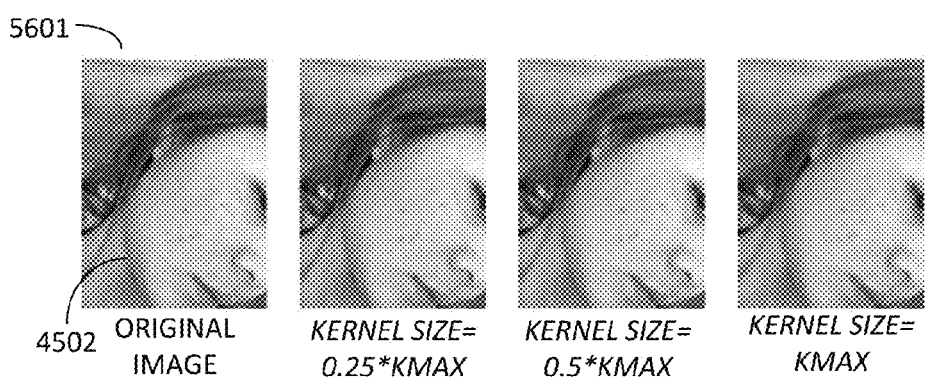
FIG. 56 is an example of images for blur augmentation for data augmentation of the compute system with acne diagnostic mechanism in an embodiment.

Referring now to FIG. 56, there in shown an example of images for blur augmentation 5601 for data augmentation 4401 of FIG. 4 of the compute system 100 of FIG. 1 with acne diagnostic mechanism in an embodiment. FIG. 56 depicts examples of images with transformation of blur, such as Gaussian blur, to the image. This augmentation seeks at adding blur to the image. As a more specific example, a specific type of blur called Gaussian blur is used for data augmentation. Mathematically, applying a Gaussian blur to an image is the same as convolving the image with a Gaussian kernel, whose size defines the level of blur. The greater the kernel size, the more blur we add. In the training pipeline, the kernel size is randomly chosen between 0 and $k_{max}$=27. The specific examples shown in FIG. 56 is with Gaussian blur augmentation with different kernel sizes.

Figure 57:
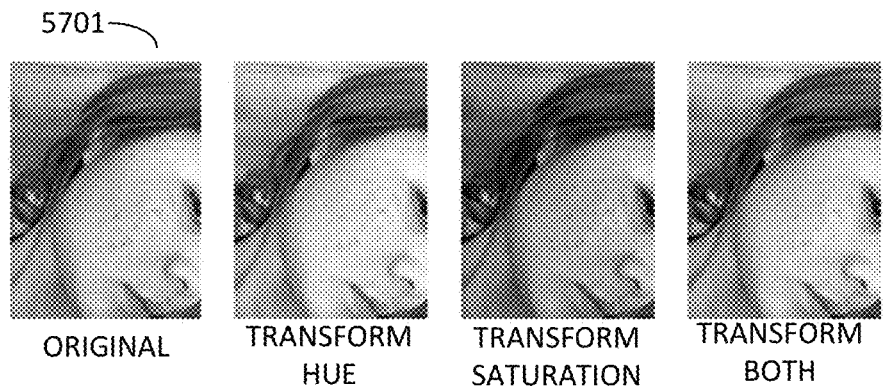
FIG. 57 is an example of images for hue/saturation augmentation for data augmentation of the compute system with acne diagnostic mechanism in an embodiment.

Referring now to FIG. 57, there in shown an example of images for hue/saturation augmentation 5701 for data augmentation 4401 of FIG. 4 of the compute system 100 of FIG. 1 with acne diagnostic mechanism in an embodiment. FIG. 57 depicts examples of images with transformation of hue, saturation, or both to the image. This data augmentation randomly change hue, saturation and value of the input image. As examples, there are 3 parameters that are randomly sampled for each image, defining the intensity of this augmentation: range for changing hue between −20 and 20: range for changing saturation between −30 and 30; range for changing value of pixels between −20 and 20. The specific examples shown in FIG. 57 is with different hue/saturation and value changes.

Figure 58:
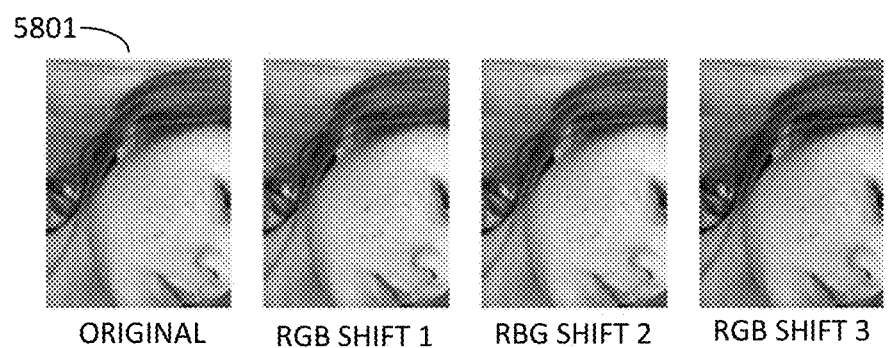
FIG. 58 is an example of images for RGB augmentation for data augmentation of the compute system with acne diagnostic mechanism in an embodiment.

Referring now to FIG. 58, there in shown an example of images for RGB augmentation 5801 for data augmentation 4401 of FIG. 4 of the compute system 100 of FIG. 1 with acne diagnostic mechanism in an embodiment. FIG. 58 depicts examples of images with transformation of RGB shift to the image. This data augmentation 4401 perturbs each of the three color channels' pixels by a randomly chosen number in the range [$-N_{max,c}$, $+N_{max,c}$], where c denotes the channel (R. G or B). During the training, we set $N_{max,R}=N_{max,B}=N_{max,B}=2$. However, to emphasize its effect, the following examples were generated by setting $N_{max,R}=N_{max,B}=N_{max,B}=20$.

Figure 59:
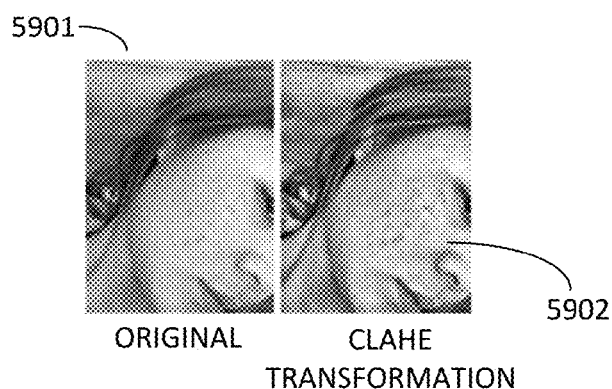
FIG. 59 is an example of images for Contrast Limited Adaptive Histogram Equalization (CLAHE) augmentation for data augmentation of the compute system with acne diagnostic mechanism in an embodiment.

Referring now to FIG. 59, there in shown an example of images for Contrast Limited Adaptive Histogram Equalization (CLAHE) augmentation 5901 for data augmentation of the compute system with acne diagnostic mechanism in an embodiment. FIG. 59 depicts examples of images with CLAHE transformation 5902 to the image. CLAHE allows the equalization of images. CLAHE is a variant of Adaptive histogram equalization (AHE) which takes care of over-amplification of the contrast. CLAHE operates on small regions in the image, called tiles, rather than the entire image. The neighboring tiles are then combined using bilinear interpolation to remove the artificial boundaries. This algorithm can be applied to improve the contrast of images.

Figure 60:
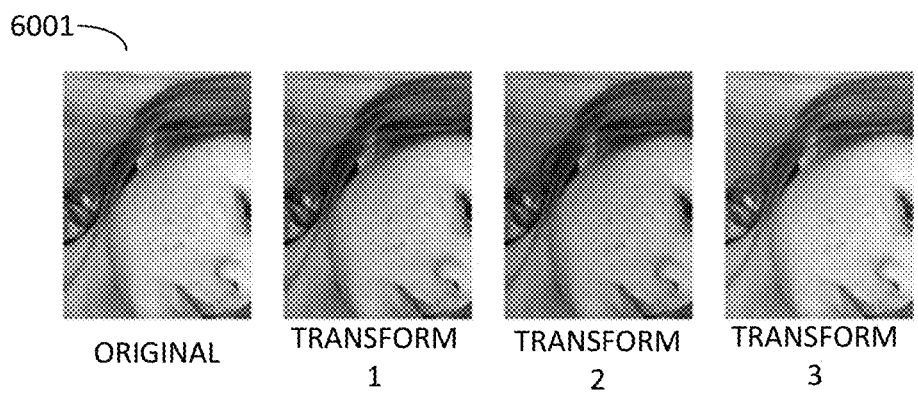
FIG. 60 is an example of images for brightness-contrast augmentation for data augmentation of the compute system with acne diagnostic mechanism in an embodiment.

Referring now to FIG. 60, there in shown an example of images for brightness-contrast augmentation 6001 for data augmentation 4401 of FIG. 4 of the compute system 100 of FIG. 1 with acne diagnostic mechanism in an embodiment. FIG. 58 depicts examples of images with transformation of brightness-contrast augmentation 6001 to the image. In addition to changing brightness of the image, this augmentation also changes its contrast by an amount randomly chosen in the range [$-C_{lim}$, $+C_{lim}$]. During the training phase, we set $C_{lim}$=0.15, but to emphasize its effect, the following examples were generated with $C_{lim}$=0.3. The specific examples shown in FIG. 60 is with different amount of contrast.

Figure 61:
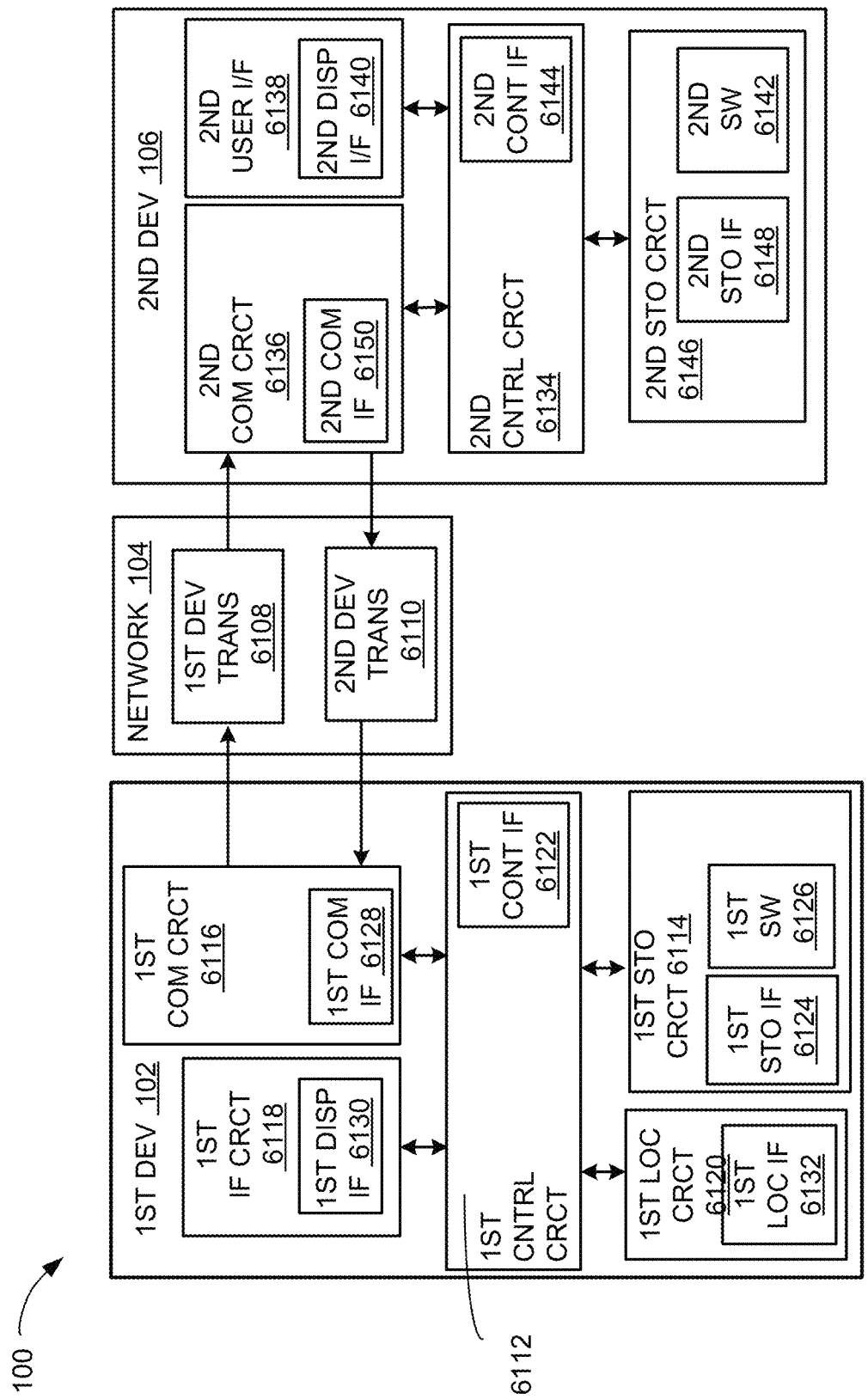
FIG. 61 is an exemplary block diagram of the compute system in an embodiment.

Referring now to FIG. 61, therein is shown an exemplary block diagram of the compute system 100 in an embodiment. The compute system 100 can include the first device 102, the network 104, and the second device 106. The first device 102 can send information in a first device transmission 6108 over the network 104 to the second device 106. The second device 106 can send information in a second device transmission 6110 over the network 104 to the first device 102 or the vehicle 201 of FIG. 2.

For illustrative purposes, the compute system 100 is shown with the first device 102 as a client device, although it is understood that the compute system 100 can include the first device 102 as a different type of device.

Also, for illustrative purposes, the compute system 100 is shown with the second device 106 as a server, although it is understood that the compute system 100 can include the second device 106 as a different type of device. For example, the second device 106 can be a client device. By way of an example, the compute system 100 can be implemented entirely on the first device 102.

Also, for illustrative purposes, the compute system 100 is shown with interaction between the first device 102 and the second device 106. However, it is understood that the first device 102 can be a part of or the entirety of an autonomous vehicle, a smart vehicle, or a combination thereof. Similarly, the second device 106 can similarly interact with the first device 102 representing the autonomous vehicle, the intelligent vehicle, or a combination thereof.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control circuit 6112, a first storage circuit 6114, a first communication circuit 6116, a first interface circuit 6118, and a first location circuit 6120. The first control circuit 6112 can include a first control interface 6122. The first control circuit 6112 can execute a first software 6126 to provide the intelligence of the compute system 100.

The first control circuit 6112 can be implemented in a number of different manners. For example, the first control circuit 6112 can be a processor, an application specific integrated circuit (ASIC) an embedded processor, a microprocessor, a hardware control logic, a hardware finite state machine (FSM), a digital signal processor (DSP), or a combination thereof. The first control interface 6122 can be used for communication between the first control circuit 6112 and other functional units or circuits in the first device 102. The first control interface 6122 can also be used for communication that is external to the first device 102.

The first control interface 6122 can receive information from the other functional units/circuits or from external sources, or can transmit information to the other functional units/circuits or to external destinations. The external sources and the external destinations refer to sources and destinations external to the first device 102.

The first control interface 6122 can be implemented in different ways and can include different implementations depending on which functional units/circuits or external units/circuits are being interfaced with the first control interface 6122. For example, the first control interface 6122 can be implemented with a pressure sensor, an inertial sensor, a microelectromechanical system (MEMS), optical circuitry, waveguides, wireless circuitry, wireline circuitry, or a combination thereof.

The first storage circuit 6114 can store the first software 6126. The first storage circuit 6114 can also store the relevant information, such as data representing incoming images, data representing previously presented image, sound files, or a combination thereof.

The first storage circuit 6114 can be a volatile memory, a nonvolatile memory, an internal memory, an external memory, or a combination thereof. For example, the first storage circuit 6114 can be a nonvolatile storage such as non-volatile random-access memory (NVRAM), Flash memory, disk storage, or a volatile storage such as static random-access memory (SRAM).

The first storage circuit 6114 can include a first storage interface 6124. The first storage interface 6124 can be used for communication between the first storage circuit 6114 and other functional units or circuits in the first device 102. The first storage interface 6124 can also be used for communication that is external to the first device 102.

The first storage interface 6124 can receive information from the other functional units/circuits or from external sources, or can transmit information to the other functional units/circuits or to external destinations. The external sources and the external destinations refer to sources and destinations external to the first device 102. The first storage interface 6124 can receive input from and source data to the acne diagnostic module 116.

The first storage interface 6124 can include different implementations depending on which functional units/circuits or external units/circuits are being interfaced with the first storage circuit 6114. The first storage interface 6124 can be implemented with technologies and techniques similar to the implementation of the first control interface 6122.

The first communication circuit 6116 can enable external communication to and from the first device 102. For example, the first communication circuit 6116 can permit the first device 102 to communicate with the second device 106 and the network 104.

The first communication circuit 6116 can also function as a communication hub allowing the first device 102 to function as part of the network 104 and not limited to be an endpoint or terminal circuit to the network 104. The first communication circuit 6116 can include active and passive components, such as microelectronics or an antenna, for interaction with the network 104.

The first communication circuit 6116 can include a first communication interface 6128. The first communication interface 6128 can be used for communication between the first communication circuit 6116 and other functional units or circuits in the first device 102. The first communication interface 6128 can receive information from the second device 106 for distribution to the other functional units/circuits or can transmit information to the other functional units or circuits.

The first communication interface 6128 can include different implementations depending on which functional units or circuits are being interfaced with the first communication circuit 6116. The first communication interface 6128 can be implemented with technologies and techniques similar to the implementation of the first control interface 6122.

The first interface circuit 6118 allows the user 112 of FIG. 1 to interface and interact with the first device 102. The first interface circuit 6118 can include an input device and an output device. Examples of the input device of the first interface circuit 6118 can include a keypad, a touchpad, soft-keys, a keyboard, a microphone, an infrared sensor for receiving remote signals, or any combination thereof to provide data and communication inputs.

The first interface circuit 6118 can include a first display interface 6130. The first display interface 6130 can include an output device. The first display interface 6130 can include a projector, a video screen, a touch screen, a speaker, a microphone, a keyboard, and combinations thereof.

The first control circuit 6112 can operate the first interface circuit 6118 to display information generated by the compute system 100 and receive input from the user 112. The first control circuit 6112 can also execute the first software 6126 for the other functions of the compute system 100, including receiving location information from the first location circuit 6120. The first control circuit 6112 can further execute the first software 6126 for interaction with the network 104 via the first communication circuit 6116. The first control circuit 6112 can operate the acne diagnostic mechanism 115 of FIG. 1.

The first control circuit 6112 can also receive location information from the first location circuit 6120. The first control circuit 6112 can operate the acne diagnostic module 116.

The first location circuit 6120 can be implemented in many ways. For example, the first location circuit 6120 can function as at least a part of the global positioning system, an inertial compute system, a cellular-tower location system, a gyroscope, or any combination thereof. Also, for example, the first location circuit 6120 can utilize components such as an accelerometer, gyroscope, or global positioning system (GPS) receiver.

The first location circuit 6120 can include a first location interface 6132. The first location interface 6132 can be used for communication between the first location circuit 6120 and other functional units or circuits in the first device 102, including the environmental sensors 210.

The first location interface 6132 can receive information from the other functional units/circuits or from external sources, or can transmit information to the other functional units/circuits or to external destinations. The external sources and the external destinations refer to sources and destinations external to the first device 102. The first location interface 6132 can receive the global positioning location from the global positioning system (not shown).

The first location interface 6132 can include different implementations depending on which functional units/circuits or external units/circuits are being interfaced with the first location circuit 6120. The first location interface 6132 can be implemented with technologies and techniques similar to the implementation of the first control circuit 6112.

The second device 106 can be optimized for implementing an embodiment of the present invention in a multiple device embodiment with the first device 102. The second device 106 can provide the additional or higher performance processing power compared to the first device 102. The second device 106 can include a second control circuit 6134, a second communication circuit 6136, a second user interface 6138, and a second storage circuit 6146.

The second user interface 6138 allows an operator (not shown) to interface and interact with the second device 106. The second user interface 6138 can include an input device and an output device. Examples of the input device of the second user interface 6138 can include a keypad, a touchpad, soft-keys, a keyboard, a microphone, or any combination thereof to provide data and communication inputs. Examples of the output device of the second user interface 6138 can include a second display interface 6140. The second display interface 6140 can include a display, a projector, a video screen, a speaker, or any combination thereof.

The second control circuit 6134 can execute a second software 6142 to provide the intelligence of the second device 106 of the compute system 100. The second software 6142 can operate in conjunction with the first software 6126. The second control circuit 6134 can provide additional performance compared to the first control circuit 6112.

The second control circuit 6134 can operate the second user interface 6138 to display information. The second control circuit 6134 can also execute the second software 6142 for the other functions of the compute system 100, including operating the second communication circuit 6136 to communicate with the first device 102 over the network 104.

The second control circuit 6134 can be implemented in a number of different manners. For example, the second control circuit 6134 can be a processor, an embedded processor, a microprocessor, hardware control logic, a hardware finite state machine (FSM), a digital signal processor (DSP), or a combination thereof.

The second control circuit 6134 can include a second control interface 6144. The second control interface 6144 can be used for communication between the second control circuit 6134 and other functional units or circuits in the second device 106. The second control interface 6144 can also be used for communication that is external to the second device 106.

The second control interface 6144 can receive information from the other functional units/circuits or from external sources, or can transmit information to the other functional units/circuits or to external destinations. The external sources and the external destinations refer to sources and destinations external to the second device 106.

The second control interface 6144 can be implemented in different ways and can include different implementations depending on which functional units/circuits or external units/circuits are being interfaced with the second control interface 6144. For example, the second control interface 6144 can be implemented with a pressure sensor, an inertial sensor, a microelectromechanical system (MEMS), optical circuitry, waveguides, wireless circuitry, wireline circuitry, or a combination thereof.

The second storage circuit 6146 can store the second software 6142. The second storage circuit 6146 can also store the information such as data representing incoming images, data representing previously presented image, sound files, or a combination thereof. The second storage circuit 6146 can be sized to provide the additional storage capacity to supplement the first storage circuit 6114.

For illustrative purposes, the second storage circuit 6146 is shown as a single element, although it is understood that the second storage circuit 6146 can be a distribution of storage elements. Also, for illustrative purposes, the compute system 100 is shown with the second storage circuit 6146 as a single hierarchy storage system, although it is understood that the compute system 100 can include the second storage circuit 6146 in a different configuration. For example, the second storage circuit 6146 can be formed with different storage technologies forming a memory hierarchal system including different levels of caching, main memory, rotating media, or off-line storage.

The second storage circuit 6146 can be a controller of a volatile memory, a nonvolatile memory, an internal memory, an external memory, or a combination thereof. For example, the second storage circuit 6146 can be a controller of a nonvolatile storage such as non-volatile random-access memory (NVRAM), Flash memory, disk storage, or a volatile storage such as static random access memory (SRAM).

The second storage interface 6148 can receive information from the other functional units/circuits or from external sources, or can transmit information to the other functional units/circuits or to external destinations. The external sources and the external destinations refer to sources and destinations external to the second device 106.

The second storage interface 6148 can include different implementations depending on which functional units/circuits or external units/circuits are being interfaced with the second storage circuit 6146. The second storage interface 6148 can be implemented with technologies and techniques similar to the implementation of the second control interface 6144.

The second communication circuit 6136 can enable external communication to and from the second device 106. For example, the second communication circuit 6136 can permit the second device 106 to communicate with the first device 102 over the network 104.

The second communication circuit 6136 can also function as a communication hub allowing the second device 106 to function as part of the network 104 and not limited to be an endpoint or terminal unit or circuit to the network 104. The second communication circuit 6136 can include active and passive components, such as microelectronics or an antenna, for interaction with the network 104.

The second communication circuit 6136 can include a second communication interface 6150. The second communication interface 6150 can be used for communication between the second communication circuit 6136 and other functional units or circuits in the second device 106. The second communication interface 6150 can receive information from the other functional units/circuits or can transmit information to the other functional units or circuits.

The second communication interface 6150 can include different implementations depending on which functional units or circuits are being interfaced with the second communication circuit 6136. The second communication interface 6150 can be implemented with technologies and techniques similar to the implementation of the second control interface 6144.

The second communication circuit 6136 can couple with the network 104 to send information to the first device 102. The first device 102 can receive information in the first communication circuit 6116 from the second device transmission 6110 of the network 104. The compute system 100 can be executed by the first control circuit 6112, the second control circuit 6134, or a combination thereof. For illustrative purposes, the second device 106 is shown with the partition containing the second user interface 6138, the second storage circuit 6146, the second control circuit 6134, and the second communication circuit 6136, although it is understood that the second device 106 can include a different partition. For example, the second software 6142 can be partitioned differently such that some or all of its function can be in the second control circuit 6134 and the second communication circuit 6136. Also, the second device 106 can include other functional units or circuits not shown in FIG. 61 for clarity.

The functional units or circuits in the first device 102 can work individually and independently of the other functional units or circuits. The first device 102 can work individually and independently from the second device 106 and the network 104.

The functional units or circuits in the second device 106 can work individually and independently of the other functional units or circuits. The second device 106 can work individually and independently from the first device 102 and the network 104.

The functional units or circuits described above can be implemented in hardware. For example, one or more of the functional units or circuits can be implemented using a gate array, an application specific integrated circuit (ASIC), circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

For illustrative purposes, the compute system 100 is described by operation of the first device 102 and the second device 106. It is understood that the first device 102 and the second device 106 can operate any of the modules and functions of the compute system 100.

Figure 62:
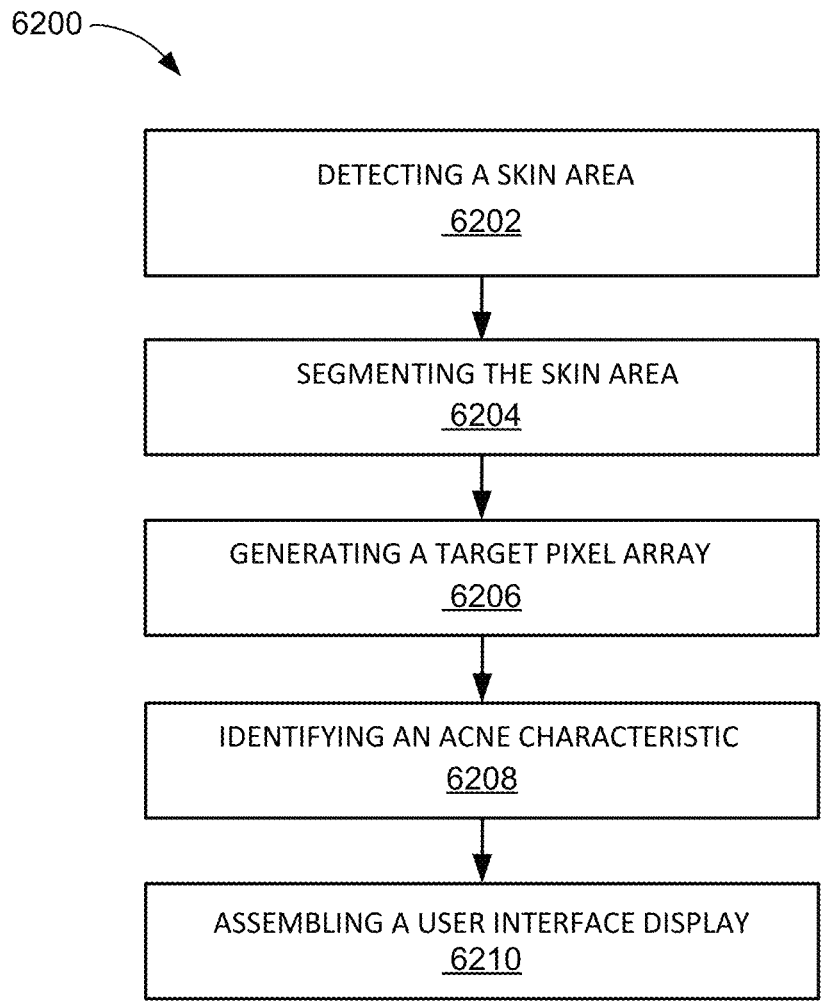
FIG. 62 is a flow chart of a method of operation of a compute system in an embodiment of the present invention.

Referring now to FIG. 62, therein is shown a flow chart of a method 6200 of operation of a compute system 100 of FIG. 1 in an embodiment of the present invention. The method 6200 includes: detecting a skin area in a patient image in a block 6202; segmenting the skin area into a segmented image having an acne pimple at the center in a block 6204; generating a target pixel array from the segmented image includes identifying a plurality of the acne pimples that are adjacent in the segmented image in a block 6206; identifying an acne characterization of the acne pimples including an area of each acne and an acne score in a block 6208; and assembling a user interface display from the acne characterization for displaying on a device in a block 6210.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a compute system comprising:
   detecting a skin area in a patient image;
   segmenting the skin area into a segmented image including an acne pimple;
   generating a target pixel array from the segmented image includes separating a plurality of the acne pimple that are adjacent in the segmented image;
   identifying the acne pimple by an acne separation algorithm analyzing the target pixel array;
   identifying an acne characterization of the acne pimple identified by the acne separation algorithm including an area of each acne and an acne score; and
   assembling a user interface display from the acne characterization for displaying on a device.

2. The method as claimed in claim 1 wherein identifying the acne characterization includes analyzing the segmented image to determine an acne type, an acne score, and an area of each acne.

3. The method as claimed in claim 1 further comprising assembling an acne indication includes applying a marker, indicating a center and radius of the acne pimple, to the patient image.

4. The method as claimed in claim 1 further comprising identifying the plurality of the acne pimple that are adjacent in the segmented image by applying a marker on each of the plurality of the acne pimple with overlapping of the markers.

5. The method as claimed in claim 1 further comprising generating an acne counting table includes identifying an acne type of the acne pimple from among a white head, a black head, a pustule, a cyst, a nodule, a papule, a comedone, and a discoloration.

6. The method as claimed in claim 1 further comprising compiling an acne score includes assigning a value of 0 to 5 based on an acne type and a severity grading of the acne pimple.

7. The method as claimed in claim 1 wherein assembling the user interface display includes assembling an acne indication by overlaying the patient image with the acne pimples and an acne type.

8. A compute system comprising:
   a control circuit, including a processor, configured to:
   detect a skin area in a patient image,
   segment the skin area into a segmented image including an acne pimple,
   generate a target pixel array from the segmented image includes separating a plurality of the acne pimple that are adjacent in the segmented image,
   identify the acne pimple by an acne separation algorithm analyzing the target pixel array; and
   identify an acne characterization of the acne pimples identified by the acne separation algorithm including an area of each acne and an acne score; and
   a communication circuit, coupled to the control circuit, configured to assemble a user interface display from the acne characterization for display on a device.

9. The system as claimed in claim 8 wherein the control circuit is further configured to identify the acne characterization includes analyzing the segmented image to determine an acne type, an acne score, and an area of each acne.

10. The system as claimed in claim 8 wherein the control circuit is further configured to assemble an acne indication includes a marker applied, indicating a center and radius of the acne pimple, to the patient image.

11. The system as claimed in claim 8 wherein the control circuit is further configured to identify the plurality of the acne pimple that are adjacent in the segmented image by a marker applied on each of the plurality of the acne pimple with overlapping of the markers.

12. The system as claimed in claim 8 wherein the control circuit is further configured to generate an acne counting table includes an acne type of the acne pimple identified from among a white head, a black head, a pustule, a cyst, a nodule, a papule, a comedone, and a discoloration.

13. The system as claimed in claim 8 wherein the control circuit is further configured to compile an acne score includes assigning a value of 0 to 5 based on an acne type and a severity grading of the acne pimple.

14. The system as claimed in claim 8 wherein the control circuit is further configured to assemble an acne indication by the patient image overlaid with the acne pimples and an acne type.

15. A non-transitory computer readable medium including instructions for a compute system comprising:
   detecting a skin area in a patient image;
   segmenting the skin area into a segmented image having an acne pimple;
   generating a target pixel array from the segmented image includes separating a plurality of the acne pimple that are adjacent in the segmented image;
   identifying the acne pimple by an acne separation algorithm analyzing the target pixel array;
   identifying an acne characterization of the acne pimples identified by the acne separation algorithm including an area of each acne and an acne score; and
   assembling a user interface display from the acne characterization for displaying on a device.

16. The non-transitory computer readable medium as claimed in claim 15 wherein identifying the acne characterization includes analyzing the segmented image to determine an acne type, an acne score, and an area of each acne.

17. The non-transitory computer readable medium as claimed in claim 15 further comprising assembling an acne indication includes applying a marker, indicating a center and radius of the acne pimple, to the patient image.

18. The non-transitory computer readable medium as claimed in claim 15 further comprising identifying the plurality of the acne pimple that are adjacent in the segmented image by applying a marker on each of the plurality of the acne pimple with overlapping of the markers.

19. The non-transitory computer readable medium as claimed in claim 15 wherein generating an acne counting table includes identifying an acne type of the acne pimple from among a white head, a black head, a pustule, a cyst, a nodule, a papule, a comedone, and a discoloration.

20. The non-transitory computer readable medium as claimed in claim 15 further comprising compiling an acne score includes assigning a value of 0 to 5 based on an acne type and a severity grading of the acne pimple.

\* \* \* \* \*